US012445021B2

(12) United States Patent
Sato et al.

(10) Patent No.: US 12,445,021 B2
(45) Date of Patent: Oct. 14, 2025

(54) INVERTER-INTEGRATED ROTATING ELECTRICAL MACHINE THAT EFFICIENTLY COOLS A SMOOTHING CAPACITOR

(71) Applicant: AISIN CORPORATION, Aichi (JP)

(72) Inventors: Ryota Sato, Kariya (JP); Yutaka Hotta, Kariya (JP); Yuya Mizuno, Kariya (JP); Satoshi Murakami, Kariya (JP); Keita Fukuda, Kariya (JP); Hirosato Ihara, Kariya (JP)

(73) Assignee: AISIN CORPORATION, Kariya (JP)

( * ) Notice: Subject to any disclaimer, the term of this patent is extended or adjusted under 35 U.S.C. 154(b) by 150 days.

(21) Appl. No.: 18/036,529

(22) PCT Filed: Feb. 10, 2022

(86) PCT No.: PCT/JP2022/005464
§ 371 (c)(1),
(2) Date: May 11, 2023

(87) PCT Pub. No.: WO2022/173015
PCT Pub. Date: Aug. 18, 2022

(65) Prior Publication Data
US 2024/0014714 A1 Jan. 11, 2024

(30) Foreign Application Priority Data
Feb. 12, 2021 (JP) .................................. 2021-021047

(51) Int. Cl.
*H02K 5/20* (2006.01)
*H02K 5/22* (2006.01)
(Continued)

(52) U.S. Cl.
CPC ............... *H02K 11/33* (2016.01); *H02K 5/20* (2013.01); *H02K 5/225* (2013.01); *H02K 9/19* (2013.01)

(58) Field of Classification Search
CPC ............ H02K 5/20; H02K 5/203; H02K 9/19; H02K 9/22; H02K 9/223; H02K 9/227; H02K 11/30; H02K 11/33
See application file for complete search history.

(56) References Cited

U.S. PATENT DOCUMENTS

| 7,224,078 B2 | 5/2007 | Kato et al. |
| 2004/0189114 A1 | 9/2004 | Iwashima et al. |

(Continued)

FOREIGN PATENT DOCUMENTS

| CN | 109510407 A | 3/2019 | |
| DE | 19927741 A1 * | 12/1999 | ......... F04D 13/0686 |

(Continued)

OTHER PUBLICATIONS

Kuribayashi, Machine Translation of DE19927741, Dec. 1999 (Year: 1999).*

(Continued)

Primary Examiner — Eric Johnson
(74) Attorney, Agent, or Firm — Oliff PLC

(57) ABSTRACT

An Inverter-integrated rotating electrical machine includes: a rotating electrical machine including a rotor and a stator; a housing member forming a housing chamber that houses the rotating electrical machine; a cover member that covers an opening on one end side of the housing member in an axial direction and that includes a support portion rotatably supporting the rotor; a power switching element located between the cover member and the rotating electrical machine in the axial direction; and a smoothing capacitor located between the cover member and the rotating electrical (Continued)

machine in the axial direction. The cover member includes a cooler that cools the power switching element and the smoothing capacitor. The power switching element and the smoothing capacitor are connected to the cover member in a thermally conductive manner.

12 Claims, 38 Drawing Sheets

(51) Int. Cl.
*H02K 9/19* (2006.01)
*H02K 11/33* (2016.01)

(56) References Cited

U.S. PATENT DOCUMENTS

| | | | | |
|---|---|---|---|---|
| 2012/0098391 | A1* | 4/2012 | Yamasaki | H02K 11/33 310/68 D |
| 2013/0300222 | A1* | 11/2013 | Nakano | H02K 3/50 310/43 |
| 2017/0194829 | A1 | 7/2017 | Sadanaga et al. | |
| 2022/0219786 | A1* | 7/2022 | Bruneau | H02K 11/0141 |

FOREIGN PATENT DOCUMENTS

| | | | |
|---|---|---|---|
| DE | 102013209444 A1 | 11/2014 | |
| EP | 2549627 A1 | 1/2013 | |
| EP | 2695795 A1 | 2/2014 | |
| EP | 2713484 B1 | 5/2017 | |
| EP | 3547509 A1 | 10/2019 | |
| JP | H11356006 A * | 12/1991 | |
| JP | 2004297846 A * | 10/2004 | ............. H02K 11/33 |
| JP | 2004-343825 A | 12/2004 | |
| JP | 2014-138489 A | 7/2014 | |
| JP | 2015-089298 A | 5/2015 | |
| JP | 2016-019403 A | 2/2016 | |
| JP | 2018-120994 A | 8/2018 | |
| JP | 2019-057968 A | 4/2019 | |
| WO | 2016/017164 A1 | 2/2016 | |

OTHER PUBLICATIONS

Ono, Machine Translation of JP11356006, Dec. 1999 (Year: 1999).*
Iwashima, Machine Translation of JP2004297846, Oct. 2004 (Year: 2004).*
Apr. 5, 2022 International Search Report issued in International Patent Application No. PCT/JP2022/005464.
Mar. 20, 2024 Search Report issued in European Patent Application No. 22752837.9.

* cited by examiner

INVERTER-INTEGRATED ROTATING ELECTRICAL MACHINE THAT EFFICIENTLY COOLS A SMOOTHING CAPACITOR

TECHNICAL FIELD

The present disclosure relates to inverter-integrated rotating electrical machines.

BACKGROUND ART

In a configuration including a housing member forming a housing chamber that houses a rotating electrical machine, and a cover member covering an opening on one end side of the housing member in an axial direction and rotatably supporting a rotor, there is known a structure in which a power switching element and a smoothing capacitor are disposed between the cover member and the rotating electrical machine in the axial direction (see, for example, Patent Document 1).

RELATED ART DOCUMENTS

Patent Documents

Patent Document 1: Japanese Unexamined Patent Application Publication No. 2014-138489 (JP 2014-138489 A)

SUMMARY OF THE DISCLOSURE

Problem to be Solved by the Disclosure

In the related art as described above, however, the power switching element etc. are located between the smoothing capacitor and the cover member in the axial direction, and it is difficult to efficiently cool the smoothing capacitor.

It is therefore an object of the present disclosure to efficiently cool a smoothing capacitor in a configuration including a housing member for a rotating electrical machine and a cover member rotatably supporting a rotor.

Means for Solving the Problem

According to one aspect of the present disclosure, an inverter-integrated rotating electrical machine is provided that includes: a rotating electrical machine including a rotor and a stator;
  a housing member forming a housing chamber that houses the rotating electrical machine;
  a cover member that covers an opening on one end side of the housing member in an axial direction, and that includes a support portion rotatably supporting the rotor;
  a power switching element located between the cover member and the rotating electrical machine in the axial direction; and
  a smoothing capacitor located between the cover member and the rotating electrical machine in the axial direction.
The cover member includes a cooler that cools the power switching element and the smoothing capacitor.
The power switching element and the smoothing capacitor are connected to the cover member in a thermally conductive manner.

Effects of the Disclosure

According to the present disclosure, the smoothing capacitor can be efficiently cooled in the configuration including the housing member for the rotating electrical machine and the cover member rotatably supporting the rotor.

MODES FOR CARRYING OUT THE DISCLOSURE

Figure 1:
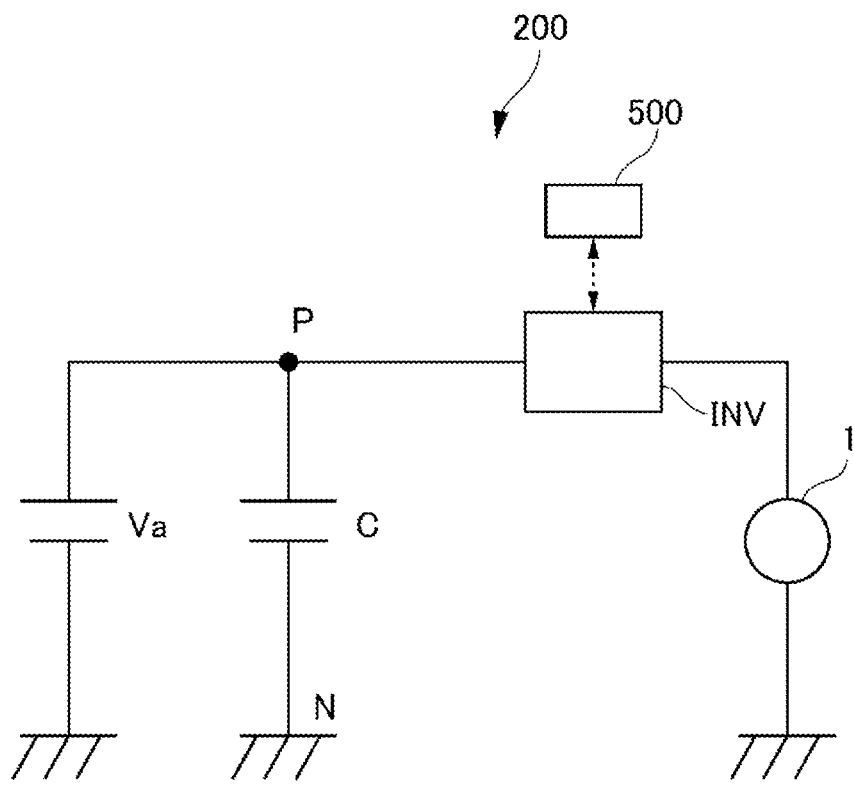
FIG. 1 is a schematic diagram of an example of an electrical circuit including a rotating electrical machine according to a first embodiment.

Embodiments will be described in detail below with reference to the accompanying drawings. The dimensional ratios in the drawings are merely illustrative, and are not limited to these. The shapes etc. in the drawings may be partially exaggerated for convenience of description.

Hereinafter, an electrical system (control system) of a vehicle drive device 10 of the present embodiment and an overall drive system including the vehicle drive device 10 of the present embodiment will first be outlined, and then the vehicle drive device 10 of the present embodiment will be described in detail.

[Electrical System of Vehicle Drive Device]

FIG. 1 is a schematic diagram of an example of an electrical circuit 200 including a rotating electrical machine 1 of the present embodiment. FIG. 1 also shows a control device 500. In FIG. 1, a dotted arrow shown for the control device 500 represents transfer of information (signals and data).

The rotating electrical machine 1 is driven through control of an inverter INV by the control device 500. In the electrical circuit 200 shown in FIG. 1, the rotating electrical machine 1 is electrically connected to a power supply Va via the inverter INV. For example, the inverter INV includes, for each phase, power switching elements (e.g., MOSFETs: Metal-Oxide-Semiconductor Field Effect Transistors, IGBTs: Insulated Gate Bipolar Transistors, etc.) on the high potential side and low potential side of the power supply Va. The power switching element on the high potential side and the power switching element on the low potential side form upper and lower arms. The inverter INV may include a plurality of sets of upper and lower arms for each phase. Each power switching element may be driven by PWM (Pulse Width Modulation) under the control of the control device 500 so that desired rotational torque is generated. The power supply Va is, for example, a battery with a relatively high rated voltage and may be, for example, a lithium-ion battery, a fuel cell, etc.

In the present embodiment, like the electrical circuit 200 shown in FIG. 1, a smoothing capacitor C is electrically connected in parallel with the inverter INV between the high potential side and the low potential side of the power supply Va. A plurality of sets of smoothing capacitors C may be electrically connected in parallel with each other between the high potential side and the low potential side of the power supply Va. A DC-DC converter may be provided between the power supply Va and the inverter INV.

[Overall Drive System]

Figure 2:
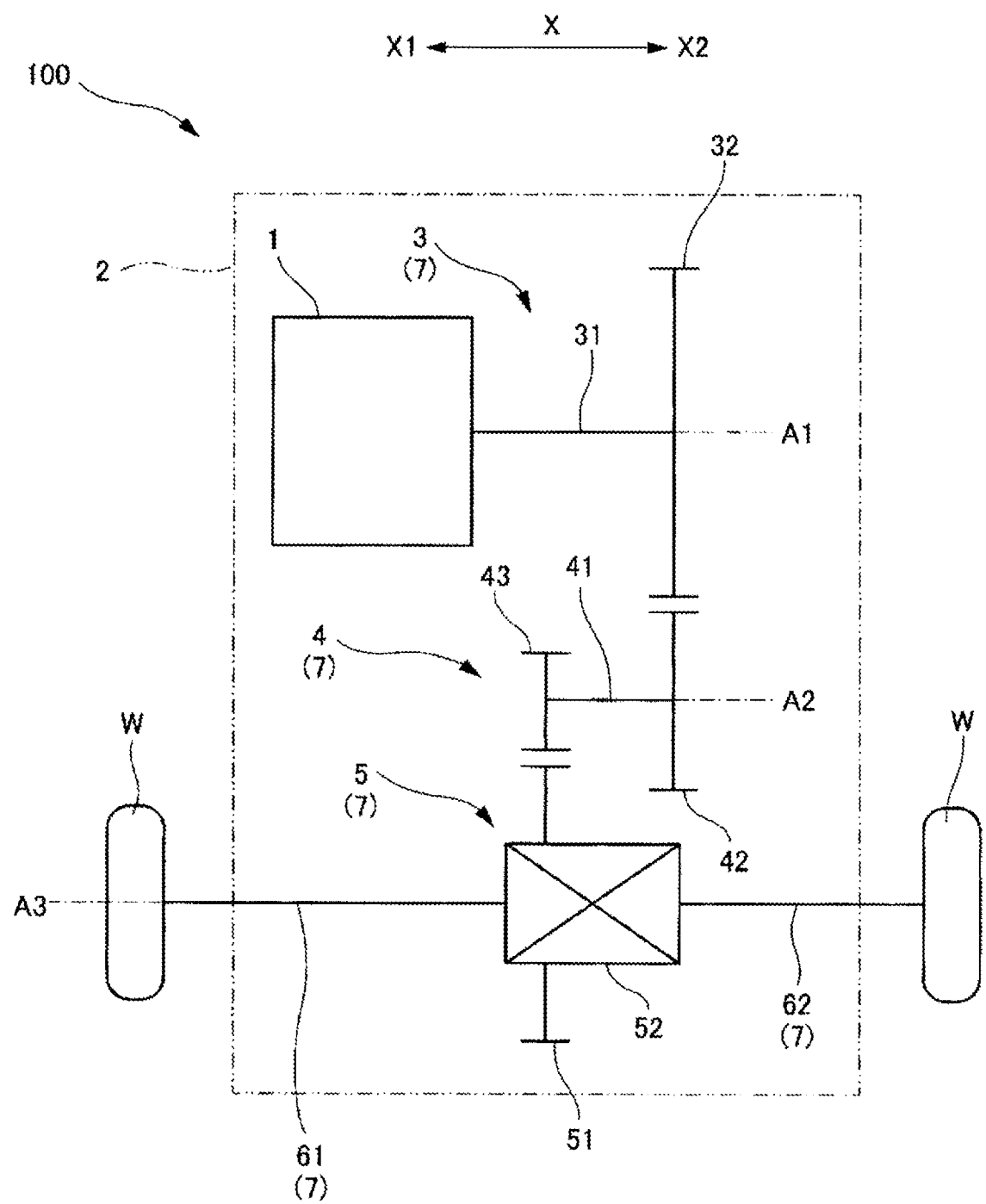
FIG. 2 is a skeleton diagram of a vehicle drive system including the rotating electrical machine according to the first embodiment.

FIG. 2 is a skeleton diagram of a vehicle drive system 100 including the rotating electrical machine 1. In FIG. 2, an X direction and X1 and X2 sides in the X direction are defined. The X direction is parallel to the direction of a first axis A1 (hereinafter also referred to as "axial direction").

In the example shown in FIG. 2, the vehicle drive system 100 includes the rotating electrical machine 1 serving as a driving source for wheels and a drive transmission mechanism 7 provided in a power transmission path connecting the rotating electrical machine 1 and the wheels W. The drive transmission mechanism 7 includes an input member 3, a counter gear mechanism 4, a differential gear mechanism 5, and left and right output members 61, 62.

The input member 3 includes an input shaft 31 and an input gear 32. The input shaft 31 is a rotating member that rotates about the first axis A1. The input gear 32 is a gear that transmits rotational torque (driving force) from the rotating electrical machine 1 to the counter gear mechanism 4. The input gear 32 is connected to the input shaft 31 of the input member 3 so as to rotate with the input shaft 31 of the input member 3.

The counter gear mechanism 4 is disposed between the input member 3 and the differential gear mechanism 5 in the power transmission path. The counter gear mechanism 4 includes a counter shaft 41, a first counter gear 42, and a second counter gear 43.

The counter shaft 41 is a rotating member that rotates about a second axis A2. The second axis A2 extends parallel to the first axis A1. The first counter gear 42 is an input element of the counter gear mechanism 4. The first counter gear 42 meshes with the input gear 32 of the input member 3. The first counter gear 42 is connected to the counter shaft 41 so as to rotate with the counter shaft 41.

The second counter gear 43 is an output element of the counter gear mechanism 4. In the present embodiment, the second counter gear 43 has, for example, a smaller diameter than the first counter gear 42. The second counter gear 43 is connected to the counter shaft 41 so as to rotate with the counter shaft 41.

The differential gear mechanism 5 is disposed on a third axis A3 serving as a rotation axis of the differential gear mechanism 5. The third axis A3 extends parallel to the first axis A1. The differential gear mechanism 5 distributes the driving force transmitted from the rotating electrical machine 1 side to the left and right output members 61, 62. The differential gear mechanism 5 includes a differential input gear 51, and the differential input gear 51 meshes with the second counter gear 43 of the counter gear mechanism 4. The differential gear mechanism 5 includes a differential case 52, and the differential case 52 houses a pinion shaft, pinion gears, left and right side gears, etc. The left and right side gears are connected to the left and right output members 61, 62 so as to rotate with the left and right output members 61, 62, respectively.

The left and right output members 61, 62 are drivingly connected to the left and right wheels W, respectively. Each of the left and right output members 61, 62 transmits the driving force distributed by the differential gear mechanism 5 to the wheel W. The left and right output members 61, 62 may be each composed of two or more members.

The rotating electrical machine 1 thus drives the wheels W via the drive transmission mechanism 7. However, in another embodiment, the rotating electrical machine 1 may be disposed inside a wheel as a wheel-in motor. In this case, the vehicle drive system 100 may not include the drive transmission mechanism 7. In still another embodiment, a plurality of rotating electrical machines 1 that share part or the whole of the drive transmission mechanism 7 may be provided.

[Details of Vehicle Drive Device]

The vehicle drive device 10 includes the rotating electrical machine 1 described above, a case 2, and a motor drive device 8.

Figure 3A:
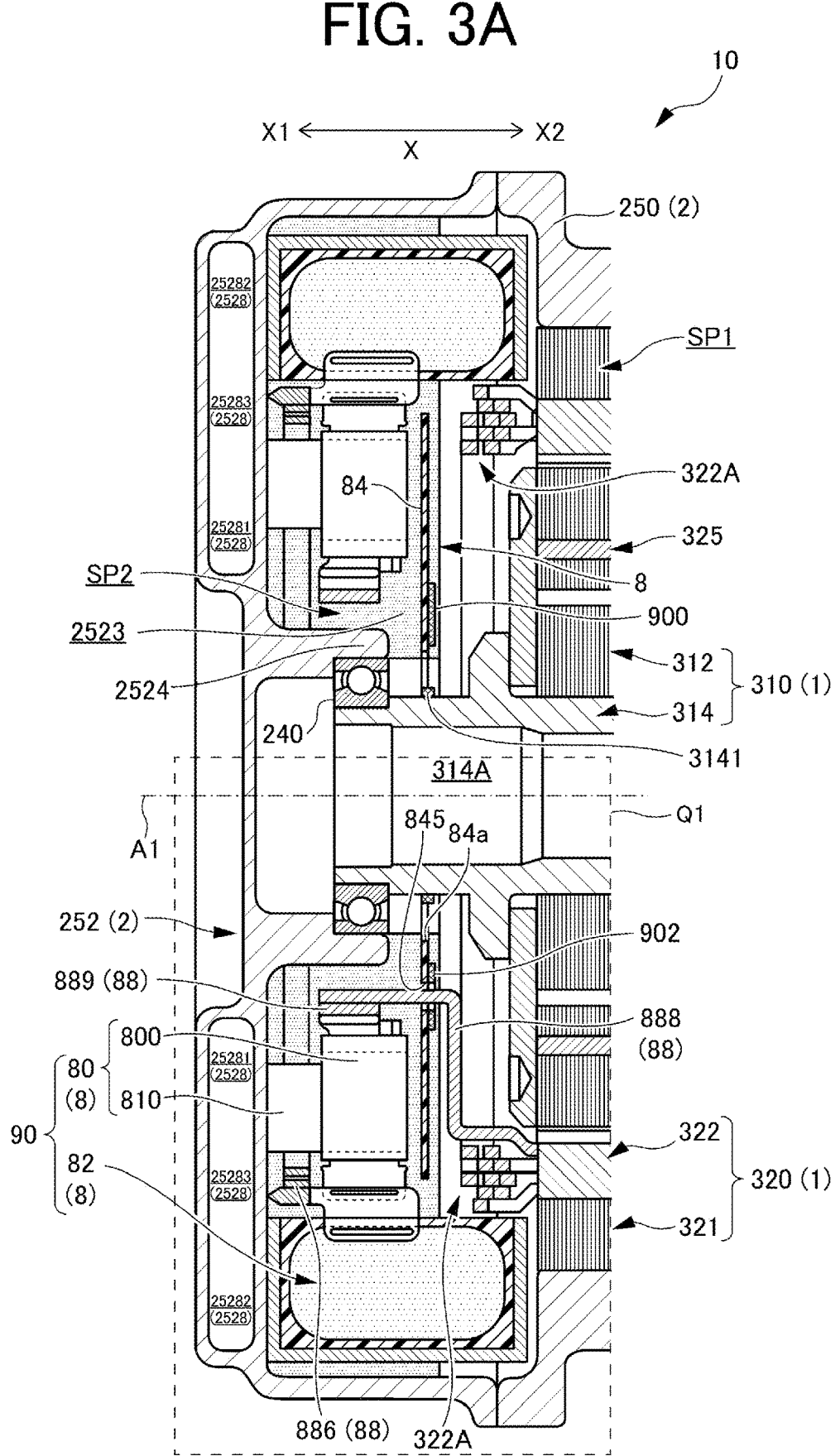
FIG. 3A is a sectional view schematically showing a main part of a vehicle drive device according to the first embodiment.
Figure 3B:
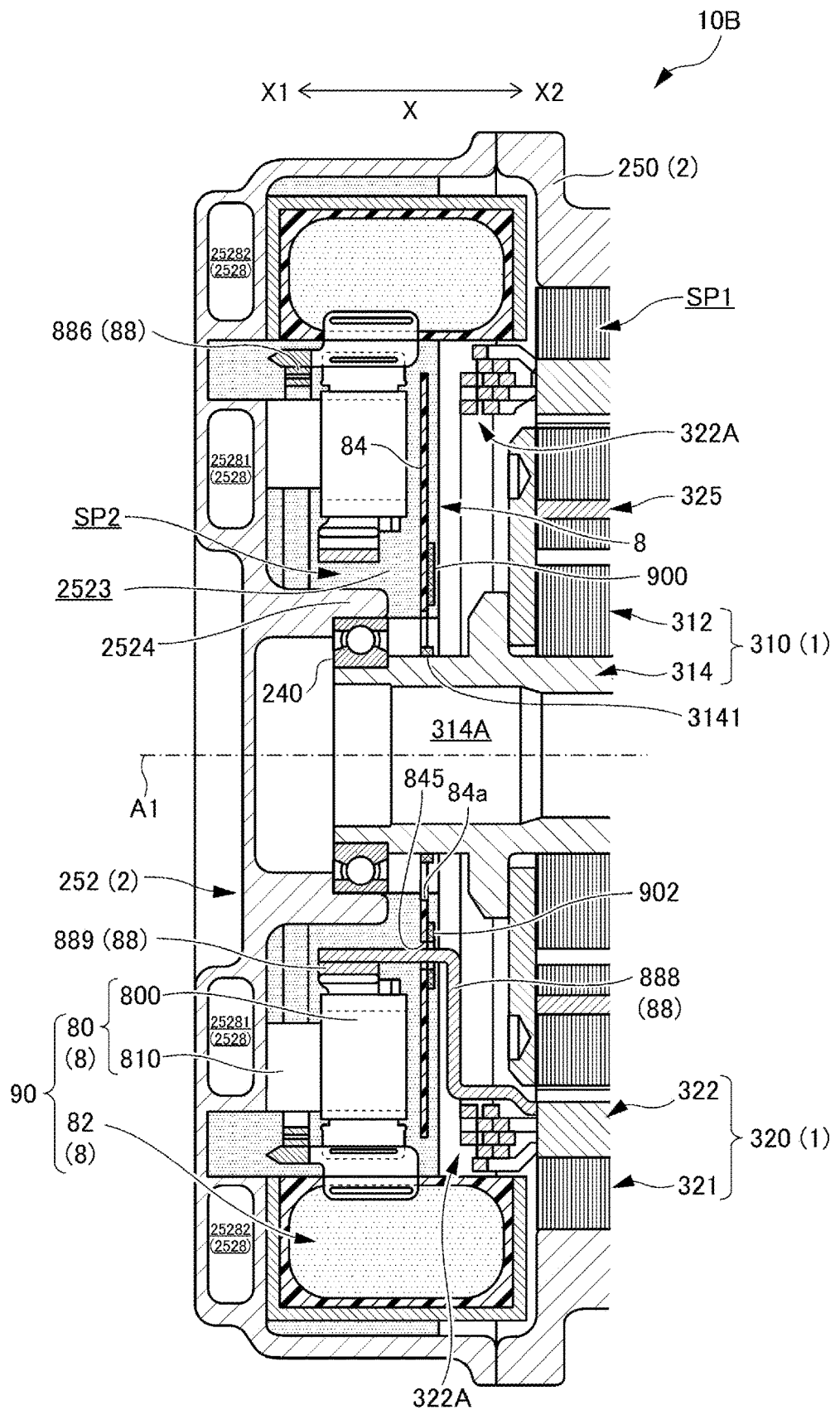
FIG. 3B is another sectional view schematically showing a coolant channel structure.
Figure 3C:
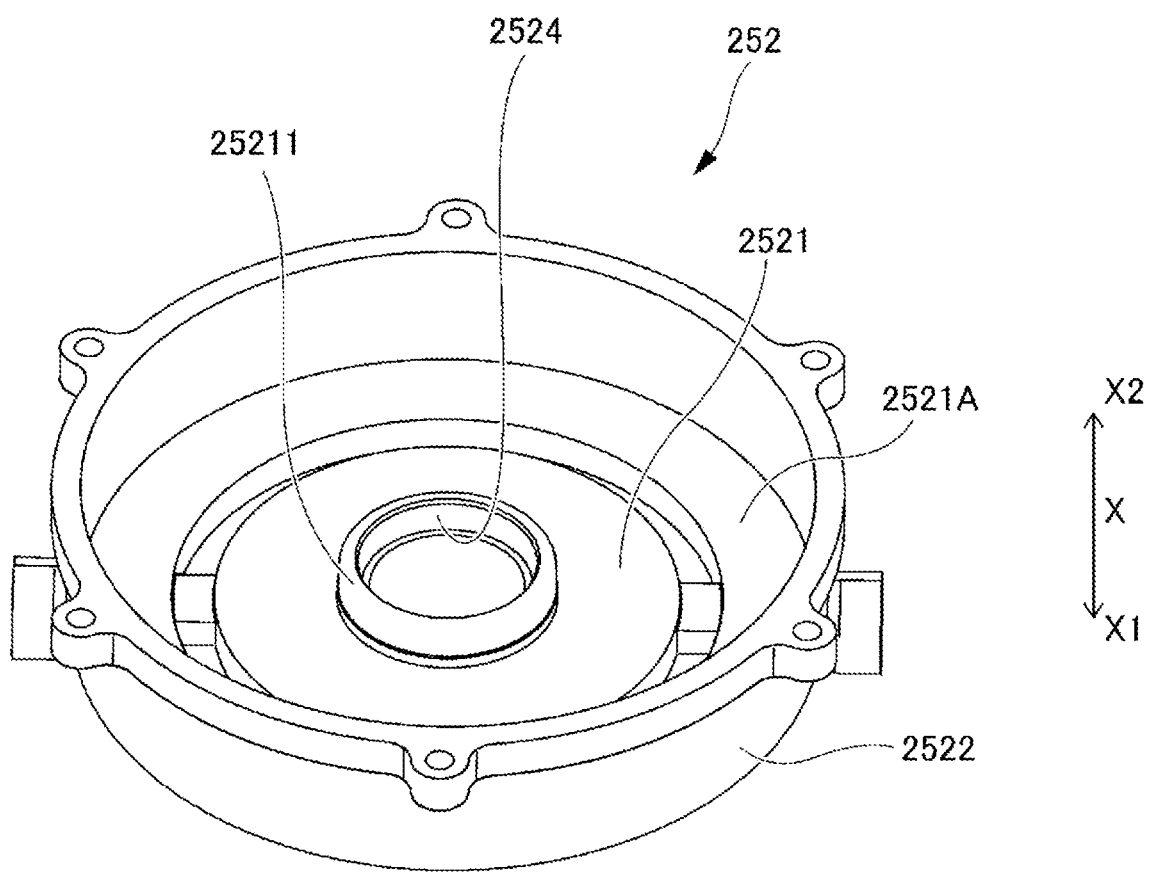
FIG. 3C is a perspective view of a cover member as viewed from the X2 side.
Figure 3D:
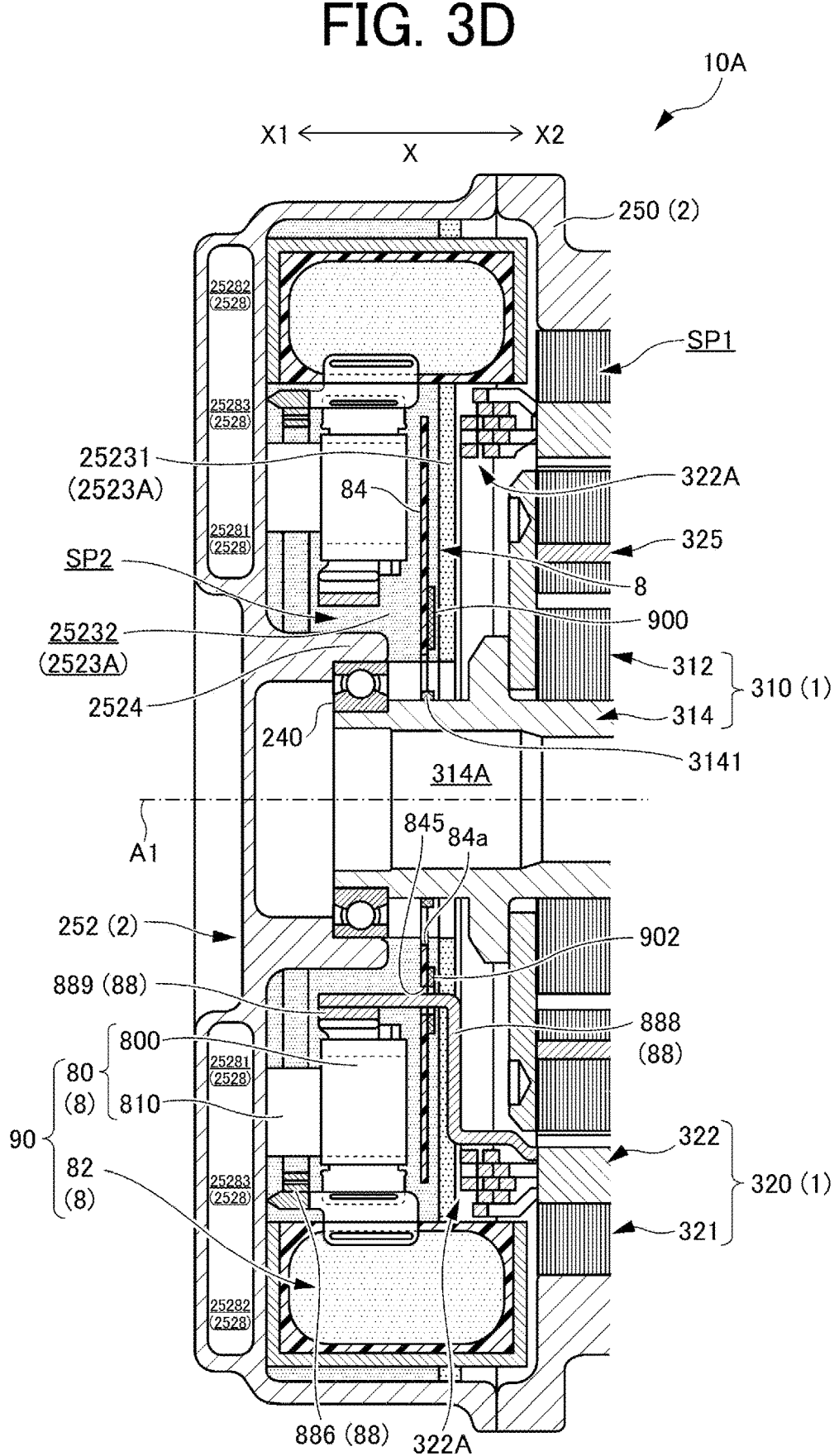
FIG. 3D is a schematic sectional view illustrating a layered structure of a molded resin portion according to a modification.
Figure 4:
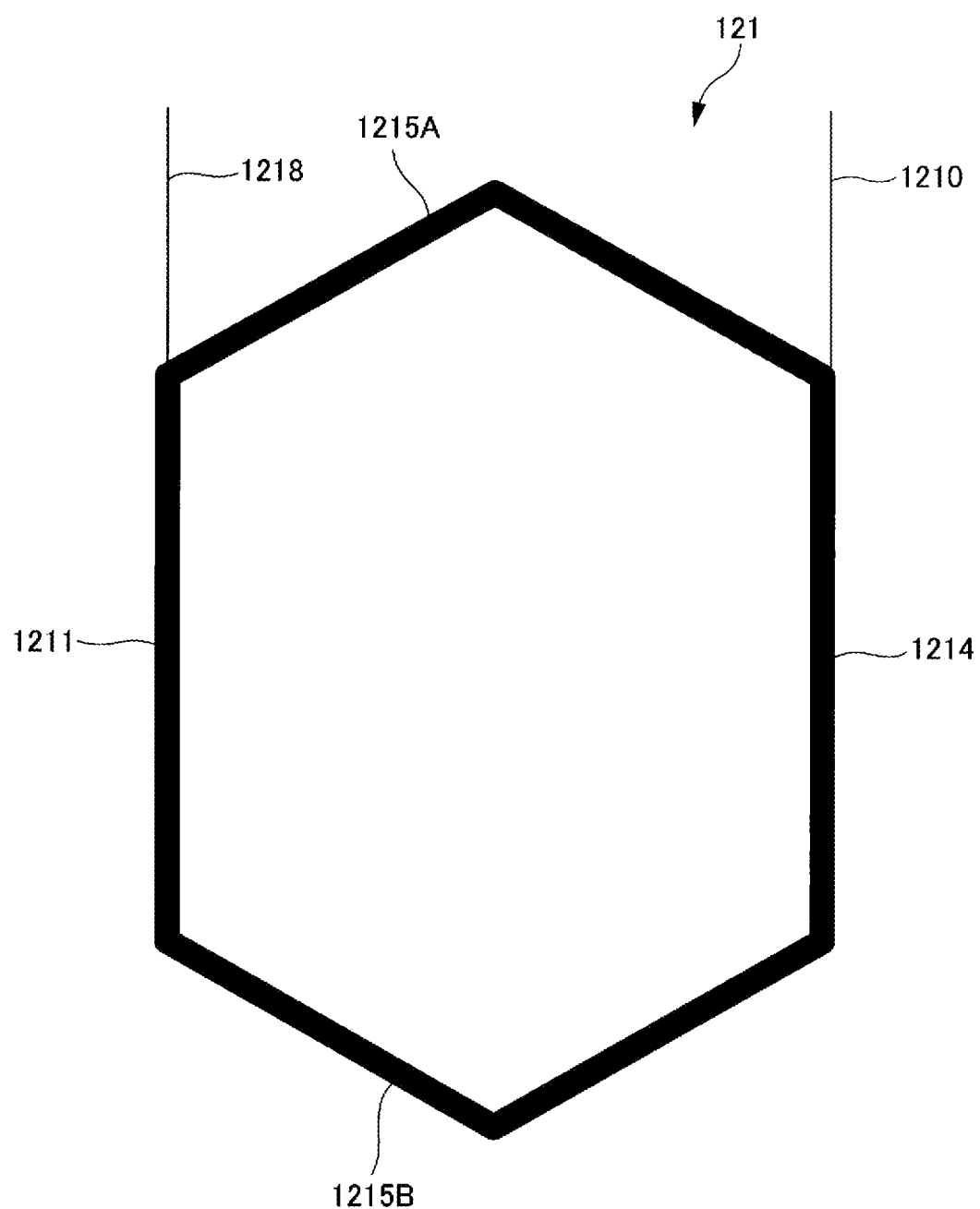
FIG. 4 is a diagram schematically showing an example of a coil side forming a stator coil.

FIG. 3A is a sectional view schematically showing a main part of the vehicle drive device 10 according to the present embodiment. FIG. 3A is a sectional view taken along a plane passing through the first axis A1 that is a rotation axis of the rotating electrical machine 1, and shows a part on one end side (X1 side) in the axial direction of the rotating electrical machine 1. In the following description, the axial direction refers to a direction in which the first axis A1 that is the rotation axis of the rotating electrical machine 1 extends, and the radial direction refers to a radial direction about the first axis A1, unless otherwise specified. Therefore, the outer side in the radial direction refers to a side away from the first axis A1, and the inner side in the radial direction refers to a side toward the first axis A1. The circumferential direction corresponds to a rotation direction about the first axis A1. In FIG. 3A, an X direction and X1 and X2 sides in the X direction are defined as in FIG. 2. In the following description, the terms "X1 side" and "X2 side" may be used to describe the relative positional relationship. FIG. 3B is another sectional view of the vehicle drive device 10 (sectional view taken along a line different from that of FIG. 3A) schematically showing a cooling channel structure. FIG. 3C is a perspective view of a cover member 252 as viewed from the X2 side. FIG. 3D is a schematic sectional view illustrating a layered structure of a molded resin portion 2523A according to a modification. FIG. 4 is a diagram schematically showing an example of a coil side 121 forming a stator coil 322.

The vehicle drive device 10 is mounted on a vehicle as part of the vehicle drive system 100, and as described above, generates a driving force for driving the vehicle forward or backward. The vehicle may be in any form. For example, the vehicle may be a four-wheeled automobile, or may be a bus, a truck, a two-wheeled vehicle, construction equipment, etc. The vehicle drive device 10 may be mounted on the vehicle together with other driving source (e.g., an internal combustion engine).

The rotating electrical machine 1 includes a rotor 310 and a stator 320. FIG. 3A shows a part on the one end side (X1 side) in the axial direction of the rotating electrical machine 1. The rotating electrical machine 1 is of an inner rotor type, and the stator 320 is provided so as to surround the radially outer side of the rotor 310. That is, the rotor 310 is disposed radially inward of the stator 320.

The rotor 310 includes a rotor core 312 and a shaft portion 314.

The rotor core 312 may be made of, for example, magnetic steel laminations having an annular shape. Permanent magnets 325 may be embedded in the rotor core 312. Alternatively, the permanent magnets 325 may be attached to the outer peripheral surface of the rotor core 312. The permanent magnets 325 may be arranged as appropriate. The rotor core 312 is fixed to the outer peripheral surface of the shaft portion 314 and rotates with the shaft portion 314.

The shaft portion 314 defines the first axis A1 that is the rotation axis of the rotating electrical machine 1. The shaft portion 314 is rotatably supported by the cover member 252 (described later) of the case 2 via a bearing 240 at a position on the X1 side with respect to part of the shaft portion 314 to which the rotor core 312 is fixed. The shaft portion 314 is rotatably supported by the case 2 via a bearing corresponding to the bearing 240 at a position on the other end side (X2 side) in the axial direction of the rotating electrical machine 1. The shaft portion 314 may be rotatably supported by the case 2 at its both axial ends in this manner.

The shaft portion 314 is in the form of, for example, a hollow pipe and has a hollow interior 314A. The hollow interior 314A may extend along the entire axial length of the shaft portion 314. The hollow interior 314A can serve as an axial oil passage. In this case, the shaft portion 314 may have oil holes for discharging oil to coil end portions 322A of the stator 320 etc.

The shaft portion 314 is provided with, at a position on the X1 side with respect to the part of the shaft portion 314 to which the rotor core 312 is fixed, a detected portion 3141 for a rotation angle sensor 900 for acquiring rotation angle information of the rotor 310. The rotation angle sensor 900 may be, for example, a rotary encoder using a sensor element such as a Hall element or a magnetoresistive element. In the present embodiment, the detected portion 3141 is adjacent to the X2 side in the axial direction of the bearing 240. When the sensor element of the rotation angle sensor 900 is a Hall element, the detected portion 3141 may be implemented by a permanent magnet provided on the outer peripheral portion of the shaft portion 314. In this case, the permanent magnet may be disposed so that the magnetic pole of the outer peripheral portion of the shaft portion 314 changes periodically in the circumferential direction, and a plurality of the sensor elements of the rotation angle sensor 900 may be arranged at equal pitches about the first axis A1 so as to face the detected portion 3141 in the radial direction. The detected portion 3141 may be in the shape of a ring attached to the shaft portion 314, or may be formed integrally with the shaft portion 314.

The stator 320 includes a stator core 321 and the stator coil 322.

The stator core 321 may be made of, for example, magnetic steel laminations having an annular shape. Teeth (not shown) protruding radially inward are formed in a radial pattern in the inner peripheral portion of the stator core 321.

The stator coil 322 may be, for example, in the form of a conductor with a rectangular section or a circular section and with an insulating coating. The stator coil 322 is wound around the teeth (not shown) of the stator core 321. For example, the stator coil 322 may be electrically connected by star connection or by delta connection in one or more parallel relationships.

The stator coil 322 includes the coil end portions 322A that are portions protruding axially outward from slots of the stator core 321. For example, the stator coil 322 may be implemented by attaching a plurality of the coil sides 121 shown in FIG. 4 to the stator core 321. In the example shown in FIG. 4, the coil side 121 includes slot insertion portions 1211, 1214 that are inserted into two slots, connecting portions 1215A, 1215B, and ends 1210, 1218. In this case, the connecting portions 1215A, 1215B and the ends 1210, 1218 form the coil end portions 322A. The stator coil 322 may be a coil in other form. For example, the stator coil 322 may be a coil in a form other than a cassette coil. In the following description, the coil end portion 322A refers to a portion of the stator coil 322 that extends on the one end side (X1 side) in the axial direction that is a lead side, out of the portions of the stator coils 322 that extend in the circumferential direction on both sides in the axial direction of the stator core 321.

The case 2 may be made of, for example, aluminum. The case 2 can be formed by casting etc. The case 2 includes a motor case 250 and the cover member 252. The case 2 houses the rotating electrical machine 1 and the motor drive device 8. In the case of the vehicle drive system 100 shown in FIG. 2, the case 2 may further house the drive transmission mechanism 7 as schematically shown in FIG. 2.

The motor case 250 forms a motor housing chamber SP1 that houses the rotating electrical machine 1. The motor housing chamber SP1 may be an oil-tight space containing oil for cooling and/or lubricating the rotating electrical machine 1 (and/or the drive transmission mechanism 7). The motor case 250 is in such a form that it includes a peripheral wall portion that surrounds the radially outer side of the rotating electrical machine 1. The motor case 250 may be implemented by connecting a plurality of members. The motor case 250 may be integrated, on the other end side (X2 side) in the axial direction, with another case member that houses the drive transmission mechanism 7.

The cover member 252 is connected to the one end side (X1 side) in the axial direction of the motor case 250. The cover member 252 is in the form of a cover that covers the one end side (X1 side) in the axial direction of the motor housing chamber SP1. In this case, the cover member 252 may cover the motor case 250 so as to completely or substantially completely close an opening on the one end side (X1 side) in the axial direction of the motor case 250.

The cover member 252 forms an inverter housing chamber SP2 that houses the motor drive device 8. Part of the inverter housing chamber SP2 may be formed by the motor case 250, and part of the motor housing chamber SP1 may be formed by the cover member 252.

The cover member 252 supports the motor drive device 8. For example, the motor drive device 8 may be in the form of module describe later and attached to the cover member 252. The cover member 252 and the motor case 250 can thus be connected after part or the whole of the motor drive device 8 is attached to the cover member 252. This improves the ease of attachment of the motor drive device 8.

The cover member 252 is provided with the bearing 240 that rotatably supports the rotor 310. That is, the cover member 252 includes a bearing support portion 2524 that supports the bearing 240. The bearing support portion 2524 refers to the entire axial range of the cover member 252 in which the bearing 240 is provided.

As shown in FIG. 3A, the bearing 240 is provided radially outward of the end on the X1 side of the shaft portion 314. Specifically, the radially outer side of an outer race of the bearing 240 is supported by the cover member 252, and the radially inner side of an inner race of the bearing 240 is supported by the outer peripheral surface of the shaft portion 314. In a modification, the radially inner side of the inner race of the bearing 240 may be supported by the cover member 252, and the radially outer side of the outer race of the bearing 240 may be supported by the inner peripheral surface of the shaft portion 314.

In the present embodiment, as shown in FIGS. 3A and 3C, the cover member 252 includes annular bottom portions 2521, 2521A about the first axis A1, and a peripheral wall portion 2522 protruding from the inner peripheral edge of the bottom portion 2521 toward the other end side (X2 side) in the axial direction. The bottom portion 2521 and the peripheral wall portion 2522 define the inverter housing chamber SP2. A cylindrical portion 25211 protruding toward the other end side (X2 side) in the axial direction is formed in the central portion (portion about the first axis A1) on the other end side (X2 side) in the axial direction of the bottom portion 2521. The bearing support portion 2524 is set in the cylindrical portion 25211. The cylindrical portion 25211 is formed concentrically about the first axis A1. A first coolant channel 25281 and a second coolant channel 25282 that will be described later may be formed in the bottom portions 2521, 2521A, respectively.

The inverter housing chamber SP2 may be a space, and is preferably sealed with a resin containing a relatively highly thermally conductive filler. That is, the cover member 252 preferably includes a thermally conductive molded resin portion 2523. In this case, the molded resin portion 2523 can have a function to seal and support the motor drive device 8 described later, a function to protect the motor drive device 8 from oil in the motor housing chamber SP1, and a function to transfer heat from the motor drive device 8 to the cover member 252. In FIG. 3A, elements (such as block assemblies 90 described later) sealed in the molded resin portion 2523 are shown in a see-through fashion. The range in which the molded resin portion 2523 is formed is not limited to the range shown in FIG. 3A etc. The molded resin portion 2523 may extend from the bottom portion 2521 side to a position closer to the X1 side, or may extend further toward the X2 side.

Like the molded resin portion 2523A of a vehicle drive device 10A according to the modification shown in FIG. 3D, the molded resin portion may have a layered structure made of a plurality of resin materials. Specifically, the molded resin portion 2523A has a layered structure in the axial direction that includes a first resin layer 25231 and a second resin layer 25232. In this case, preferably, the first resin layer 25231 is located on the side closer to the rotating electrical machine 1 (i.e., the X2 side) in the axial direction than the second resin layer 25232, and is less thermally conductive than the second resin layer 25232. For example, the first resin layer 25231 may be made of a relatively highly thermally insulating resin material (e.g., a foamed resin material), and the second resin layer 25232 may be made of a relatively highly thermally conductive resin material (e.g., a resin material containing a metal filler). With such a molded resin portion 2523A, it is possible to efficiently transfer heat from the motor drive device 8 to the cover member 252 while reducing reception of heat from the coil end portion 322A by the motor drive device 8. In this case, cooling of the coil end portion 322A may be implemented by another cooling system (e.g., an oil passage and/or a coolant channel in the motor case 250).

The molded resin portion 2523 also has a function to fix the motor drive device 8 including capacitor modules 82 etc. described later to the cover member 252. In this case, the molded resin portion 2523 may be formed so as to seal the entire capacitor modules 82.

The cover member 252 is preferably made of a relatively highly thermally conductive material (e.g., aluminum), and has a coolant channel 2528 inside. Water flows through the coolant channel 2528 as a coolant. Water may be, for example, water containing LLC (Long Life Coolant). In this case, the coolant flowing through the coolant channel 2528 can be kept at a relatively low temperature as it radiates heat through a radiator (not shown) mounted on the vehicle. When the coolant flows through the coolant channel 2528 of the cover member 252, the coolant takes away the heat of the cover member 252 to cool the cover member 252. The cover member 252 can thus have a function to cool the motor drive device 8 disposed adjacent to the cover member 252 in the axial direction. That is, the heat from the motor drive device 8 is removed by the coolant via the cover member 252, and the cooling of the motor drive device 8 is facilitated. Such a cooling function can further be enhanced by the molded resin portion 2523 described above. In a modification, other cooling medium (e.g., oil) may be used instead of the coolant.

The coolant channel 2528 may have any shape as viewed in the axial direction. For example, the coolant channel 2528 may have an annular shape, a spiral shape, or a meandering shape extending in the circumferential direction while meandering radially outward and inward. Fins etc. may be formed in the coolant channel 2528. When the cover member 252 is manufactured using a core etc., the flexibility in the shape of the coolant channel 2528 etc. can be increased.

In the present embodiment, as shown in FIG. 3B, the coolant channel 2528 includes the first coolant channel 25281 and the second coolant channel 25282. The first coolant channel 25281 has an annular shape as viewed in the axial direction, and faces power modules 80 (described later) as viewed in the axial direction. The power modules 80 can therefore be cooled along the entire circumference of the first coolant channel 25281. The second coolant channel 25282 has an annular shape as viewed in the axial direction, and faces the capacitor modules 82 (described later) as viewed in the axial direction. The capacitor modules 82 can therefore be cooled along the entire circumference of the second coolant channel 25282. The first coolant channel 25281 and the second coolant channel 25282 communicate with each other through a radial connection channel 25283 (see FIG. 3A). The first coolant channel 25281 is preferably disposed upstream of (closer to the discharge side of a water pump, not shown, than) the second coolant channel 25282. That is, an inlet portion (inlet portion formed in the cover member 252) (not shown) to the coolant channel 2528 is preferably connected to the first coolant channel 25281. According to such a configuration, submodules 800 (power semiconductor chips 801, 802) (described later) of the power modules 80 that are more likely to become hot than the capacitor modules 82 can be efficiently cooled by the coolant (relatively fresh coolant) in the first coolant channel 25281 located upstream of the second coolant channel 25282.

The motor drive device 8 includes the inverter INV, the smoothing capacitor C, the control device 500, etc. described above. The elements of the motor drive device 8 will be described in detail later with reference to FIGS. 6 to 13.

As shown in FIG. 3A, the motor drive device 8 is disposed between the cover member 252 and the rotating electrical machine 1 in the axial direction. That is, the motor drive device 8 is disposed in the inverter housing chamber SP2.

Figure 5:
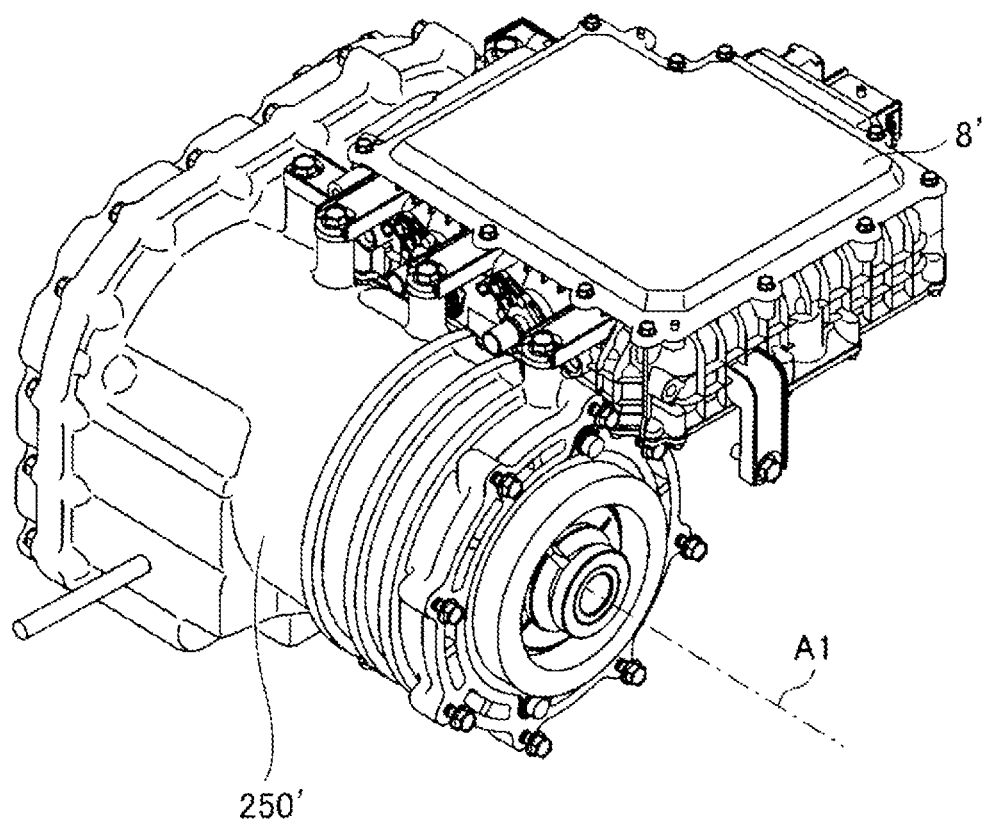
FIG. 5 is a diagram illustrating a comparative example.

As described above, according to the present embodiment, the motor drive device 8 is disposed between the cover member 252 and the rotating electrical machine 1. The overall size of the vehicle drive device 10 can therefore be reduced compared to the case where a motor drive device 8' is mounted outside a motor case 250' (see FIG. 5).

In particular, according to the present embodiment, the axial size of the vehicle drive device 10 can be reduced by providing the cover member 252 with the bearing support portion 2524 and disposing the motor drive device 8 between the cover member 252 and the rotating electrical machine 1 in the axial direction. Specifically, when the motor drive device 8 is provided on the X1 side with respect to the cover member 252 in the axial direction, a separate cover member is required to cover the X1 side of the motor drive device 8. The axial size of the vehicle drive device 10 therefore tends to increase accordingly. In this regard, according to the present embodiment, the cover member 252 can serve as a cover on the X1 side not only for the rotating electrical machine 1 but also for the motor drive device 8. The axial size of the vehicle drive device 10 can therefore be reduced.

Moreover, in the present embodiment, the bearing support portion 2524 of the cover member 252 is disposed radially inward of the motor drive device 8 (power modules 80, capacitor modules 82, etc. described later) as viewed in the axial direction, and overlaps the motor drive device 8 as viewed in the radial direction. The motor drive device 8 can thus be disposed between the cover member 252 and the rotating electrical machine 1 in the axial direction while reducing the axial dimension of the cover member 252 (dimension from the bearing support portion 2524 toward the X2 side). As a result, the axial size of the vehicle drive device 10 can be more effectively reduced.

According to the present embodiment, a bracket having a bearing support portion corresponding to the bearing support portion 2524 is not provided between the motor drive device 8 and the rotating electrical machine 1 in the axial direction. Therefore, the number of components can be reduced and the axial distance between the motor drive device 8 and the rotating electrical machine 1 can be reduced compared to the configuration in which such a bracket is provided. The axial size of the vehicle drive device 10 can thus be reduced as described above. Since there is no wall portion (bracket) separating the motor drive device 8 and the rotating electrical machine 1 in the axial direction, the wiring length between the motor drive device 8 and the rotating electrical machine 1 can be reduced, and the wiring efficiency between the motor drive device 8 and the rotating electrical machine 1 can be increased.

According to the present embodiment, when the coolant channel 2528 is formed in the cover member 252, the cover member 252 can be thermally connected (connected in a thermally conductive manner) to the motor drive device 8. That is, the motor drive device 8 can be cooled by the coolant in the coolant channel 2528 via the cover member 252. Since the coolant can stably flow through the coolant channel 2528, the cooling of the motor drive device 8 can be stabilized. In the case where the flow rate of the coolant can be controlled, the cooling can be optimized according to the state of the motor drive device 8.

According to the present embodiment, since the axial distance between the motor drive device 8 and the rotating electrical machine 1 is reduced, not only the motor drive device 8 but also part of the rotating electrical machine 1 can be cooled by the cover member 252 (cover member 252 with the coolant channel 2528). For example, the molded resin portion 2523 described above may be thermally connected to the stator coil 322 of the rotating electrical machine 1. Specifically, by disposing the molded resin portion 2523 in contact with or close to the coil end portion 322A of the rotating electrical machine 1, the coil end portion 322A can be cooled by the coolant in the coolant channel 2528 via the molded resin portion 2523 and the cover member 252.

Next, a specific example of the motor drive device 8 will be described with reference to FIGS. 6 to 13.

Figure 6:
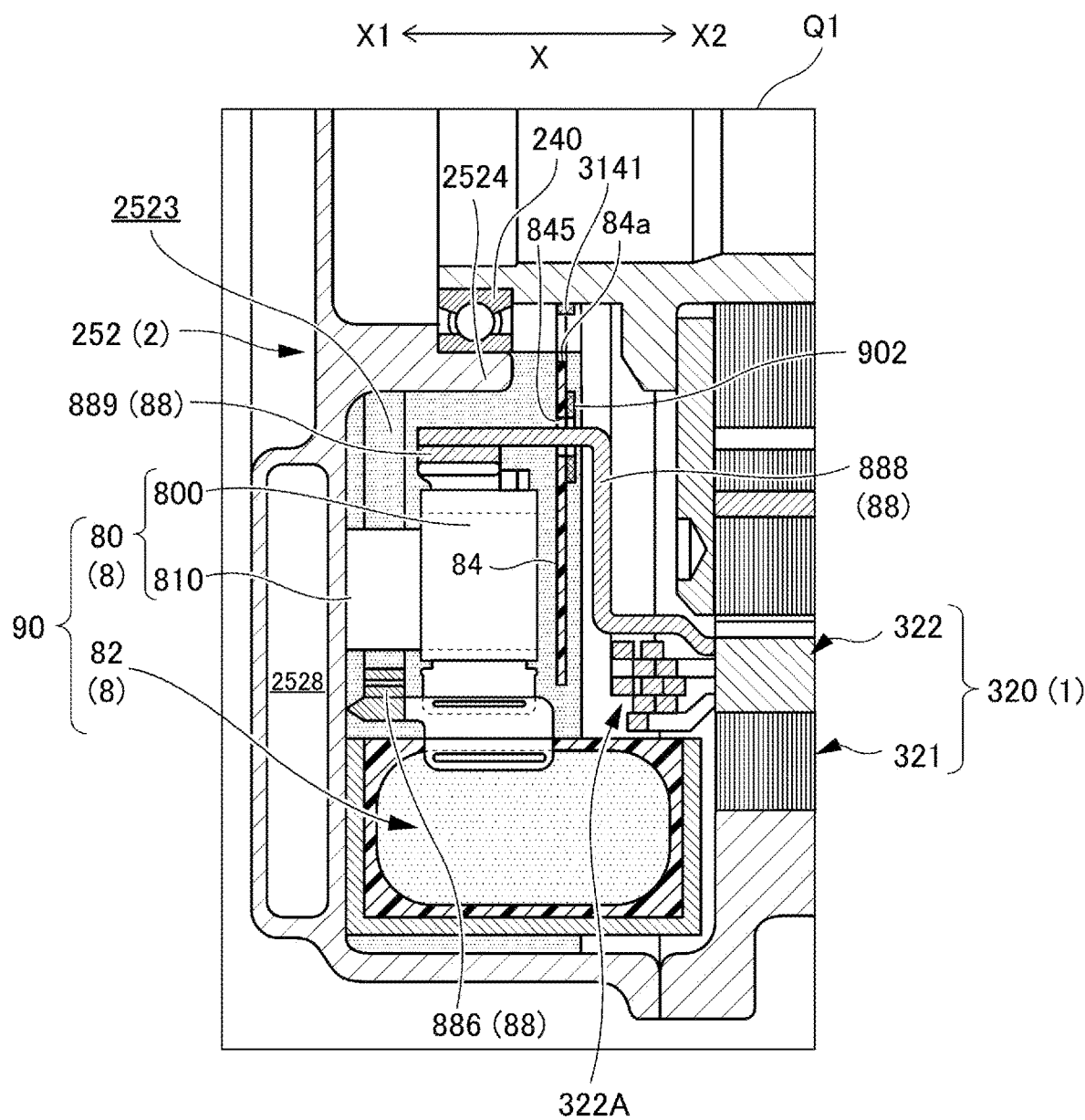
FIG. 6 is an enlarged view of a portion Q1 in FIG. 3A.
Figure 7:
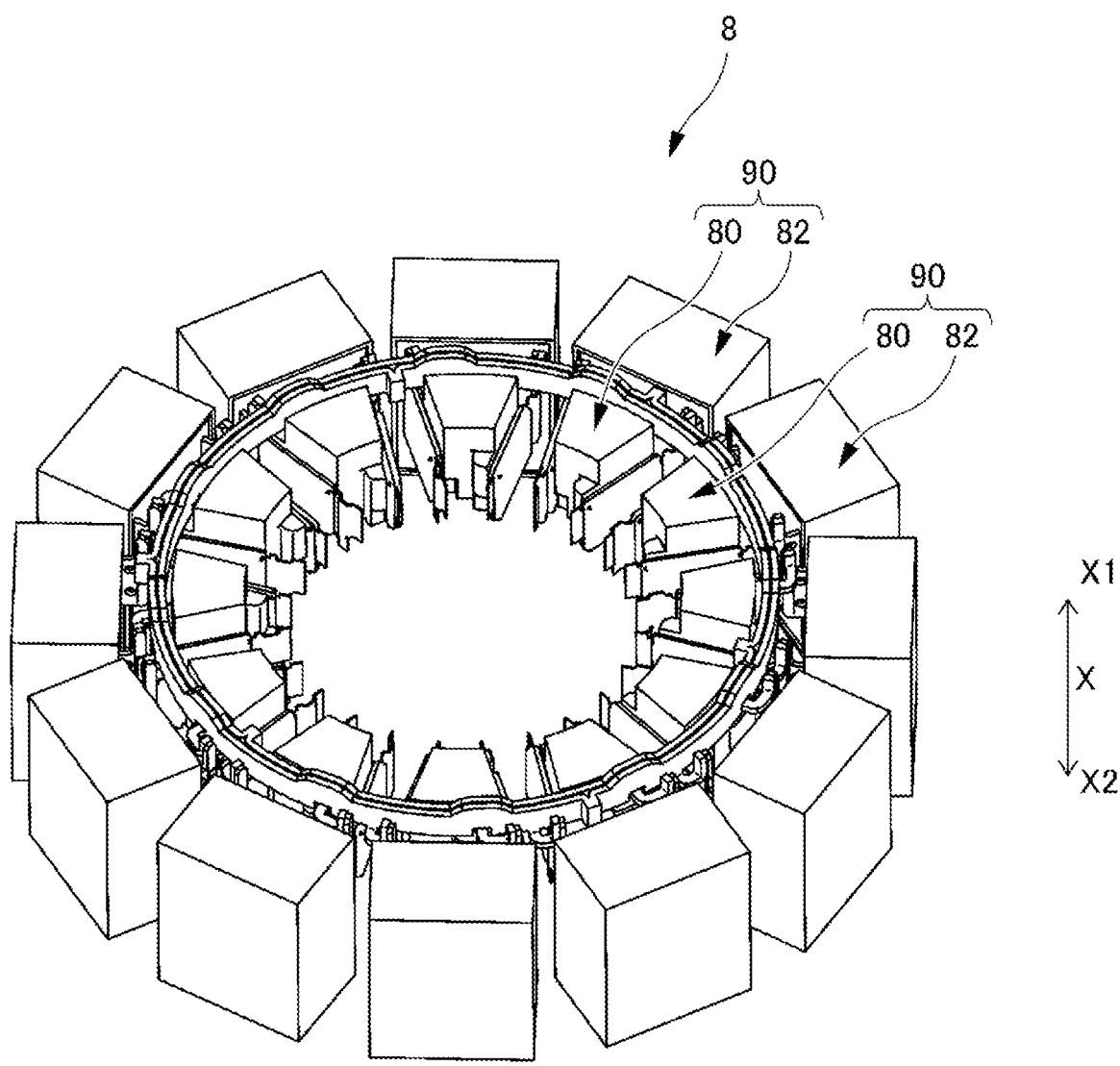
FIG. 7 is a perspective view of a motor drive device according to the first embodiment as viewed from the X1 side.
Figure 8:
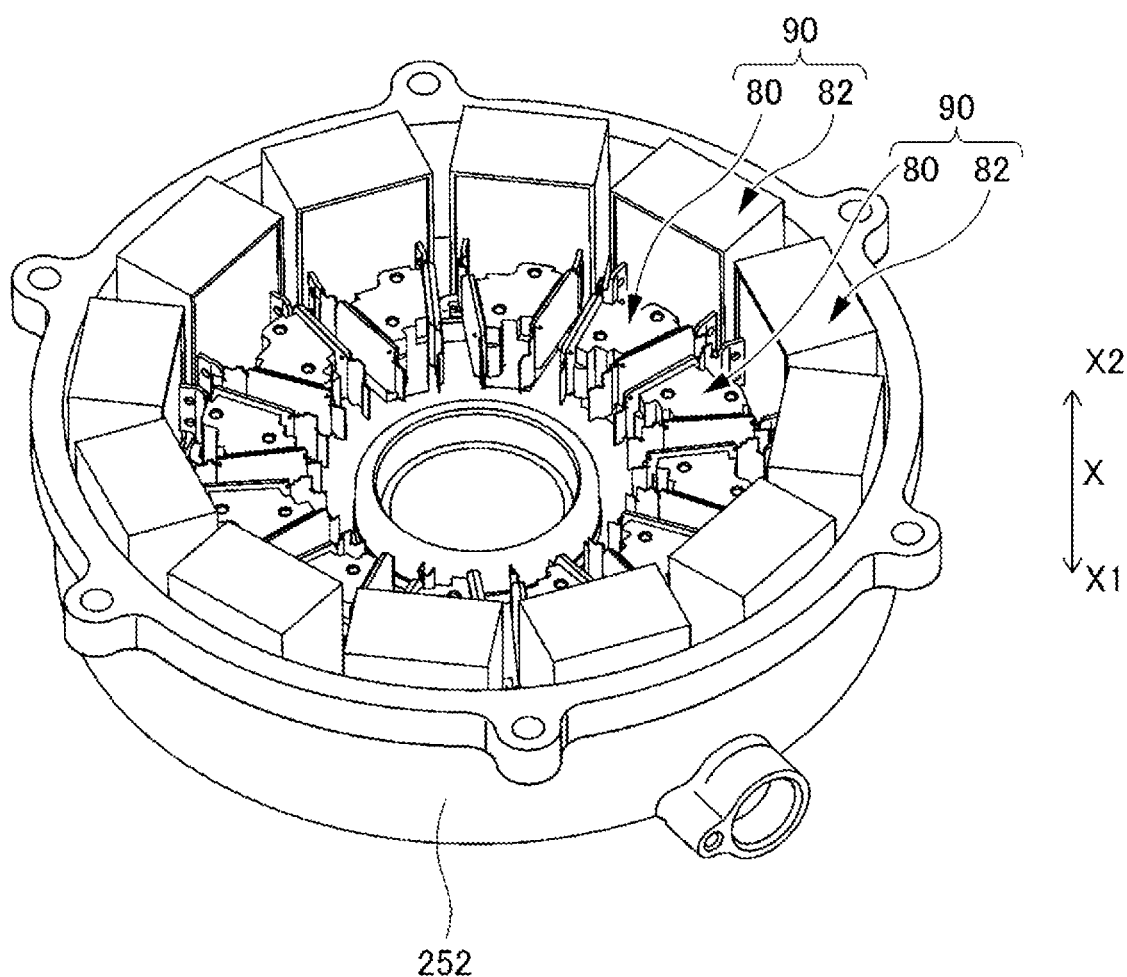
FIG. 8 is a perspective view of power modules and capacitor modules both disposed in the cover member according to the first embodiment, as viewed from the X2 side.
Figure 9:
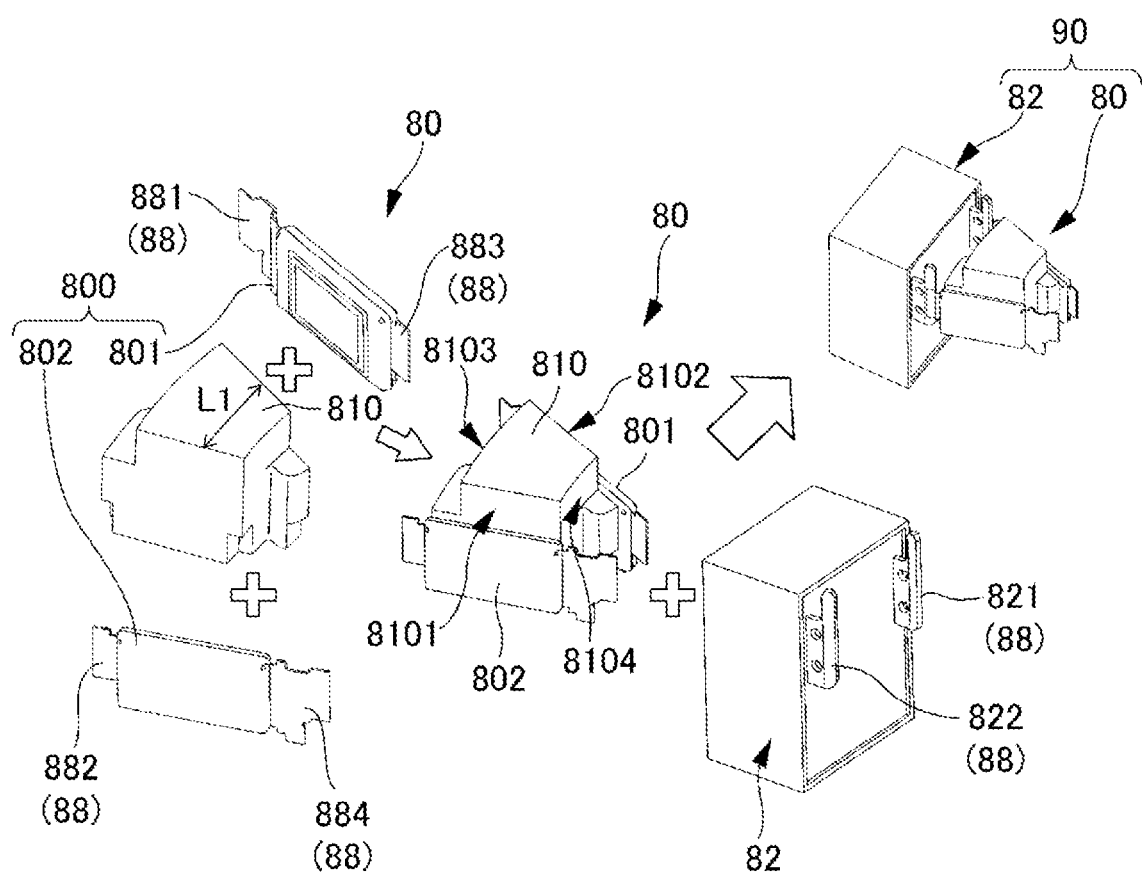
FIG. 9 is a diagram illustrating the configurations of the power module and the capacitor module and the ease of assembly according to the first embodiment.
Figure 10:
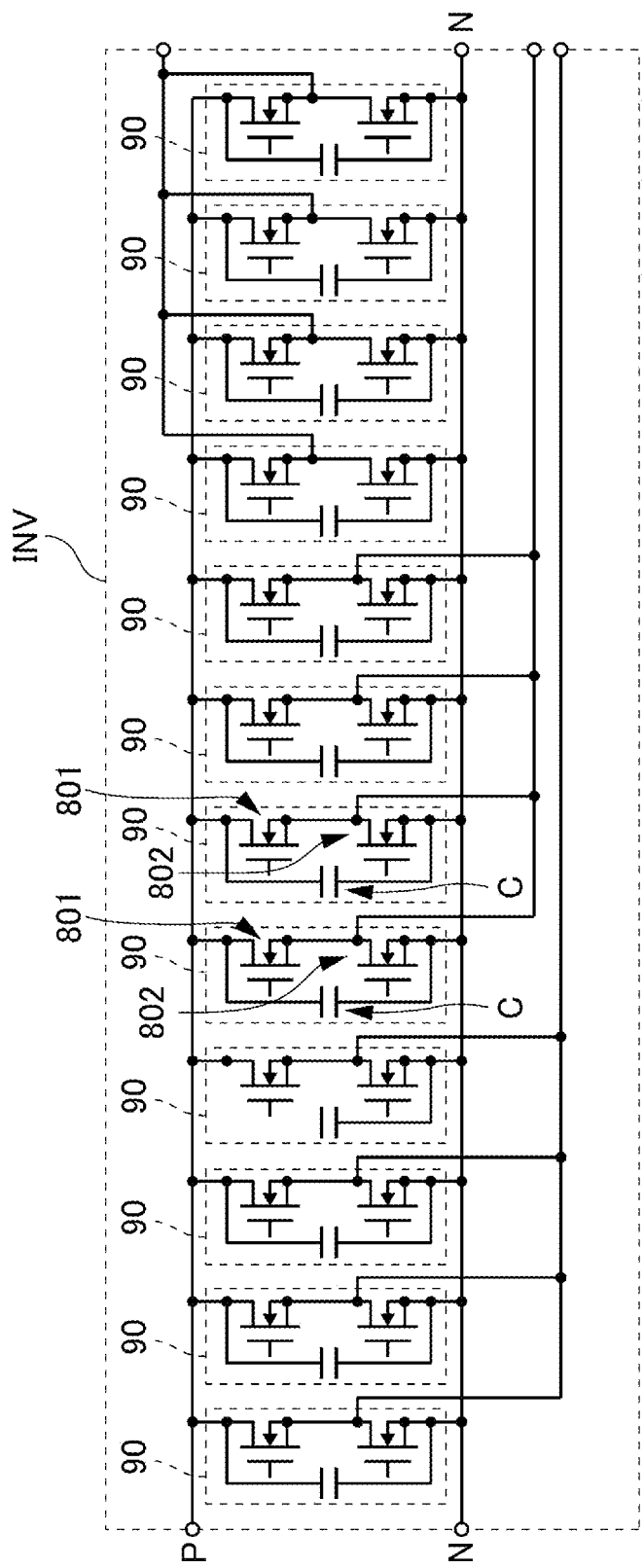
FIG. 10 is a diagram illustrating an electrical circuit formed by block assemblies according to the first embodiment.
Figure 11:
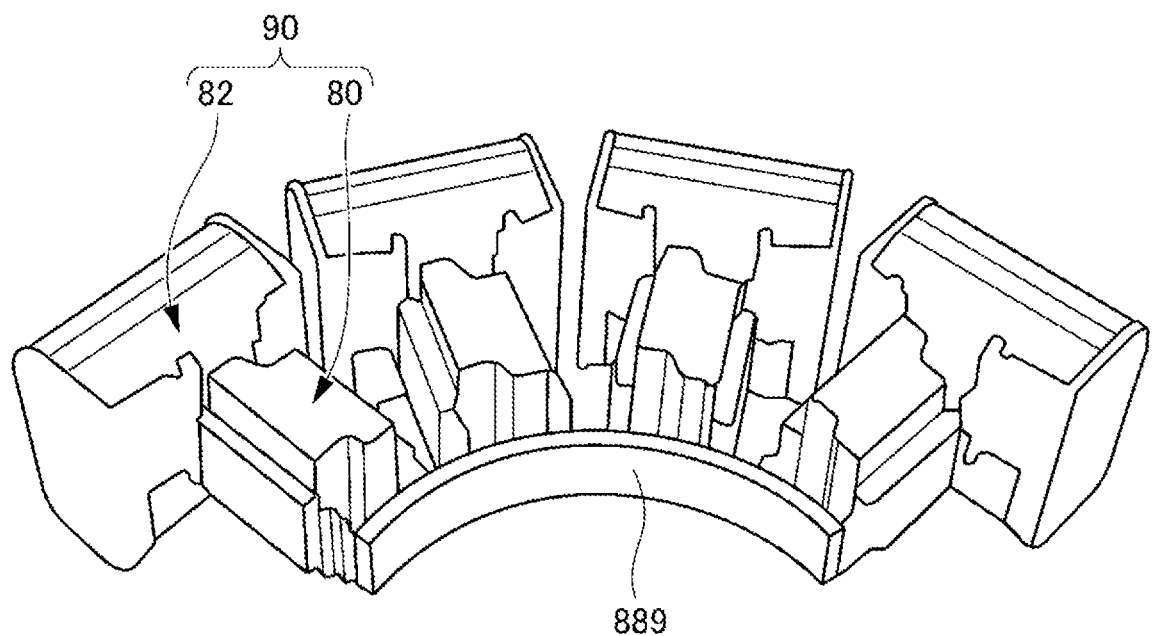
FIG. 11 is a schematic diagram showing an example of a method for electrically connecting the rotating electrical machine and the block assemblies according to the first embodiment.
Figure 12:
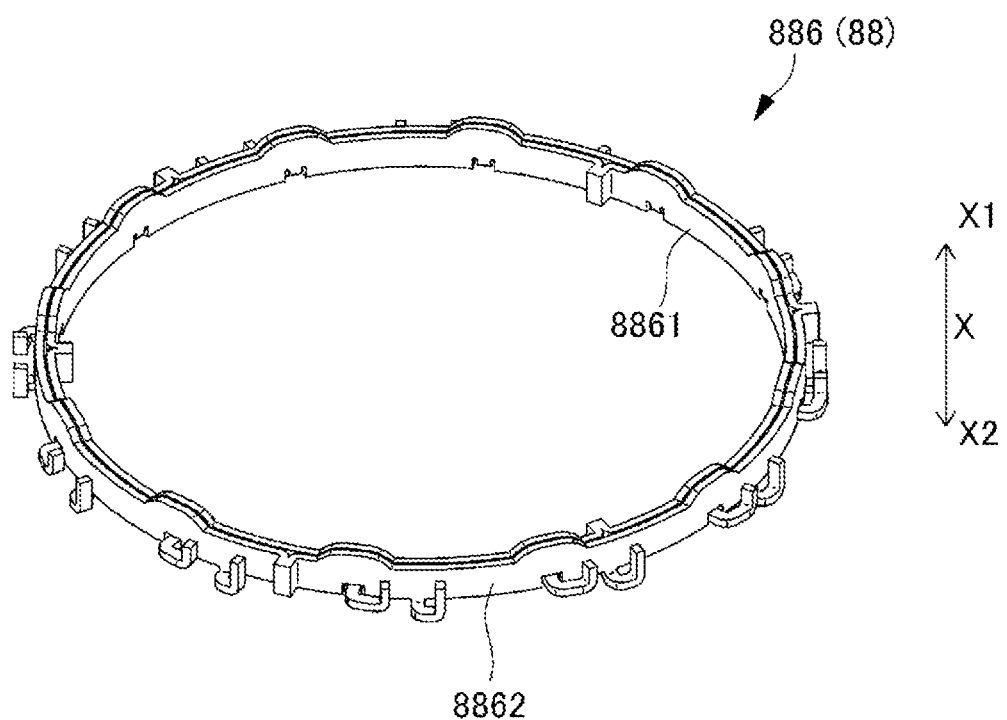
FIG. 12 is a perspective view of a power supply busbar of a wiring portion of the motor drive device according to the first embodiment as viewed from the X1 side.
Figure 13:
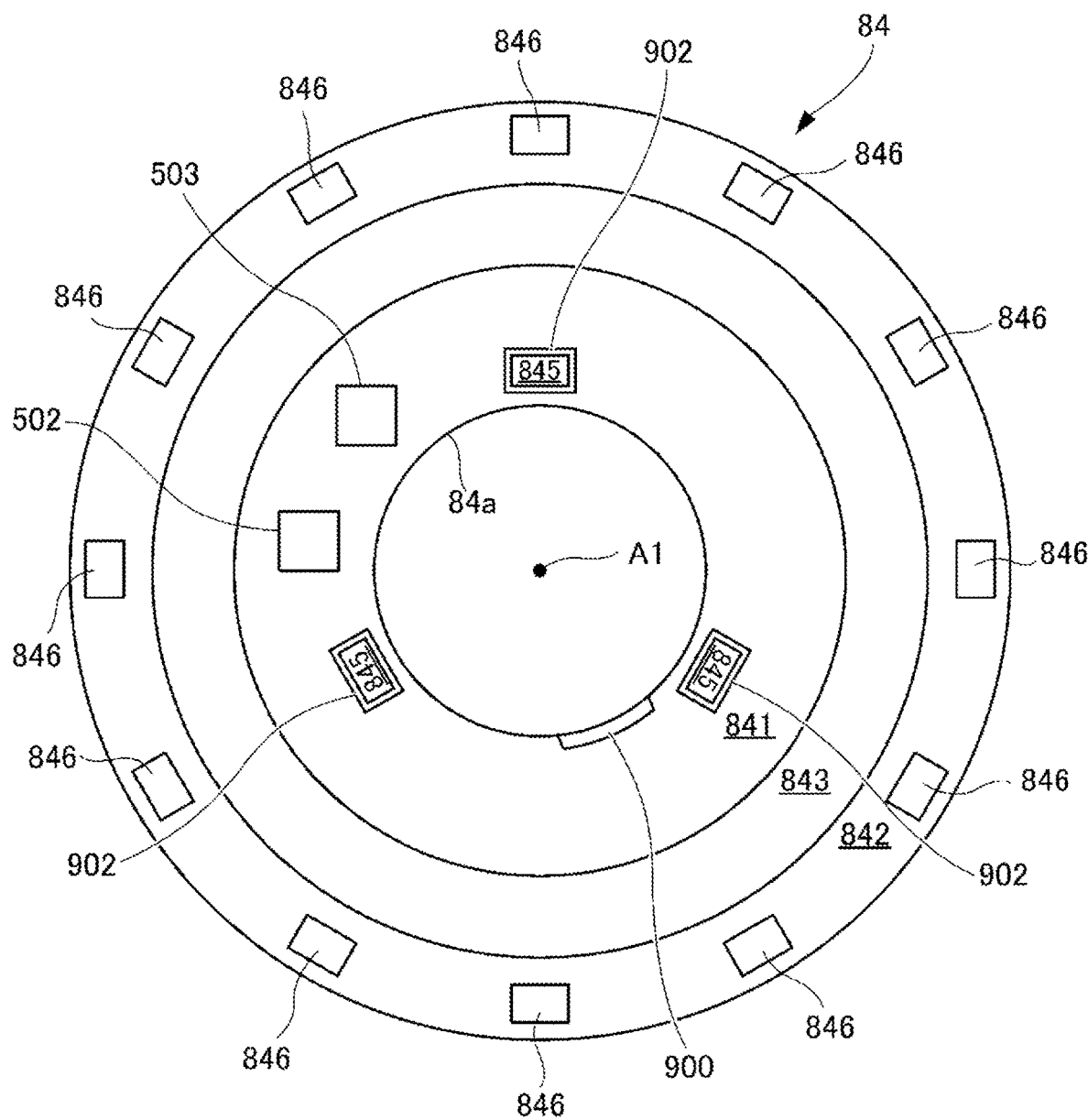
FIG. 13 is a plan view schematically showing a control board according to the first embodiment.

FIG. 6 is an enlarged view of a portion Q1 in FIG. 3A. FIG. 7 is a perspective view of the motor drive device 8 as viewed from the X1 side. FIG. 8 is a perspective view of the power modules 80 and the capacitor modules 82 both disposed in the cover member 252, as viewed from the X2 side. FIG. 9 is a diagram illustrating the configurations of the power module 80 and the capacitor module 82 and the ease of assembly. FIG. 10 is a diagram illustrating an electrical circuit formed by the block assemblies 90. FIG. 11 is a schematic diagram showing an example of a method for electrically connecting the rotating electrical machine 1 and the block assemblies 90. FIG. 12 is a perspective view of a power supply busbar 886 of a wiring portion 88 of the motor drive device 8 as viewed from the X1 side. FIG. 13 is a plan view schematically showing a control board 84.

The motor drive device 8 includes the power modules 80, the capacitor modules 82, the control board 84, and the wiring portion 88. The control board 84 and part of the wiring portion 88 (lead wires 888, relay busbars 889, etc.) is not shown in FIG. 7.

In the present embodiment, as shown in FIG. 7, a plurality of sets of the power modules 80 and the capacitor modules 82 (12 sets in the example shown in FIG. 7) is arranged in the circumferential direction. The number of sets of the power modules 80 and the capacitor modules 82 is changed according to the specifications of the rotating electrical machine 1. Basically, the power of the rotating electrical machine 1 increases as the number of sets of the power modules 80 and the capacitor modules 82 increases. Therefore, a plurality of variations with different numbers of sets of the power modules 80 and the capacitor modules 82 can be set when designing the rotating electrical machine 1.

The sets of the power modules 80 and the capacitor modules 82 are preferably arranged at equal pitches in the circumferential direction. For example, in the example shown in FIG. 7, the number of sets of the power modules 80 and the capacitor modules 82 is 12, and the 12 sets are arranged at a pitch of 30°. The temperature distribution in the circumferential direction due to heat from the power modules 80 and the capacitor modules 82 can thus be made uniform. In a modification, different pitches may be used.

Each of the plurality of sets of the power modules 80 and the capacitor modules 82 is preferably in the form of an integrated assembly. That is, each set of the power module 80 and the capacitor module 82 forms the integrated block assembly 90. FIG. 9 schematically shows a method for forming the block assembly 90 from one set. In this case, the power module 80 and the capacitor module 82 can be attached in a sub-assembled state to the cover member 252 (see FIG. 8). The ease of assembly is thus improved. Specifically, the assembling method can include the step of attaching the motor drive device 8 to the cover member 252 and the step of attaching, to the motor case 250, the cover member 252 with the motor drive device 8 attached thereto. Excellent workability is achieved in the step of attaching the motor drive device 8 to the cover member 252, because the power module 80 and the capacitor module 82 can be attached in the sub-assembled state to the cover member 252. The step of attaching the motor drive device 8 to the cover member 252 may include the step of forming the molded resin portion 2523 described above. The motor drive device 8 and the cover member 252 are thus firmly connected to each other. Therefore, excellent workability is also achieved in the step of attaching, to the motor case 250, the cover member 252 with the motor drive device 8 attached thereto.

In the block assemblies 90, the power modules 80 have the same configuration and the capacitor modules 82 have the same configuration (electrical characteristics, shape, etc.). Therefore, replacement and maintenance can be performed for each block assembly 90. The versatility can thus be increased. In the present embodiment, the power module 80 in each block assembly 90 includes the submodule 800 and a heat dissipation member 810. In this case, in the block assemblies 90, the submodules 800 have the same configuration (electrical characteristics, shape, etc.) and the heat dissipation members 810 have the same configuration (material, shape, etc.). This improves the ease of assembly because there is no need to consider which block assembly 90 should be disposed at which position in the circumferential direction when arranging the plurality of block assemblies 90 in the circumferential direction. The "same electrical characteristics" means that there is no significant difference in electrical characteristics, and is a concept that ignores minor differences due to variations among individual components. The electrical characteristics may be any characteristics. For example, the electrical characteristics of the capacitor module 82 may be a rated capacity etc., and the electrical characteristics of the submodule 800 (power semiconductor chips 801, 802) may be a gate threshold voltage etc. Similarly, the "same shape" means that there is no significant difference in shape, and is a concept that ignores minor differences due to variations among individual components (e.g., dimensional differences within a tolerance).

For example, of the 12 block assemblies 90, four U-phase block assemblies 90 may be disposed adjacent to each other in the circumferential direction as a group, four V-phase block assemblies 90 may be disposed adjacent to each other in the circumferential direction as a group, and four W-phase block assemblies 90 may be disposed adjacent to each other in the circumferential direction as a group. In this case, the number of relay busbars 889 described later can be reduced. Alternatively, the U-phase block assemblies 90, the V-phase block assemblies 90, and the W-phase block assemblies 90 may be arranged in a periodic pattern of one or two block assemblies 90 of each phase in the circumferential direction.

Each submodule 800 forms upper and lower arms for one phase in the inverter INV (see FIG. 1). Therefore, each set of upper and lower arms can be formed as a submodule, and the wiring efficiency is improved. Specifically, of the 12 sets, each of the submodules 800 of the power modules 80 in four sets forms upper and lower arms for the U phase, each of the submodules 800 of the power modules 80 in another four sets forms upper and lower arms for the V-phase, and each of the submodules 800 of the power modules 80 in still another four sets forms upper and lower arms for the W-phase.

In each block assembly 90, the submodule 800 includes a pair of the power semiconductor chips 801, 802. Specifically, the pair of power semiconductor chips 801, 802 consists of the power semiconductor chip 801 forming an upper arm on the high potential side (see "P" in FIG. 10) and the power semiconductor chip 802 forming a lower arm on the low potential side (see "N" in FIG. 10). Each of the power semiconductor chips 801, 802 includes the power switching element described above.

The power semiconductor chip 801 and the power semiconductor chip 802 are preferably integrated with the heat dissipation member 810 as shown in FIG. 9. The power module 80 described above thus integrally includes the heat dissipation member 810, and the heat of the pair of power semiconductor chips 801, 802 can be efficiently dissipated through the heat dissipation member 810. The ease of assembly can also be increased compared to the case where the pair of power semiconductor chips 801, 802 and the heat dissipation member 810 are separately attached to the cover member 252 or the capacitor module 82.

As shown in FIG. 9, the power semiconductor chip 801 and the power semiconductor chip 802 include busbars 881, 882, 883, and 884 as part of the wiring portion 88. The busbar 881 integrated with the power semiconductor chip 801 electrically connects the power semiconductor chip 801 and the capacitor module 82 (e.g., a capacitor busbar 821 in FIG. 9). The busbar 883 integrated with the power semiconductor chip 801 protrudes toward the side on which a radially inner connection surface 8104 of the heat dissipation member 810 is located, and electrically connects the power semiconductor chip 801 and the stator coil 322 of a corresponding phase in the rotating electrical machine 1 (e.g., the end 1210 or 1218 of the coil side 121 shown in FIG. 4). Similarly, the busbar 882 integrated with the power semiconductor chip 802 electrically connects the power semiconductor chip 802 and the capacitor module 82 (e.g., a capacitor busbar 822 in FIG. 9). The busbar 884 integrated with the power semiconductor chip 802 protrudes toward the side on which the radially inner connection surface 8104 of the heat dissipation member 810 is located, and electrically connects the power semiconductor chip 802 and the stator coil 322 of a corresponding phase in the rotating electrical machine 1 (the end 1210 or 1218 of the coil side 121 shown in FIG. 4).

In the present embodiment, the pair of power semiconductor chips 801, 802 is joined to circumferential side faces 8101, 8102 of the heat dissipation member 810. At this time, the power semiconductor chip 801 is joined to the side face (surface) 8102 on one side in the circumferential direction of the heat dissipation member 810, and the power semiconductor chip 802 is joined to the side face (surface) 8101 on the other side in the circumferential direction of the heat dissipation member 810. Any joining method may be used, and a relatively highly thermally conductive adhesive material etc. may be used. The heat dissipation member 810 can thus efficiently receive heat from the pair of power semiconductor chips 801, 802 via the circumferential side faces. Moreover, the spaces between the heat dissipation members 810 located adjacent to each other in the circumferential direction can be efficiently used to dispose the pair of power semiconductor chips 801, 802. By disposing the power semiconductor chips 801, 802 of the upper and lower arms on the different side faces (circumferential side faces) 8101, 8102 of the heat dissipation member 810, the power semiconductor chips 801, 802 of the upper and lower arms can be efficiently electrically connected to each other on the radially inner side via the busbars 883, 884 and the relay busbar 889. In addition, the power semiconductor chips 801, 802 of the upper and lower arms can be efficiently electrically connected to the capacitor module 82 (and the power supply Va) on the radially outer side (on the side on which a radially outer connection surface 8103 of the heat dissipation member 810 is located).

The heat dissipation member 810 is made of a relatively highly thermally conductive material (e.g., aluminum). In the present embodiment, the heat dissipation member 810 is in the form of a solid block. The heat capacity of the heat dissipation member 810 can thus be efficiently increased.

The heat dissipation member 810 has a function to efficiently receive heat from the submodule 800 and efficiently transfer the received heat to the cover member 252 (and the coolant in the coolant channel 2528).

In the present embodiment, the pair of power semiconductor chips 801, 802 is joined to the circumferential side faces of the heat dissipation member 810, as described above. Therefore, axial surfaces of the heat dissipation member 810 (e.g., the surface on the X1 side) are free. Accordingly, the heat dissipation member 810 can be disposed close to or in contact with the cover member 252 (and therefore the coolant channel 2528) in the axial direction. In this case, the heat of the pair of power semiconductor chips 801, 802 can be efficiently transferred to the cover member 252 (and therefore the coolant in the coolant channel 2528) via the heat dissipation member 810. The surface on the other side (X2 side) in the axial direction of the heat dissipation member 810 may be used to, for example, cool elements on the control board 84.

In the present embodiment, as shown in FIG. 6, the heat dissipation member 810 contacts the cover member 252 in the axial direction. Accordingly, the heat of the heat dissipation member 810 can be efficiently transferred to the cover member 252 (and therefore the coolant in the coolant channel 2528). The heat dissipation member 810 overlaps the coolant channel 2528 as viewed in the axial direction. Accordingly, the heat of the heat dissipation member 810 can be more efficiently transferred to the cover member 252 (and therefore the coolant in the coolant channel 2528).

As shown in FIG. 7, the heat dissipation member 810 preferably has such a tapered shape that the circumferential width of the heat dissipation member 810 decreases toward its radially inner side as viewed in the axial direction. That is, the distance L1 between the circumferential side faces of the heat dissipation member 810 to which the pair of power semiconductor chips 801, 802 is joined is preferably shorter on the side closer to the first axis A1 in the radial direction than on the side farther away from the first axis A1 in the radial direction. With this configuration, the heat dissipation member 810 can be disposed radially inward of the capacitor module 82, and also, the arrangement of the heat dissipation members 810 can be relatively easily implemented even when a relatively large number of sets of the power modules 80 and the capacitor modules 82 (that is, a relatively large number of block assemblies 90) are used. Moreover, the placement space on the radially inner side (space for disposing the heat dissipation member 810) can be easily secured even when the pair of power semiconductor chips 801, 802 is disposed on the circumferential side faces. In another embodiment, the distance L1 may be, for example, constant (see FIG. 11).

The capacitor module 82 is a module forming the smoothing capacitor C (see FIG. 1). The capacitor module 82 may be in such a form that a capacitor element forming the smoothing capacitor C and the capacitor busbars 821, 822 (see FIG. 9) of the wiring portion 88 are sealed with resin. The ends of the capacitor busbars 821, 822 that are exposed from the resin-sealed portion form a high-potential-side terminal of the capacitor element and a low-potential-side terminal of the capacitor element, respectively. The capacitor busbars 821, 822 are connected to the submodule 800 and are also connected to the power supply busbar 886 (see FIGS. 3A, 6, and 12).

In each block assembly 90, as shown in FIG. 10, the capacitor module 82 forms the smoothing capacitor C electrically connected in parallel between the high potential side and the low potential side of the submodule 800 in a corresponding set.

In the present embodiment, the capacitor module 82 is disposed radially outward of the power module 80. Therefore, the circumferential range in which the capacitor module 82 can be disposed is larger than in the case where the capacitor module 82 is disposed radially outward of the power module 80. This makes it easier to increase the size of the capacitor module 82. For example, relatively large capacitor modules 82 can be implemented even when a relatively large number of sets of the power modules 80 and the capacitor modules 82 is used. As a result, it is easy to increase the power of the rotating electrical machine 1.

In the present embodiment, as shown in FIG. 6, the range in which the capacitor module 82 extends in the axial direction overlaps the range in which the power module 80 extends in the axial direction. In particular, in the present embodiment, the submodule 800 of the power module 80 overlaps the capacitor module 82 as viewed in the radial direction. Therefore, the capacitor module 82 and the submodule 800 can be disposed between the cover member 252 and the rotating electrical machine 1 in the axial direction while minimizing the axial size of the vehicle drive device 10.

The capacitor module 82 is disposed so that the distances to the power semiconductor chips 801, 802 are equal to each other. In this case, the capacitor busbars 821 (see FIG. 9) can be used for connection to both of the power semiconductor chips 801, 802.

The capacitor module 82 is thermally connected to the cover member 252. For example, the capacitor module 82 may be thermally connected to the cover member 252 via the heat dissipation member 810. The capacitor module 82 can be thermally connected to the heat dissipation member 810 by facing in the radial direction the radially outer connection surface 8103 of the heat dissipation member 810 (connection surface 8103 connecting the two side faces 8101, 8102 to which the pair of power semiconductor chips 801, 802 is fixed) (see FIG. 9). In this case, the heat dissipation member 810 may have a radially outer protruding portion (not shown) to be located close to the capacitor module 82.

Alternatively, the capacitor module 82 may be directly thermally connected to the cover member 252 either without via the heat dissipation member 810 or in addition to the thermal connection via the heat dissipation member 810. Specifically, the capacitor module 82 extends beyond the submodule 800 toward the side away from the rotating electrical machine 1 in the axial direction (i.e., the X1 side), and is located close to or in contact with the cover member 252 in the axial direction. In the present embodiment, as shown in FIG. 6, the capacitor module 82 contacts the cover member 252 in the axial direction like the heat dissipation member 810 does. In this case, the heat of the capacitor module 82 can be efficiently transferred to the cover member 252 (and therefore the coolant in the coolant channel 2528). The capacitor module 82 may contact the peripheral wall portion 2522 of the cover member 252 in the radial direction.

Alternatively, the capacitor module 82 may be thermally connected to the cover member 252 via the molded resin portion 2523 instead of or in addition to these thermal connection methods.

By thermally connecting the capacitor module 82 to the cover member 252 in this manner, the heat of the capacitor module 82 is efficiently transferred to the cover member 252 (and the coolant in the coolant channel 2528), so that the capacitor module 82 can be efficiently cooled.

In particular, in the present embodiment, the ranges in which the capacitor module 82, the heat dissipation member 810, and the submodule 800 (power semiconductor chips 801, 802) extend in the axial direction overlap each other. Therefore, the heat transfer performance to the cover member 252 via the heat dissipation member 810 can be increased while minimizing the axial space for mounting the motor drive device 8.

The end on the X2 side of the capacitor module 82 preferably extends beyond the coil end portion 322A toward the X2 side. That is, the capacitor module 82 overlaps the coil end portion 322A as viewed in the radial direction. The axial clearance between the capacitor module 82 and the rotating electrical machine 1 can therefore be minimized. As a result, the axial size of the vehicle drive device 10 can be reduced while ensuring that the capacitor module 82 has a necessary axial size.

The capacitor module 82 is preferably disposed radially outward of the coil end portion 322A as viewed in the axial direction. The layout in which the capacitor module 82 overlaps the coil end portion 322A as viewed in the radial direction can thus be implemented. In this case, the capacitor module 82 may be disposed so as to overlap a back yoke portion of the stator core 321 as viewed in the axial direction. In this case, the capacitor module 82 can be disposed on a relatively radially inner side. This can reduce the possibility that the radial size of the motor case 250 may increase due to the capacitor module 82 being disposed radially outward of the power module 80, or can reduce the amount of this increase.

The control board 84 forms part or the whole of the control device 500 (see FIG. 1). The control board 84 may be, for example, a multilayer printed board. The control board 84 is disposed in such an orientation that the normal direction to the board surface is the axial direction. Therefore, the control board 84 can be disposed by using small axial clearance. For example, in the present embodiment, as shown in FIG. 6, the control board 84 may be disposed between the rotating electrical machine 1 and the power module 80 in the axial direction. More specifically, the control board 84 may be disposed between the coil end portion 322A of the rotating electrical machine 1 and the power module 80 in the axial direction. Efficient placement using a space that tends to be dead space can thus be implemented. The control board 84 can extend radially outward to such a radial position that it overlaps the coil end portion 322A as viewed in the axial direction. Therefore, the area of the control board 84 (range in which a circuit portion is formed) can be maximized.

The control board 84 preferably overlaps the capacitor module 82 as viewed in the radial direction. In the example shown in FIG. 6, the end on the X2 side of the capacitor module 82 extends beyond the coil end portion 322A toward the X2 side, and the capacitor module 82 overlaps the submodule 800 as viewed in the radial direction. In this layout, in order for the control board 84 to overlap the capacitor module 82 as viewed in the radial direction, the control board 84 need only be disposed between the coil end portion 322A of the rotating electrical machine 1 and the power module 80 (or the submodule 800 of the power module 80) in the axial direction.

The control board 84 is preferably in an annular shape having a central hole 84a through which the shaft portion 314 (see also FIG. 3A) of the rotor 310 extends. In this case, the control board 84 can be disposed near all of the plurality of power modules 80 arranged in the circumferential direction. This facilitates electrical connection (not shown) between the power semiconductor chips 801, 802 (e.g., gate terminals of the power switching elements) forming the submodule 800 of the power module 80 and a drive circuit 846 (see FIG. 13) of the control board 84.

As shown in FIG. 13, the control board 84 has an annular low voltage area 841 around the central hole 84a and an annular high voltage area 842 located radially outward of the low voltage area 841. The high voltage area 842 and the low voltage area 841 are electrically insulated via an annular insulating area 843. A low voltage circuit and a high voltage circuit can therefore be located in the two annular areas (low voltage area 841 and high voltage area 842) of the control board 84. A circuit portion and element that handle a high voltage of the power supply Va are disposed in the high voltage area 842 of the control board 84. For example, in the high voltage area 842, the drive circuits 846 for driving the power semiconductor chips 801, 802 may be provided as high voltage electronic components. In the low voltage area 841, a microcomputer 502, a power supply circuit 503, etc. that implement the control device 500 may be provided as low voltage electronic components. An electronic component for an electric oil pump that circulates oil in the motor housing chamber SP1 may be mounted on the control board 84.

In the present embodiment, the control board 84 has, in the low voltage area 841, through holes 845 for passing the lead wires 888 (elements of the wiring portion 88) electrically connecting the stator coil 322 and the power semiconductor chips 801, 802 (see FIG. 6). The lead wires 888 with a relatively small length can thus be implemented while ensuring that the control board 84 has a necessary size. For example, in the case of the coil side 121 shown in FIG. 4, the lead wires 888 may be implemented by the ends 1210, 1218. In the example shown in FIG. 6, the lead wire 888 is bent radially inward from the coil end portion 322A to extend radially inward, and is bent again in the axial direction on the X1 side of the rotor core 312 to extend in the axial direction. The axially extending section of the lead wire 888 extends through the control board 84 in the axial direction. In the example shown in FIG. 13, the control board 84 has three through holes 845 corresponding to the three-phase stator coil 322. As shown in FIG. 11, the end on the X1 side of the lead wire 888 may be joined to the relay busbar 889. In this case, the busbars 883, 884 from the power module 80 described above are joined to the relay busbar 889. The relay busbar 889 may be provided for each phase, or two or more lead wires 888 of each phase may be joined to a common relay busbar 889.

In the present embodiment, the control board 84 is provided with current sensors 902 around the through holes 845 by using the configuration in which the lead wires 888 extend through the through holes 845. In this case, the current sensors 902 can easily detect a current flowing through the lead wires 888. The current sensors 902 may be, for example, Hall sensors. The current sensors 902 are electrically connected to the microcomputer 502 (see FIG. 13) of the control device 500 via wires in the control board 84, not shown. With this configuration, the wires between the current sensors 902 and the control device 500 can be easily implemented by the wires in the control board 84, and the wiring length between the current sensors 902 and the control device 500 can be reduced.

In the present embodiment, the control board 84 is provided with the rotation angle sensor 900. The rotation angle sensor 900 faces the detected portion 3141 (detected portion 3141 provided on the shaft portion 314 described above; see FIG. 6) in the radial direction. Specifically, the rotation angle sensor 900 is provided at a position around the central hole 84a (that is, at the edge of the opening). The rotation angle sensor 900 may be formed integrally with the control board 84 and function as a magnetic pole position sensor. With this configuration, a wire between the rotation angle sensor 900 and the control device 500 can be easily implemented by a wire in the control board 84, and the wiring length between the rotation angle sensor 900 and the control device 500 can be reduced.

The wiring portion 88 includes the capacitor busbars 821, 822 described above, the busbars 881, 882, 883, and 884 described above, the power supply busbar 886, the lead wires 888 described above, and the relay busbars 889 described above.

The power supply busbar 886 has an annular shape as shown in FIG. 12, and extends about the first axis A1 as shown in FIG. 6 (and FIG. 3A). In the present embodiment, the power supply busbar 886 extends in the circumferential direction between the cover member 252 and the submodules 800 in the axial direction so as to be adjacent to the X1 sides of the submodules 800. In this case, the power supply busbar 886 is disposed radially inward of the capacitor modules 82 as viewed in the axial direction, and overlaps the capacitor modules 82 as viewed in the radial direction. The wiring length between the power supply busbar 886 and each block assembly 90 can thus be efficiently reduced.

The power supply busbar 886 includes a high-potential-side power supply busbar 8861 electrically connected to the high potential side of the power supply Va (see FIG. 1), and a low-potential-side power supply busbar 8862 electrically connected to the low potential side of the power supply Va (see FIG. 1). The high-potential-side power supply busbar 8861 and the low-potential-side power supply busbar 8862 may be arranged offset from each other in the radial direction as shown in FIG. 7 and/or may be arranged offset from each other in the axial direction. The high-potential-side power supply busbar 8861 may be joined to the ends on the X1 side of the capacitor busbars 821, and the low-potential-side power supply busbar 8862 may be joined to the ends on the X1 side of the capacitor busbars 822.

The power supply busbar 886 is preferably disposed closer to the cover member 252 than the submodules 800 (power semiconductor chips 801, 802). For example, as shown in FIG. 3A, the power supply busbar 886 may be disposed between the capacitor busbar 822 and the heat dissipation member 810 in the radial direction and on the X1 side with respect to the submodule 800. In this case, the power supply busbar 886 can be efficiently disposed by using a space that can be dead space, and also the heat from the power supply busbar 886 can be efficiently transferred to the cover member 252 (that is, the power supply busbar 886 can be efficiently cooled).

Figure 13A:
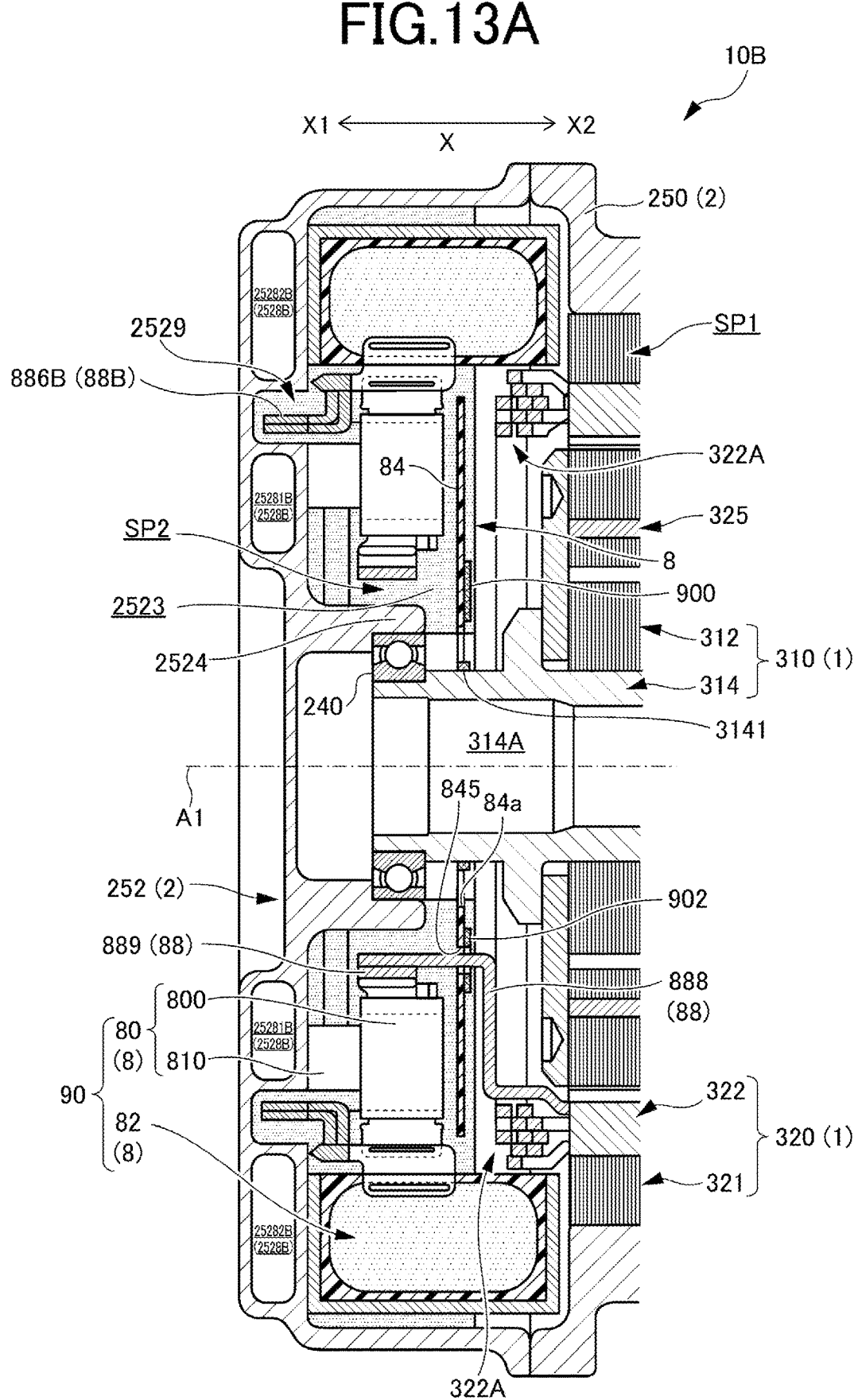
FIG. 13A is a sectional view schematically showing a main part of a vehicle drive device according to a modification.

In a vehicle drive device 10B according to a modification shown in FIG. 13A, a power supply busbar 886B is provided in an annular groove 2529 formed in the cover member 252. The annular groove 2529 has an annular shape about the first axis A1 as viewed in the axial direction, and is recessed toward the X1 side. The power supply busbar 886B may extend between a first coolant channel 25281B and a second coolant channel 25282B in the radial direction as viewed in the axial direction. In this case, the power supply busbar 886B can be efficiently disposed by using the space between the first coolant channel 25281B and the second coolant channel 25282B of a coolant channel 2528B in the radial direction, and the power supply busbar 886B can be efficiently cooled by the first coolant channel 25281B and the second coolant channel 25282B.

Next, some of the effects of the present embodiment will be described with reference to FIGS. 14A to 18.

Figure 14A:
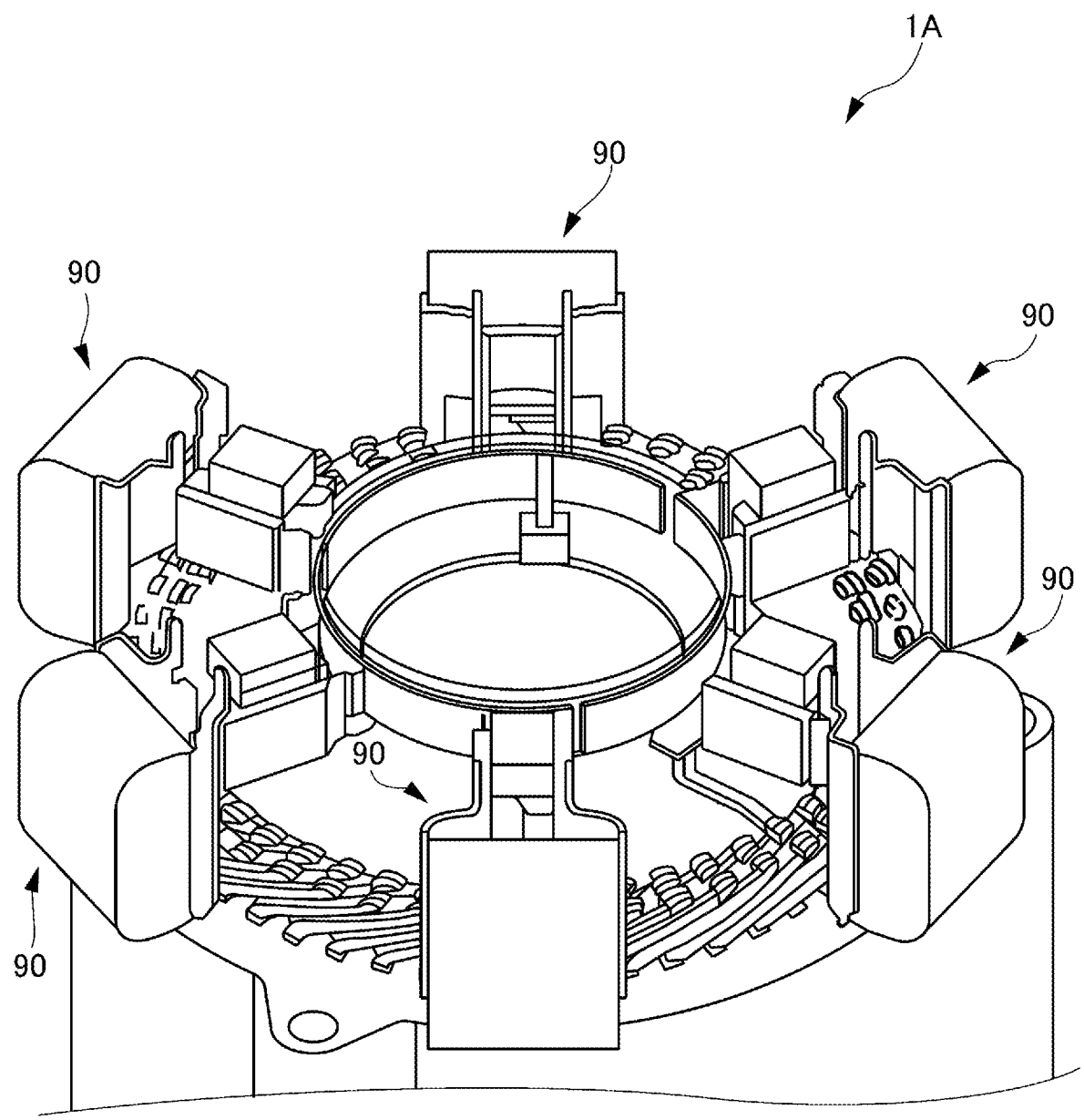
FIG. 14A is a schematic perspective view illustrating a rotating electrical machine in which only six block assemblies are disposed in the circumferential direction according to the first embodiment.
Figure 14B:
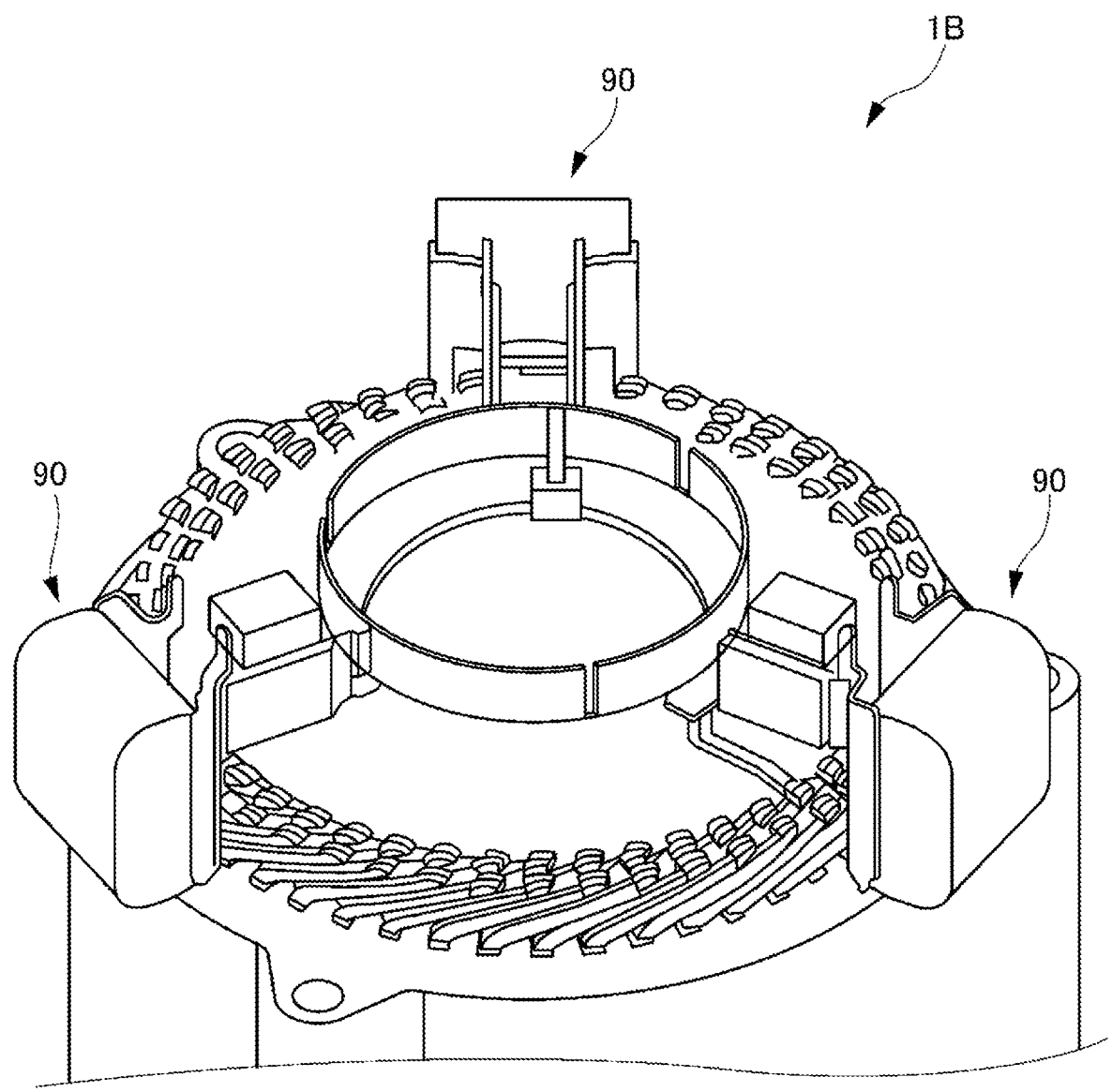
FIG. 14B is a schematic perspective view illustrating a rotating electrical machine in which only three block assemblies are disposed in the circumferential direction according to the first embodiment.

FIG. 14A is a schematic perspective view illustrating a rotating electrical machine 1A in which only six block assemblies 90 are disposed in the circumferential direction. FIG. 14B is a schematic perspective view illustrating a rotating electrical machine 1B in which only three block assemblies 90 are disposed in the circumferential direction. Since FIGS. 14A and 14B are diagrams illustrating the arrangement of the block assemblies 90, some elements may be shown in a simplified manner, or illustration of some elements may be omitted.

As described above, in the present embodiment, the block assemblies 90 have the same configuration, and any number of block assemblies 90 can be mounted. Therefore, rotating electrical machines 1 with various specifications can be implemented. For example, the rotating electrical machine 1A, 1B that are different in power from the rotating electrical machine 1 can easily be configured by disposing six block assemblies 90 as shown in FIG. 14A or disposing three block assemblies 90 as shown in FIG. 14B. The number of variations of the rotating electrical machine can thus be efficiently increased while using the same components.

Figure 15:
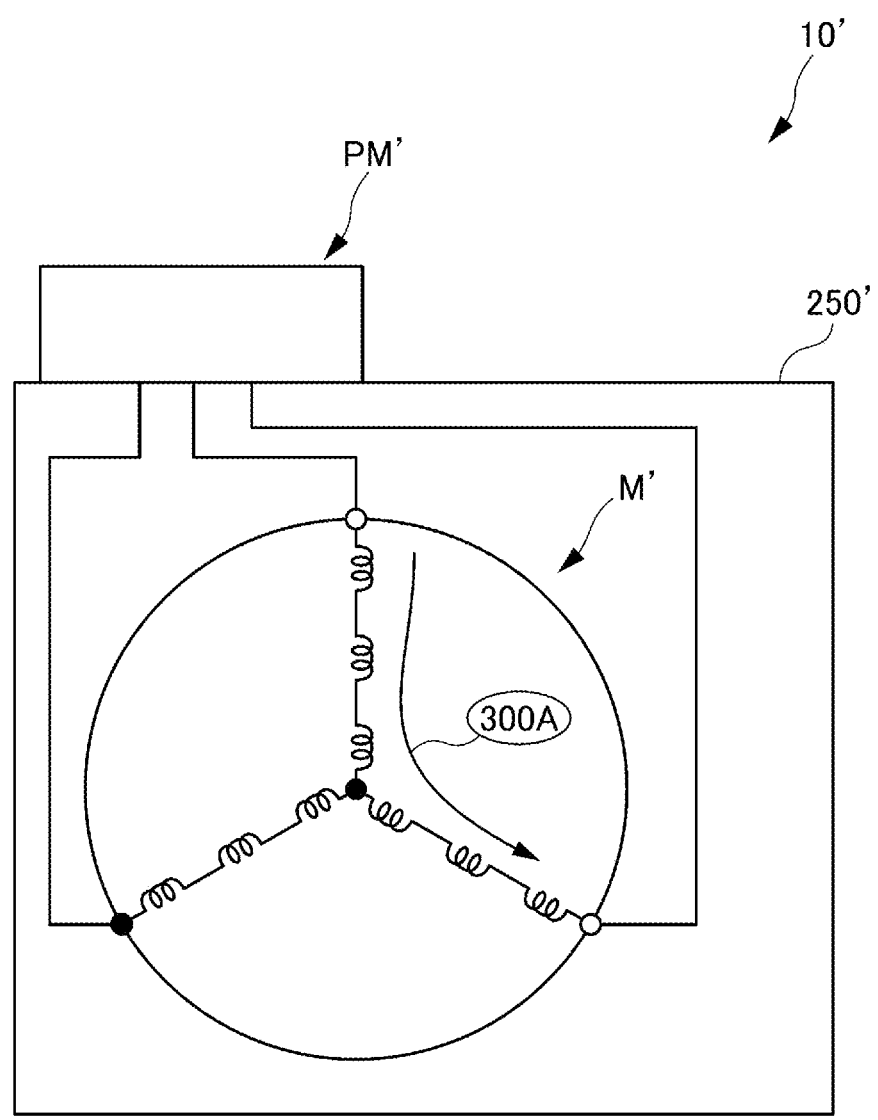
FIG. 15 is a schematic diagram illustrating a wiring structure of a vehicle drive device according to a comparative example.
Figure 16:
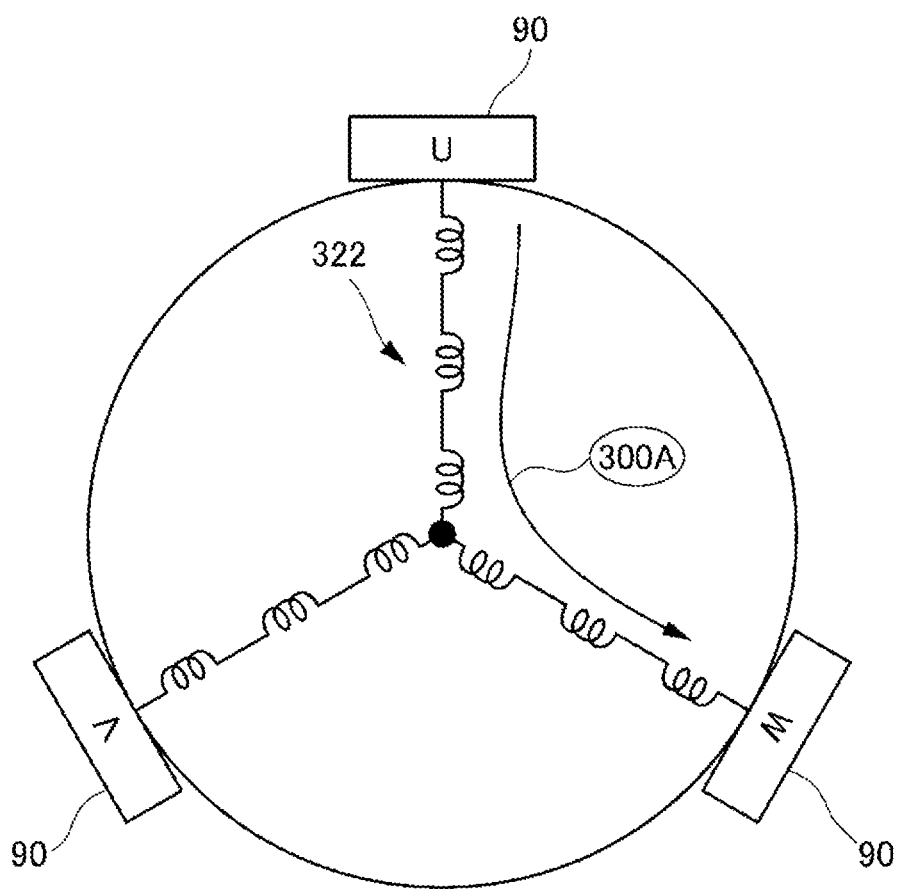
FIG. 16 is a schematic diagram illustrating an example of a wiring structure that can be implemented in the rotating electrical machine according to the first embodiment.
Figure 17A:
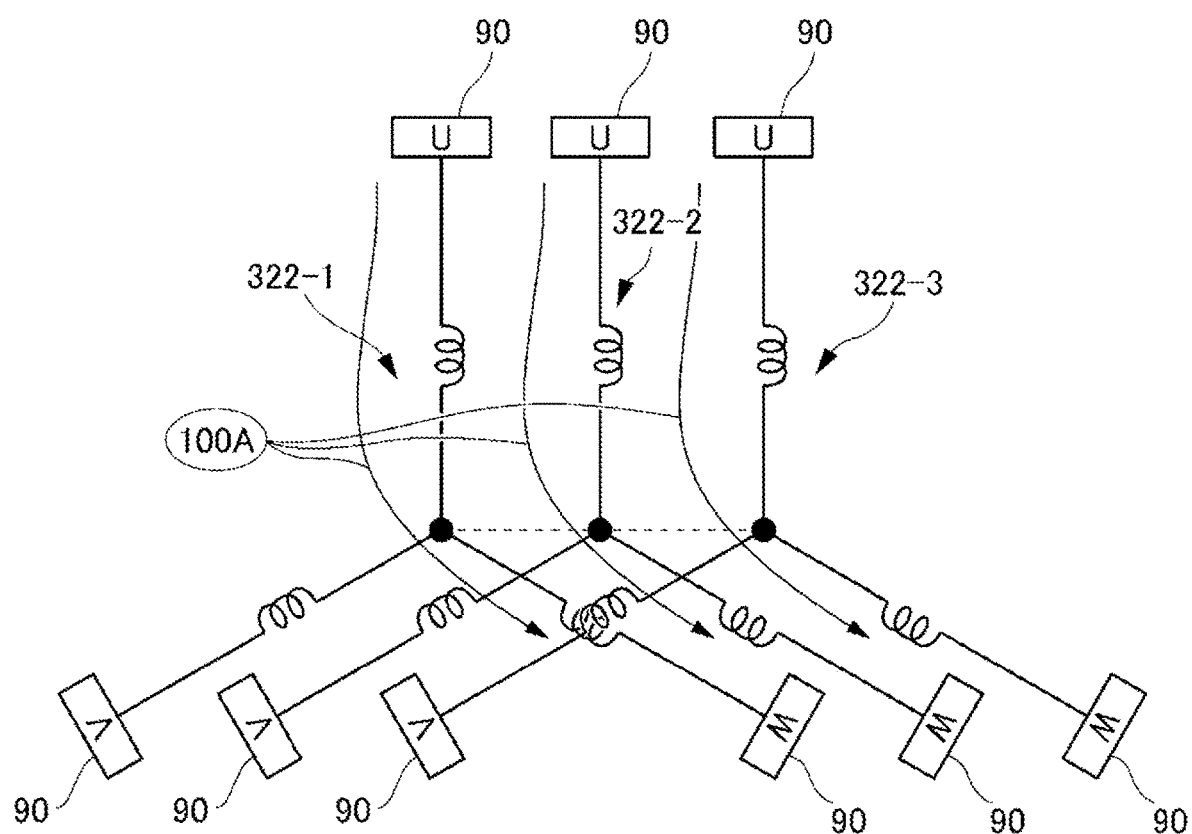
FIG. 17A is a schematic diagram illustrating another example of the wiring structure that can be implemented in the rotating electrical machine according to the first embodiment.
Figure 17B:
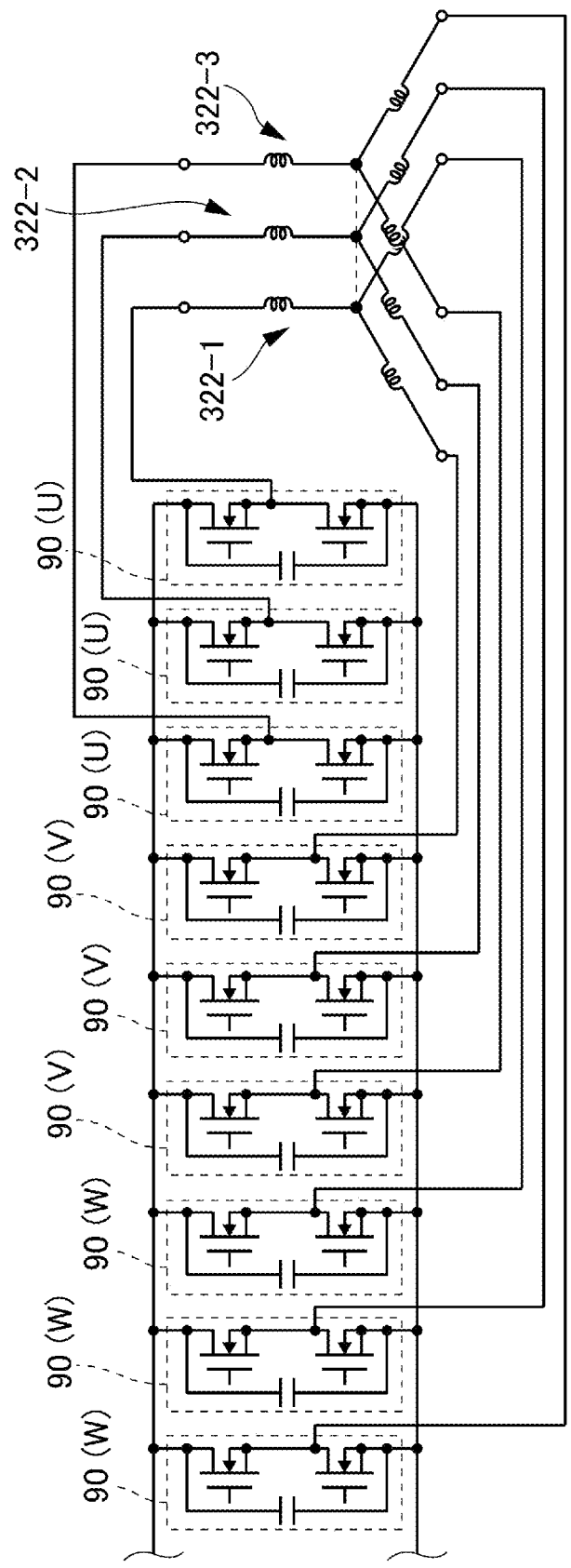
FIG. 17B is an equivalent electrical circuit diagram illustrating the another example of the wiring structure that can be implemented in the rotating electrical machine according to the first embodiment.
Figure 18:
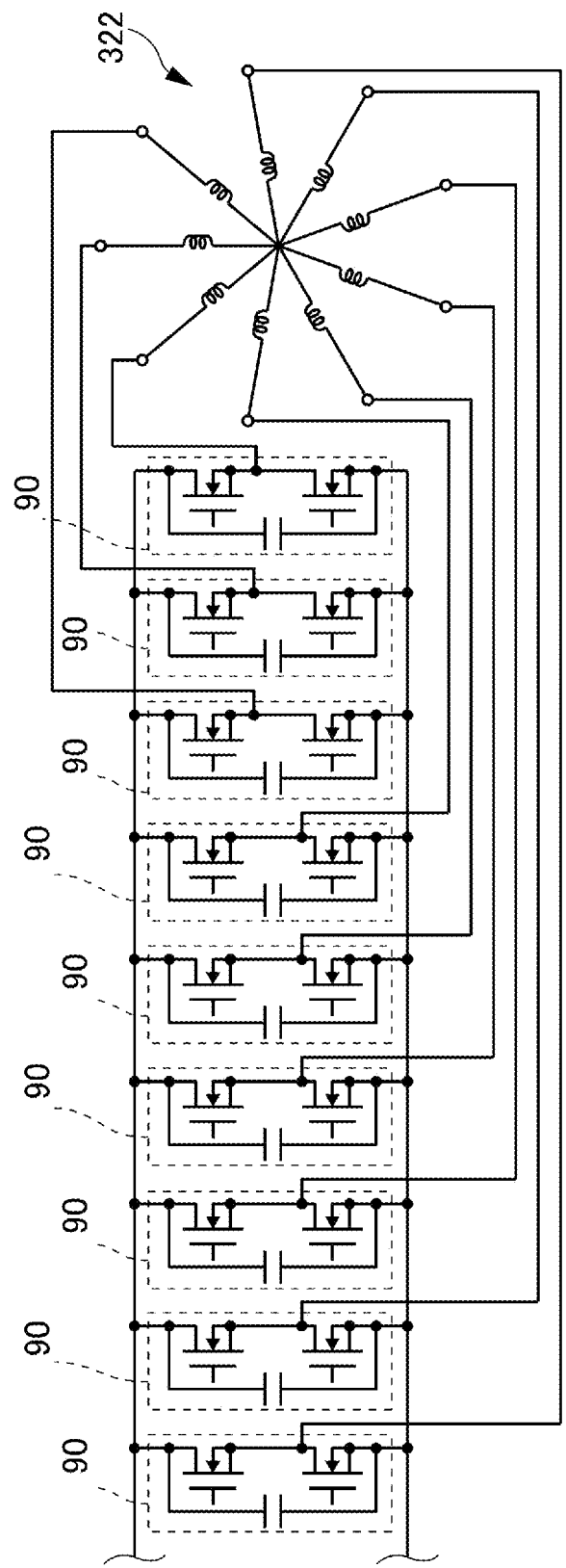
FIG. 18 is a schematic diagram illustrating specifications that can be implemented in the rotating electrical machine according to the first embodiment.

FIG. 15 is a schematic diagram illustrating a wiring structure of a vehicle drive device 10' according to a comparative example. FIG. 16 is a schematic diagram illustrating an example of a wiring structure that can be implemented in the rotating electrical machine 1 according to the present embodiment. FIGS. 17A and 17B are schematic diagrams illustrating another example of the wiring structure that can be implemented in the rotating electrical machine 1 according to the present embodiment. FIG. 18 is a schematic diagram illustrating specifications that can be implemented in the rotating electrical machine 1 according to the present embodiment.

The vehicle drive device 10' according to the comparative example has a configuration in which a power module PM' including the inverter INV, the smoothing capacitor C, the control device 500, etc. (not shown) described above is disposed outside a motor case 250'. In this case, as schematically shown in FIG. 15, the wiring structure is such that lead wires (power lines) from a rotating electrical machine M' extend to the power module PM' through a partition wall of the motor case 250'. In such a wiring structure, the length of the lead wires from the rotating electrical machine M' tends to be large, and the flexibility in the path of the wires is not high.

In the present embodiment, as described above, the motor drive device 8 is adjacent to the rotating electrical machine 1 in the axial direction with no partition wall interposed therebetween (see FIG. 3A). Therefore, as schematically shown in FIG. 16, the block assemblies 90 of each phase (shown by "U," "V," "W" in FIG. 16 to distinguish among the phases) can be disposed very close to the stator coil 322 (see FIG. 3A). The length of the lead wires 888 can thus be minimized. Since the wiring length can be reduced, the electrical characteristics are good, the required reliability can be easily achieved, the wires can be easily routed etc., and the flexibility in the arrangement of peripheral members can be increased. According to the present embodiment, an efficient wiring structure can thus be implemented.

In the present embodiment, various numbers of block assemblies 90 can be disposed for the relay busbar 889 (FIG. 11) of each phase. Therefore, the flexibility in the number of block assemblies 90 that can be disposed in one rotating electrical machine 1 can be increased as described above without complicating the wiring structure.

In the present embodiment, an efficient wiring structure can be similarly implemented even when the stator coils 322 of each phase are connected in parallel as shown in FIGS. 17A and 17B. That is, as schematically shown in FIGS. 17A and 17B, the block assemblies 90 of each phase can be disposed very close to the coil end portions 322A of the stator coils 322, as with the example shown in FIG. 16. When the stator coils 322 of each phase are connected in parallel, the current that is required to output the same power and that is applied to the stator coils 322 can be reduced compared to the case where the stator coils 322 of each phase are connected in series (see FIG. 16). For example, in the case where three stator coils are connected in parallel as shown in FIGS. 17A and 17B, power similar to that obtained in the case where three stator coils are connected in series (see FIG. 16) and a current of 300 A is applied can be implemented by applying a current of 100 A. By increasing the number of stator coils connected in parallel as described above, the power semiconductor chips 801, 802 included in the submodule 800 can be reduced in size, and the yield of semiconductor wafers can be increased. By implementing distribution of the inverter modules using the block assemblies 90 and parallel connections (distribution of connections) of the stator coils 322 to the inverter INV as described above, not only a reduced size but also reduced cost, an increased number of variations of the winding configuration, etc. can be achieved. For example, regarding the increased number of variations of the winding configuration, winding configurations for the numbers of phases other than three phases such as a winding configuration for nine phases can be implemented as schematically shown in FIG. 18.

In the present embodiment, the flexibility in the number of block assemblies 90 that can be disposed in one rotating electrical machine 1 is high. For example, when the stator coils 322 are connected in the manner shown in FIGS. 17A and 17B, three block assemblies 90 can be disposed for each phase. In this case, stator coils 322-1 to 322-3 connected in parallel can be energized independently, so that redundancy such as a fail-safe function can be improved.

Next, a vehicle drive device 10C according to another embodiment (hereinafter referred to as "second embodiment" in order to distinguish from other embodiments) that is different from the vehicle drive device 10 according to the above embodiment (hereinafter referred to as "first embodiment" in order to distinguish from other embodiments) will be described with reference to FIGS. 19 to 25. In the following, constituent elements that may be similar to those in the first embodiment described above may be denoted by the same reference signs, and description thereof may be omitted.

Figure 19:
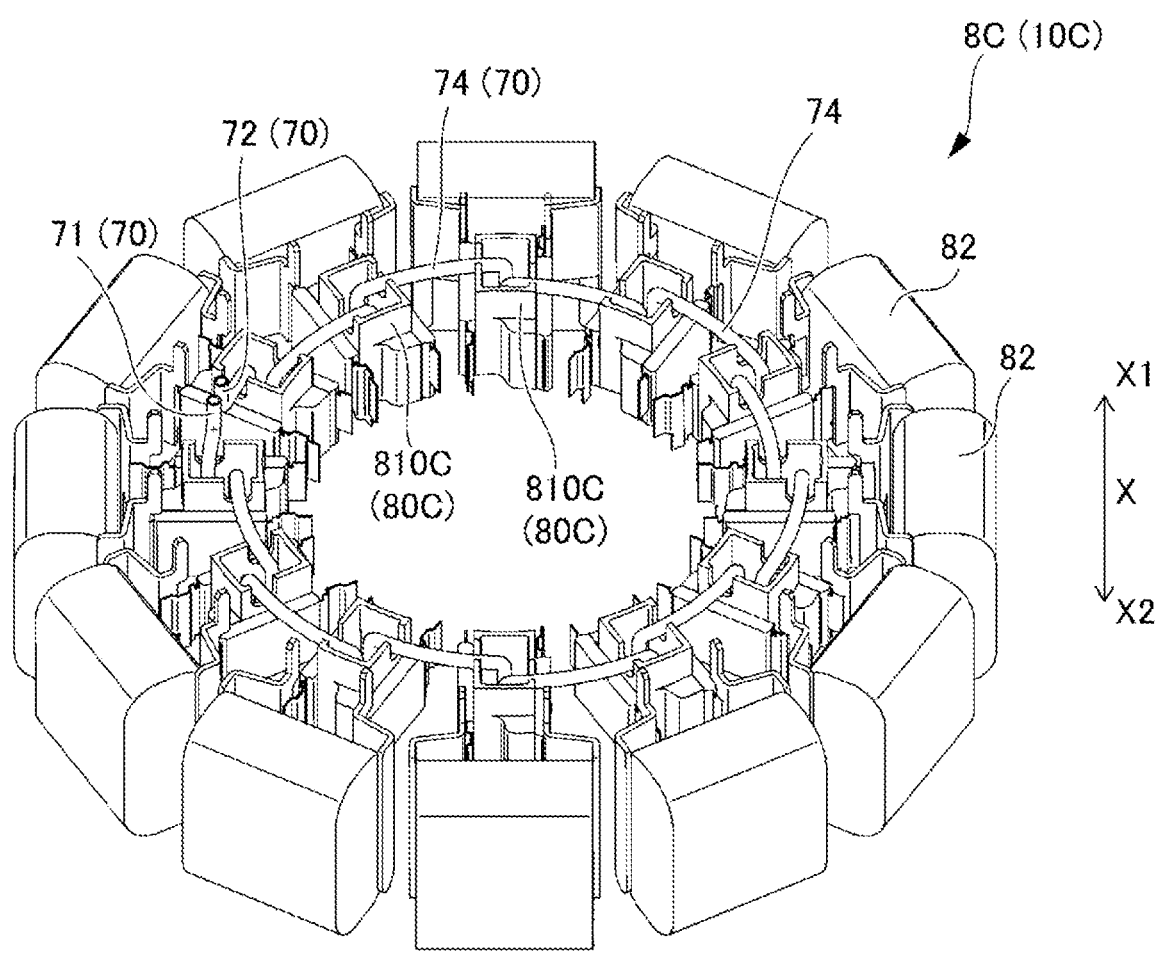
FIG. 19 is a perspective view showing a vehicle drive device according to a second embodiment from the X1 side.
Figure 20:
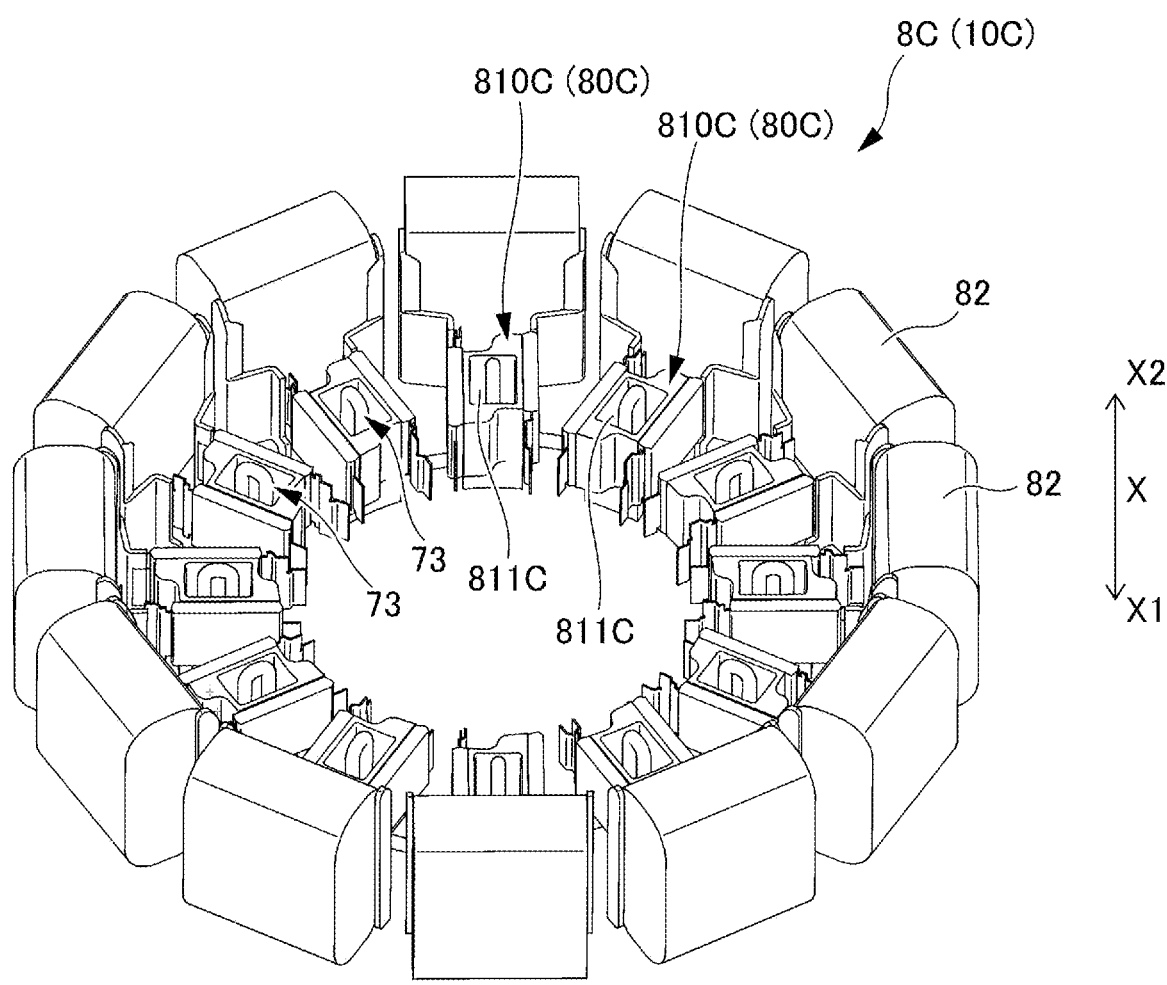
FIG. 20 is a perspective view showing the vehicle drive device according the second embodiment from the X2 side.
Figure 21:
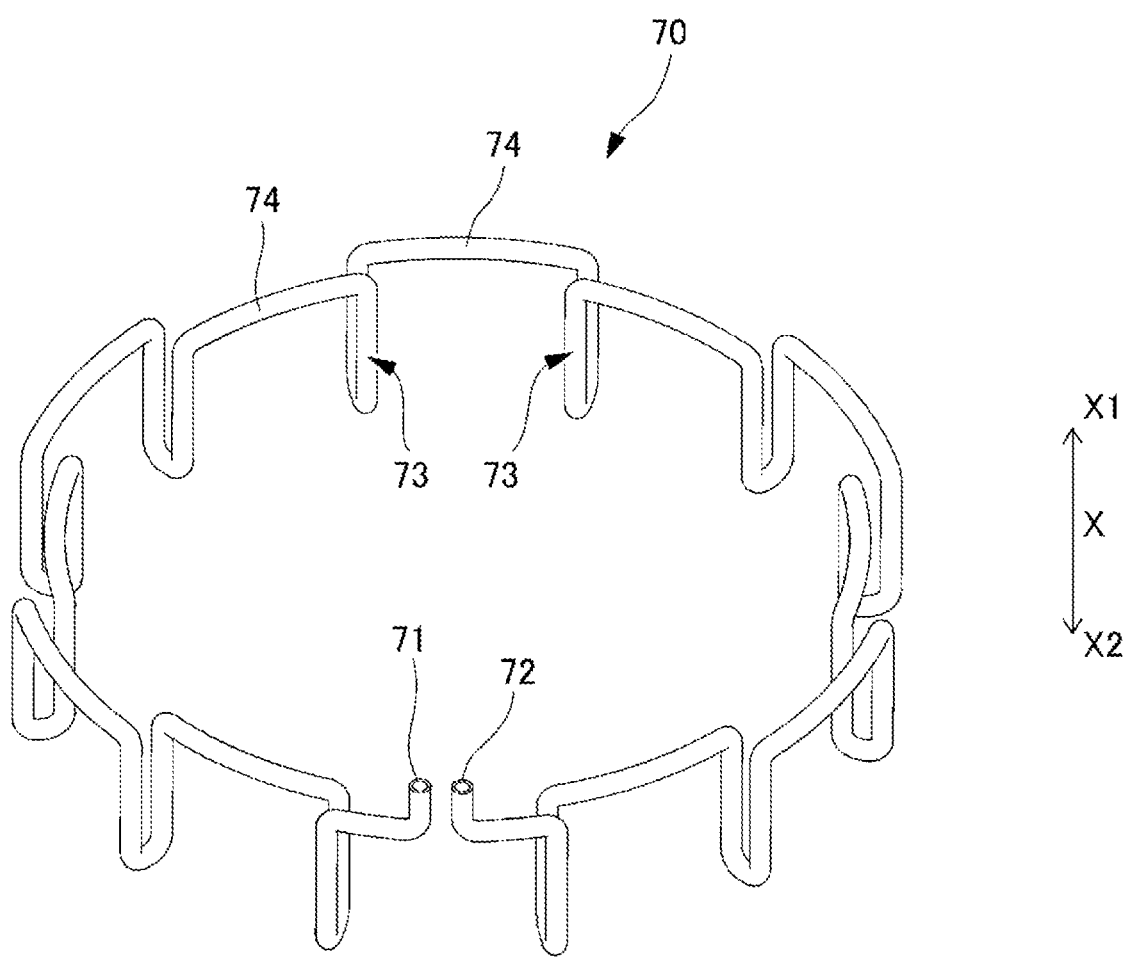
FIG. 21 is a perspective view showing a pipe member according to the second embodiment from the X1 side.
Figure 22:
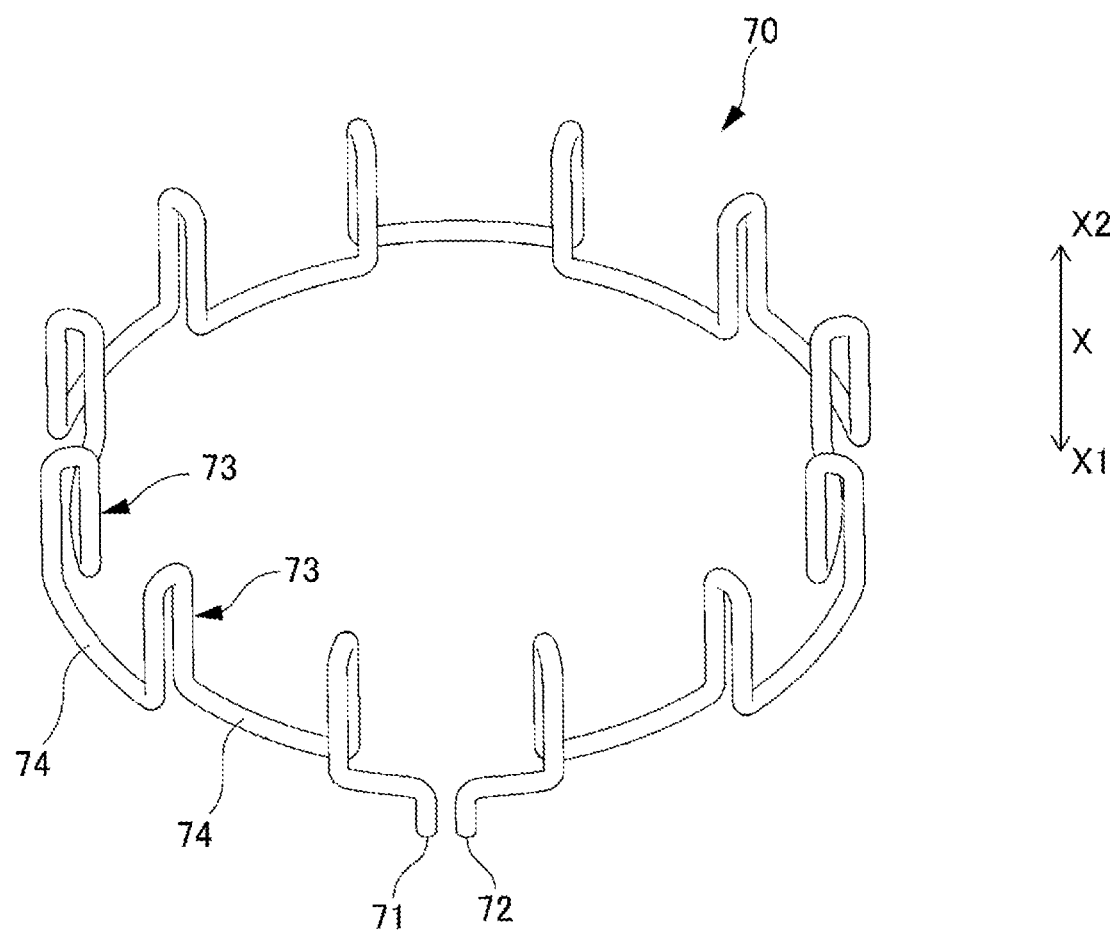
FIG. 22 is a perspective view showing the pipe member according to the second embodiment from the X2 side.
Figure 23:
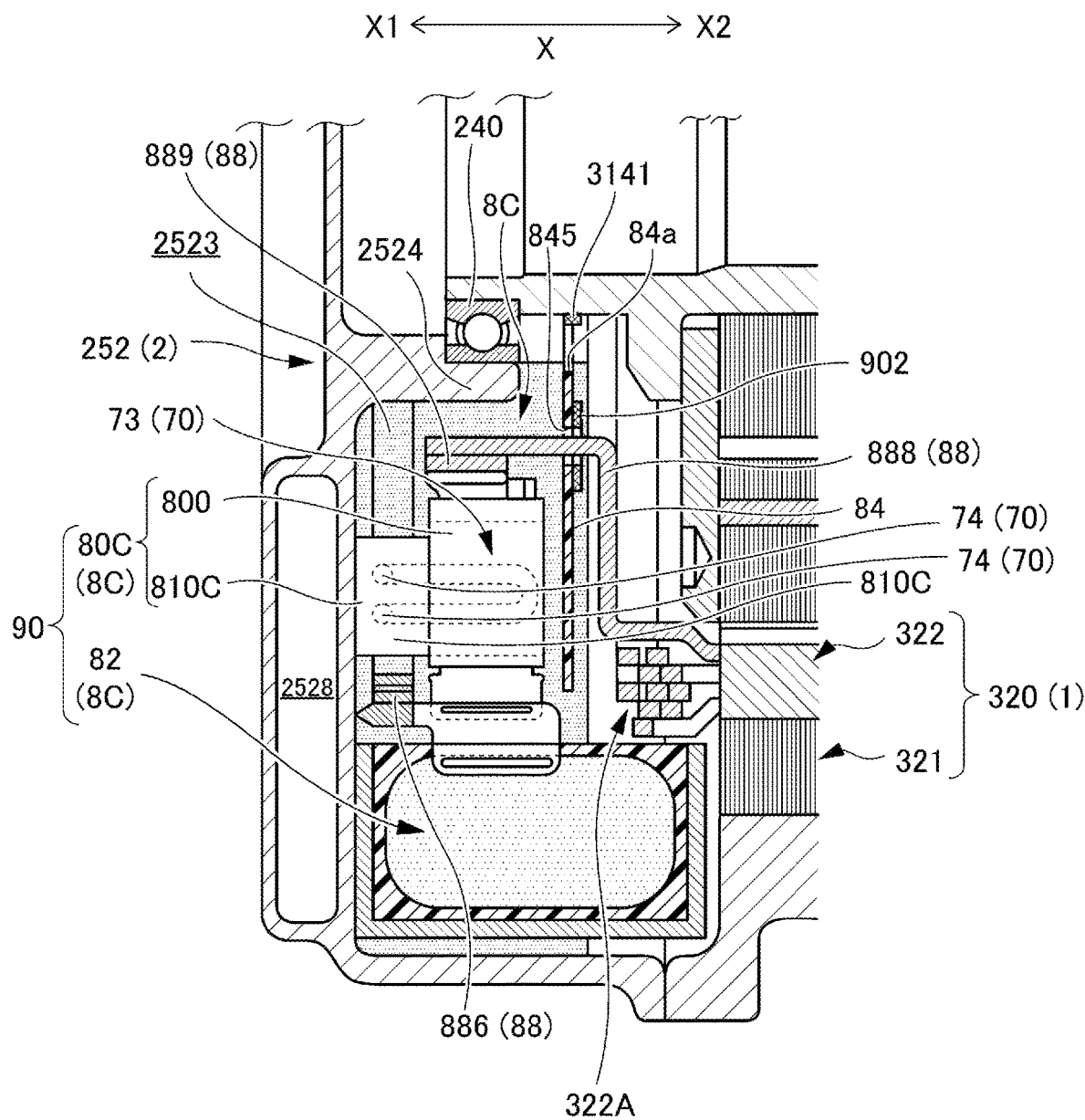
FIG. 23 is a sectional view of a main part of the vehicle drive device according to the second embodiment.
Figure 24:
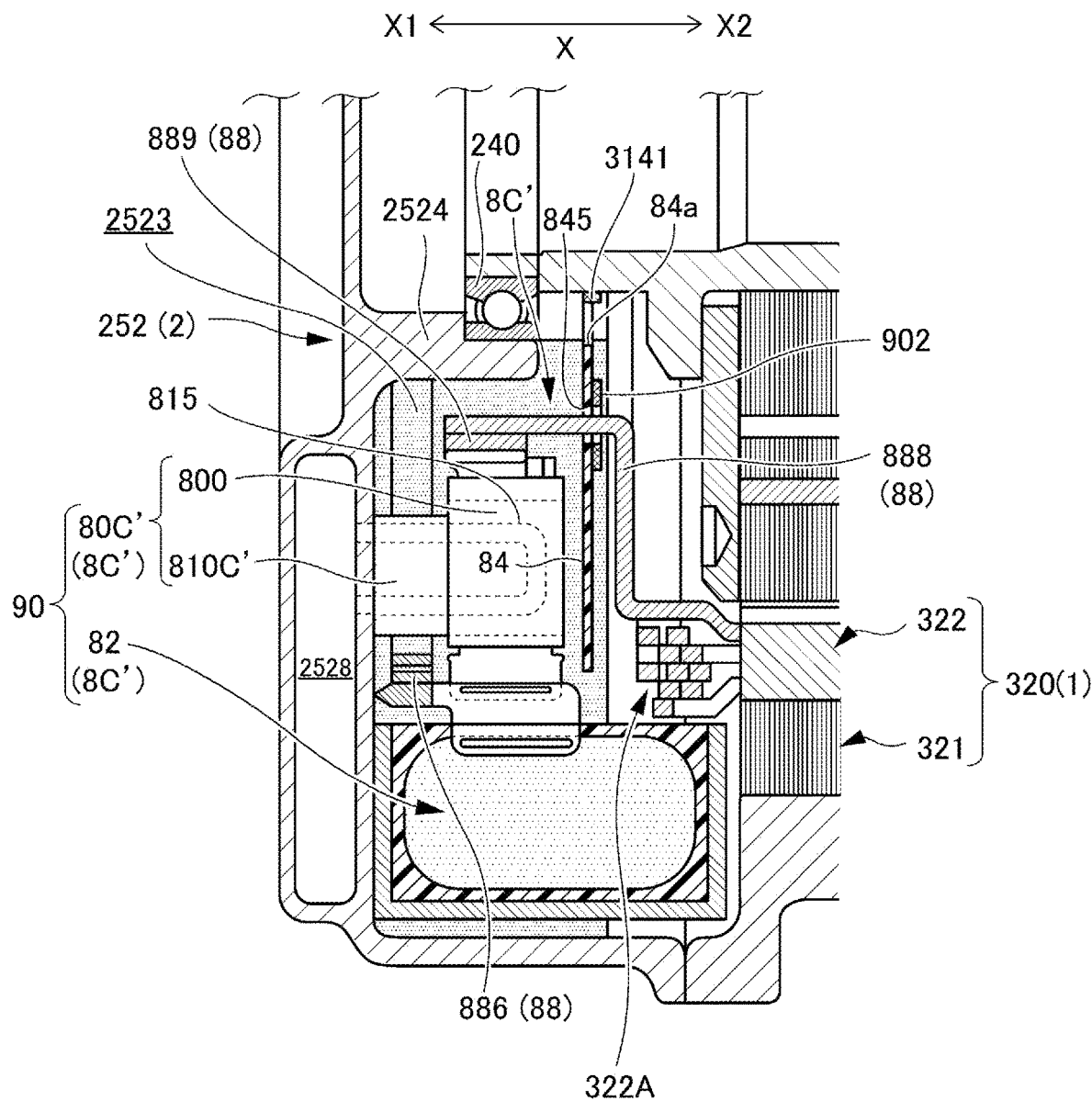
FIG. 24 is a sectional view of a main part of a vehicle drive device according to a further embodiment.
Figure 25:
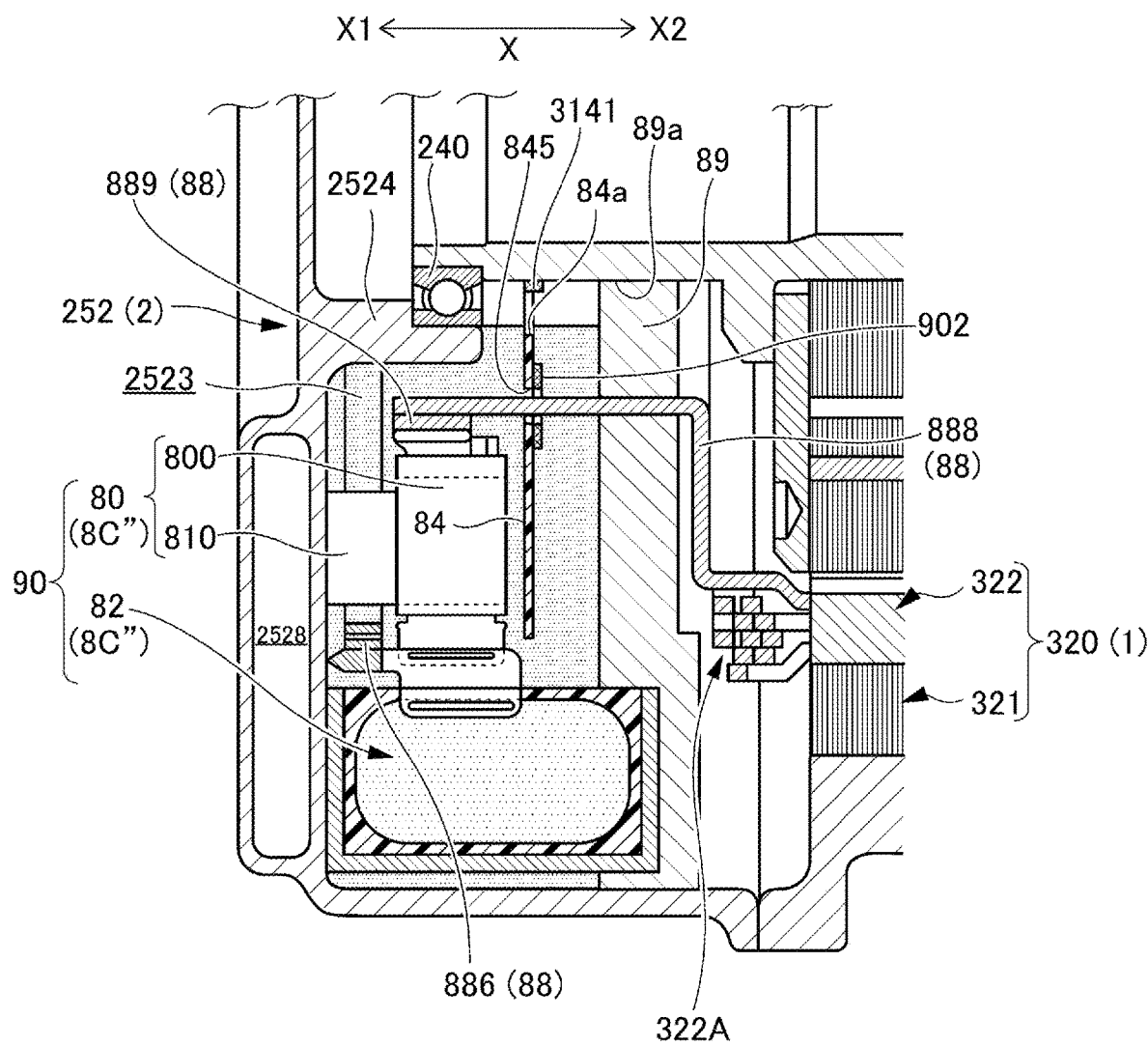
FIG. 25 is a sectional view of a main part of a vehicle drive device according to a still further embodiment.

FIG. 19 is a perspective view showing the vehicle drive device 10C according to the present embodiment from the X1 side. FIG. 20 is a perspective view showing the vehicle drive device 10C from the X2 side. FIG. 21 is a perspective view showing a pipe member 70 from the X1 side. FIG. 22 is a perspective view showing the pipe member 70 from the X2 side. FIG. 23 is a sectional view of a main part of the vehicle drive device 10C according to the present embodiment, and is a sectional view corresponding to FIG. 6. FIG. 24 is a sectional view of a main part of a vehicle drive device 8C' according to a further embodiment. FIG. 25 is a sectional view of a main part of a vehicle drive device 8C" according to a still further embodiment.

The vehicle drive device 10C according to the present embodiment is different from the vehicle drive device 10 according to the first embodiment described above in that the motor drive device 8 is replaced with a motor drive device 8C. The motor drive device 8C according to the present embodiment is different from the motor drive device 8 according to the first embodiment described above in that the power modules 80 are replaced with power modules 80C and the pipe member 70 is provided. The power module 80C is different from the power module 80 according to the first embodiment described above in that the heat dissipation member 810 is replaced with a heat dissipation member 810C.

The heat dissipation member 810C is different in shape from the heat dissipation member 810 according to the first embodiment described above, but their same basic functions are the same. Specifically, the heat dissipation member 810 according to the first embodiment described above is in the form of a solid block (metal block), but the heat dissipation member 810C according to the present embodiment is in a hollow shape and the pipe member 70 passes through the hollow interior thereof. The heat dissipation member 810C has a thermally conductive molded resin portion 811C (see FIG. 20) in the hollow interior. The material of the molded resin portion 811C may be the same as that of the molded resin portion 2523 described above. The molded resin portion 811C may be formed by the same process as that for the molded resin portion 2523. The molded resin portions 811C are not shown in FIG. 19. In FIG. 20, portions of the pipe member 70 (insertion portions 73 described later) sealed with the molded resin portions 811C are shown in a see-through fashion.

The pipe member 70 is disposed between the cover member 252 and the rotating electrical machine 1 in the axial direction. The pipe member 70 communicates with the coolant channel 2528 of the cover member 252. Therefore, the coolant flowing through the coolant channel 2528 flows through the channel in the pipe member 70. Since the pipe member 70 passes through the hollow interiors of the heat dissipation members 810C, the coolant flowing through the pipe member 70 can efficiently receive heat from the heat dissipation members 810C. That is, the heat dissipation members 810C can efficiently release the heat via the coolant flowing through the pipe member 70. As a result, the capacitor modules 82 and the submodules 800 (power semiconductor chips 801, 802) can be efficiently cooled via the heat dissipation members 810C. In another embodiment, the pipe member 70 may communicate with the same coolant supply source without via the coolant channel 2528.

In the present embodiment, the pipe member 70 preferably communicates with the first coolant channel 25281 of the coolant channel 2528 of the cover member 252. In this case, the submodules 800 (power semiconductor chips 801, 802) that are more likely to become hot than the capacitor modules 82 can be efficiently cooled by the coolant in the first coolant channel 25281 located upstream of the second coolant channel 25282.

In the present embodiment, as shown in FIGS. 21 and 22, the pipe member 70 extends in the circumferential direction as a whole and has, at predetermined circumferential positions, an inlet portion 71 and an outlet portion 72 that are located adjacent to each other in the circumferential direction. The inlet portion 71 and the outlet portion 72 communicate with the coolant channel 2528 of the cover member 252. The pipe member 70 may be attached to the cover member 252 such that the inlet portion 71 and the outlet portion 72 protrude into the coolant channel 2528.

In the present embodiment, the pipe member 70 is continuous from the inlet portion 71 to the outlet portion 72, and includes the insertion portions 73 and connecting portions 74. Each insertion portion 73 is in a U-shape and extends in the axial direction, and is inserted into the hollow interior of the heat dissipation member 810C (see dashed lines in FIG. 23). The connecting portion 74 extends in the circumferential direction and connects the insertion portions 73 that are adjacent to each other in the circumferential direction. This pipe member 70 is relatively easy to manufacture, and is implemented as a single-piece member. The ease of assembly is therefore improved.

In a modification, the connecting portions 74 may be omitted, and each insertion portion 73 may have the inlet portion 71 and the outlet portion 72 and communicate with the coolant channel 2528.

In the present embodiment, the pipe member 70 forms a coolant channel in the heat dissipation members 810C. However, the present disclosure is not limited to this. For example, in a motor drive device 8C' shown in the schematic sectional view of FIG. 24, the power module 80 according to the first embodiment described above is replaced with a power module 80C', and the power module 80C' has a coolant channel 815 in a heat dissipation member 810C'. The heat dissipation member 810C' may be a two-piece member, and the entire heat dissipation member 810C' other than the coolant channel 815 may be solid. As shown in FIG. 24, the coolant channel 815 communicates with the coolant channel 2528 of the cover member 252. With such a motor drive device 8C' as well, the effects similar to those of the second embodiment described above can be obtained with a reduced number of components due to the pipe member 70 not being used.

In another modification, as schematically shown in the sectional view of FIG. 25, a heat dissipation member 89 may be provided between the block assembly 90 and the rotating electrical machine 1 in the axial direction. In this case, the heat dissipation member 89 has heat dissipation properties and is made of, for example, aluminum. The heat dissipation member 89 is in an annular shape having a central hole 89a through which the shaft portion 314 of the rotor 310 extends, and may be fixed to the shaft portion 314 by, for example, press fitting. According to such a configuration, the heat dissipation member 89 can protect the control board 84 from the heat from the rotating electrical machine 1. The heat dissipation member 89 blocks electromagnetic waves to protect the control board 84. This can increase the reliability of the control that is implemented via the control board 84.

Figure 26:
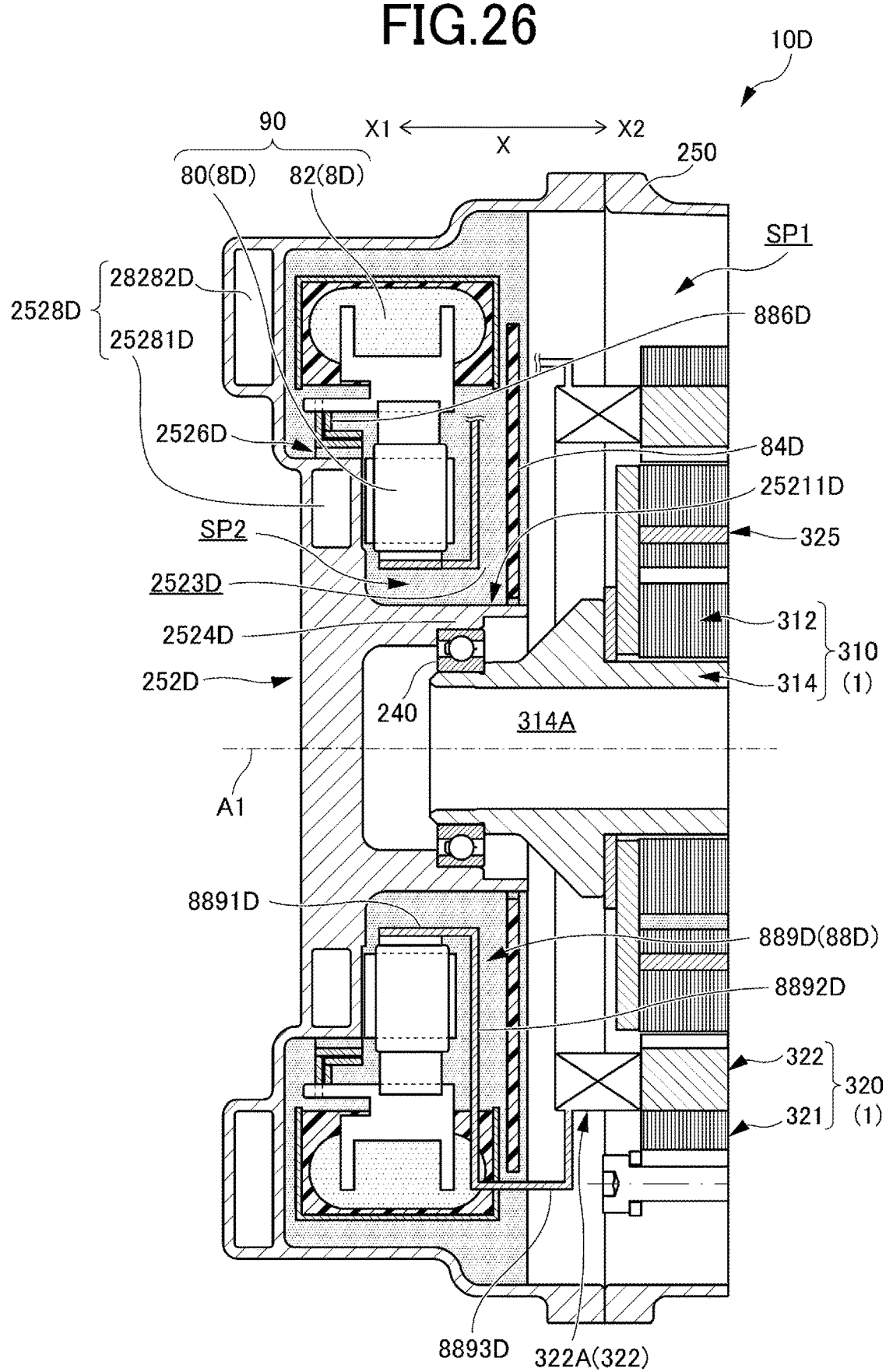
FIG. 26 is a sectional view schematically showing a main part of a vehicle drive device according to a third embodiment.

Next, a vehicle drive device 10D according to still another embodiment (hereinafter referred to as "third embodiment" in order to distinguish from other embodiments) will be described with reference to FIGS. 26 to 30. In the following, constituent elements that may be similar to those in the first embodiment described above (including constituent elements different only in position and size) may be denoted by the same reference signs, and description thereof may be omitted. In FIG. 26 etc., illustration of some of those constituent elements that are shown in FIG. 3A etc. and that may be provided in the vehicle drive device 10D according to the present embodiment (e.g., the rotation angle sensor 900) may be omitted.

FIG. 26 is a sectional view schematically showing a main part of the vehicle drive device 10D according to the third embodiment.

The vehicle drive device 10D according to the third embodiment is mainly different from the vehicle drive device 10 according to the first embodiment described above in that the capacitor module 82 is disposed on the X1 side with respect to a control board 84D. In this case, the capacitor module 82 in the first embodiment described above overlaps the control board 84D and the coil end portion 322A as viewed in the radial direction, but the capacitor module 82 in the present embodiment does not overlap the control board 84D and the coil end portion 322A as viewed in the radial direction.

According to such a configuration, the diameter of the control board 84D can be increased (or the control board 84D can be disposed on the radially outer side). Specifically, as shown in FIG. 26, the control board 84D can extend radially outward to such a position that the control board 84D overlaps the capacitor module 82 as viewed in the axial direction or to a position beyond the capacitor module 82 on the radially outer side. According to the present embodiment, the flexibility in the position and size of the control board 84D can be increased. In a modification, the end on the X2 side of the capacitor module 82 may be disposed so as to overlap the coil end portion 322A as viewed in the radial direction, as in the first embodiment described above. In this case, the axial size of the capacitor module 82 can be increased (capacity can be increased) instead of increasing the diameter of the control board 84D.

In the third embodiment, the capacitor module 82 is disposed radially outward of the coil end portion 322A so as not to overlap the coil end portion 322A as viewed in the axial direction, as in the first embodiment described above. In a modification, the capacitor module 82 may be disposed more on the radially inner side so as to overlap the coil end portion 322A as viewed in the axial direction. In this case, the radial size of a cover member 252D can be reduced.

The vehicle drive device 10D according to the third embodiment is different from the vehicle drive device 10 according to the first embodiment described above in that the cover member 252 is replaced with the cover member 252D.

In the present embodiment, since the capacitor module 82 is disposed on the X1 side with respect to the control board 84D as described above, the end on the X1 side of the capacitor module 82 extends beyond the power module 80 toward the X1 side. That is, the capacitor module 82 extends beyond the heat dissipation member 89 of the power module 80 toward the X1 side. The surface on the X2 side of the cover member 252D therefore has a stepped portion 2526D according to a stepped portion on the X1 side formed by the power module 80 and the capacitor module 82. That is, the surface on the X2 side of the cover member 252D is formed such that the surface portion on the radially outer side (surface portion facing the capacitor module 82 in the axial direction) is offset toward the X1 side with respect to the surface portion on the radially inner side (surface portion facing the power module 80 in the axial direction). The cover member 252D can therefore be located close to or in contact with both the power module 80 and the capacitor module 82 in the axial direction. The thermal connection of the cover member 252D to both the power module 80 and the capacitor module 82 can thus be effectively maintained.

In the present embodiment as well, the cover member 252D has a coolant channel 2528D having the same function as the coolant channel 2528 according to the first embodiment described above. As with the coolant channel 2528 according to the first embodiment described above, the coolant channel 2528D includes a first coolant channel 25281D and a second coolant channel 25282D.

In the present embodiment, as shown in FIG. 26, the capacitor module 82 overlaps the first coolant channel 25281D as viewed in the radial direction, unlike the positional relationship between the coolant channel 2528 and the capacitor module 82 according to the first embodiment described above. That is, the capacitor module 82 faces the first coolant channel 25281D in the radial direction due to the stepped portion 2526D of the cover member 252D described above. The cooling performance for the capacitor module 82 can thus be slightly increased by the first coolant channel 25281D.

In the present embodiment, as shown in FIG. 26, a power supply busbar 886D is disposed between the first coolant channel 25281D and the capacitor module 82 in the radial direction. That is, the power supply busbar 886D is disposed near the stepped portion 2526D of the cover member 252D. The power supply busbar 886D can thus be efficiently disposed by using the space between the first coolant channel 25281D and the second coolant channel 25282D in the radial direction, and the power supply busbar 886D can be efficiently cooled by the first coolant channel 25281D and the second coolant channel 25282D.

Figure 27:
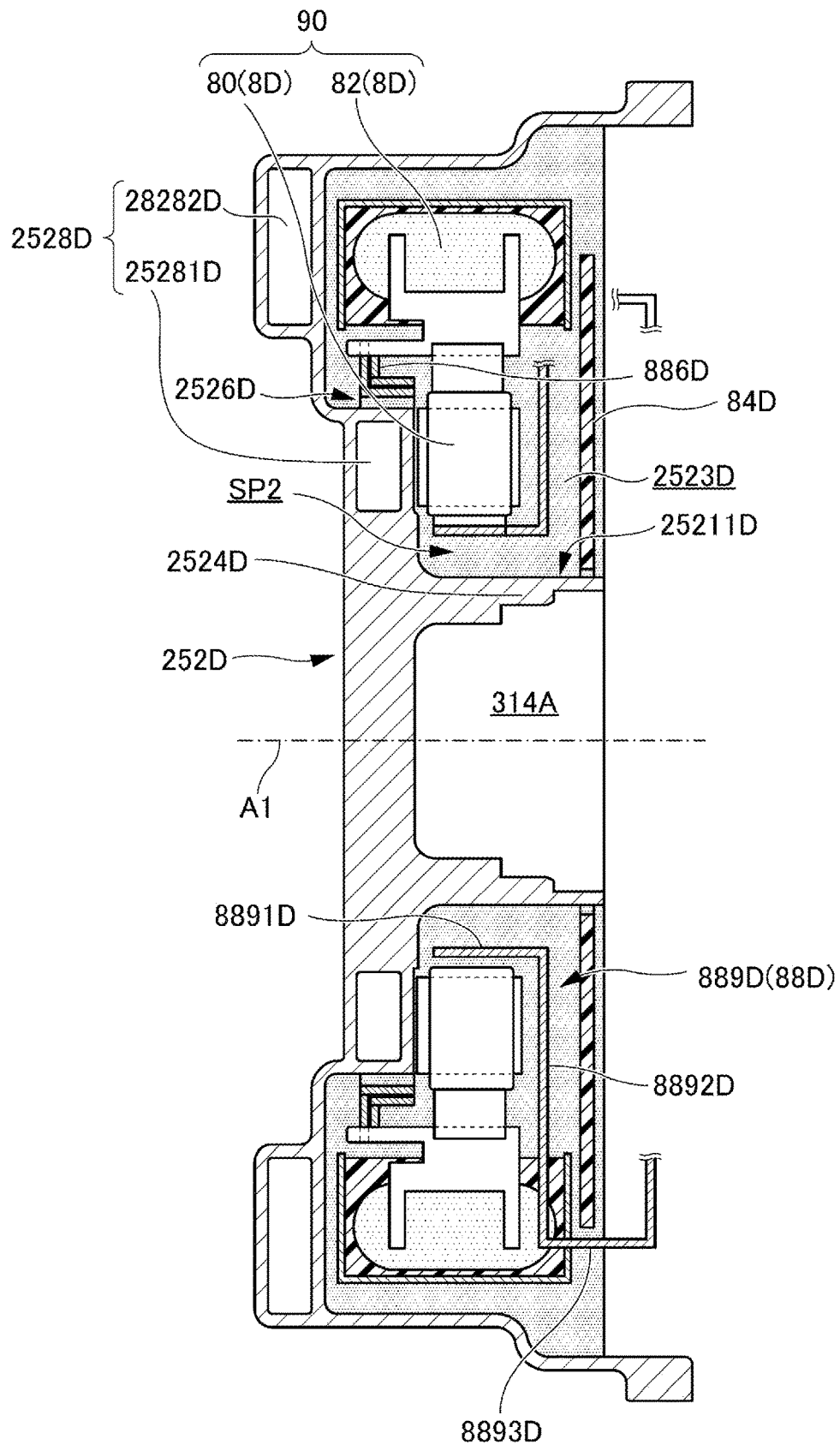
FIG. 27 is a schematic sectional view illustrating a sub-assembled state in which a motor drive device is attached to a cover member according to the third embodiment.

FIG. 27 is a schematic sectional view illustrating a sub-assembled state in which the motor drive device 8 has been attached to the cover member 252 according to the present embodiment.

The cover member 252D includes a bearing support portion 2524D similar to the bearing support portion 2524 according to the first embodiment described above. The bearing support portion 2524D is set in a cylindrical portion 25211D. In the present embodiment, the cylindrical portion 25211D protrudes toward the X2 side in the X direction so as to extend to such a position that the cylindrical portion 25211D overlaps the control board 84D as viewed in the radial direction or to a position beyond the control board 84D on the X2 side in the X direction. In this case, as shown in FIG. 27, the power modules 80, the capacitor modules 82, and the control board 84D that are located radially outward of the cylindrical portion 25211D can be completely sealed with a molded resin portion 2523D. That is, the motor drive device 8D and the control board 84D can be covered with the molded resin portion 2523D having no stepped portion on the X2 side. The motor drive device 8 and the control board 84D can thus easily be integrated with the cover member 252D by the molded resin portion 2523D. The molded resin portion 2523D may have a layered structure as described above with reference to FIG. 3D.

Figure 28:
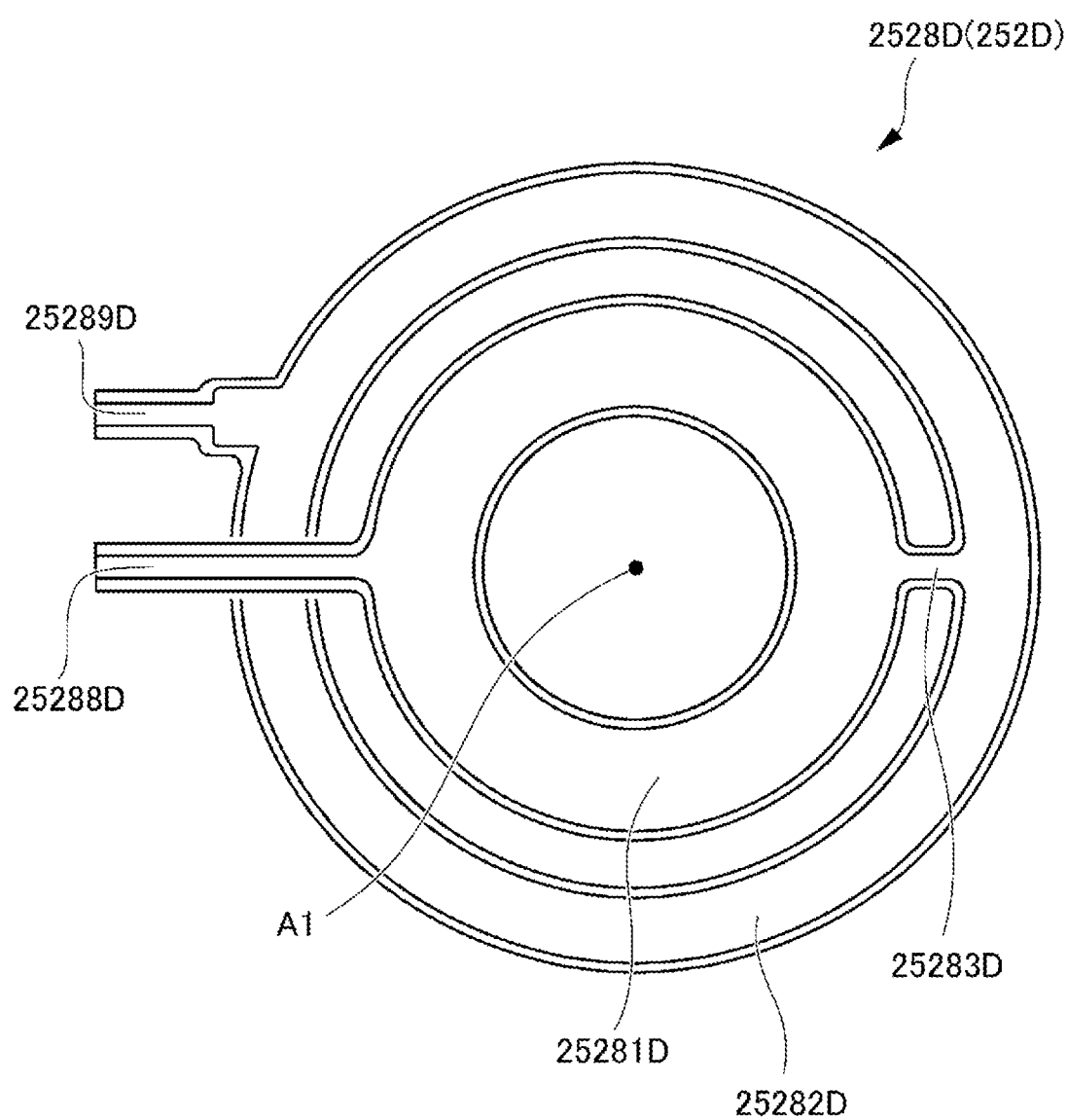
FIG. 28 is a diagram illustrating a coolant channel structure suitable for the cover member according to the third embodiment, and is a plan view in the axial direction.

FIG. 28 is a diagram illustrating a coolant channel structure suitable for the cover member 252D according to the present embodiment, and is a plan view in the axial direction. In FIG. 28, the coolant channel structure formed by the cover member 252D is shown in a see-through fashion.

In the present embodiment as well, the first coolant channel 25281D has an annular shape as viewed in the axial direction, and faces the power modules 80 as viewed in the axial direction, like the coolant channel 2528 according to the first embodiment described above. The second coolant channel 25282D has an annular shape as viewed in the axial direction, and faces the capacitor modules 82 as viewed in the axial direction. The first coolant channel 25281D and the second coolant channel 25282D communicate with each other through a radial connection channel 25283D. The first coolant channel 25281D is preferably disposed upstream of (closer to the discharge side of the water pump, not shown, than) the second coolant channel 25282D. That is, the coolant channel 2528D further includes an inlet channel portion (inlet channel portion formed in the cover member 252) 25288D to the first coolant channel 25281D. As shown in FIG. 28, the inlet channel portion 25288D is connected to the first coolant channel 25281D in the radial direction. According to such a configuration, the submodules 800 (power semiconductor chips 801, 802; see FIG. 29) of the power modules 80 that are more likely to become hot than the capacitor modules 82 can be efficiently cooled by the coolant in the first coolant channel 25281D located upstream of the second coolant channel 25282D.

In the present embodiment, the first coolant channel 25281D and the second coolant channel 25282D are offset from each other in the axial direction as described above. Therefore, it is relatively easy to form the inlet channel portion 25288D to the first coolant channel 25281D located radially inward of the second coolant channel 25282D. That is, as shown in FIG. 28, the inlet channel portion 25288D can extend radially outward so as to extend across the second coolant channel 25282D in the radial direction as viewed in the axial direction. The end of the inlet channel portion 25288D may be connected to a supply pipe of the coolant channel, not shown.

In the example shown in FIG. 28, the coolant channel 2528D further includes an outlet channel portion 25289D (outlet channel portion formed in the cover member 252) from the second coolant channel 25282D. The outlet channel portion 25289D from the second coolant channel 25282D is disposed side by side with the inlet channel portion 25288D to the first coolant channel 25281D. Therefore, the attachment of the coolant supply system and the coolant discharge system to the cover member 252D is concentrated at one position. The workability etc. of such attachment can thus be improved.

Figure 29:
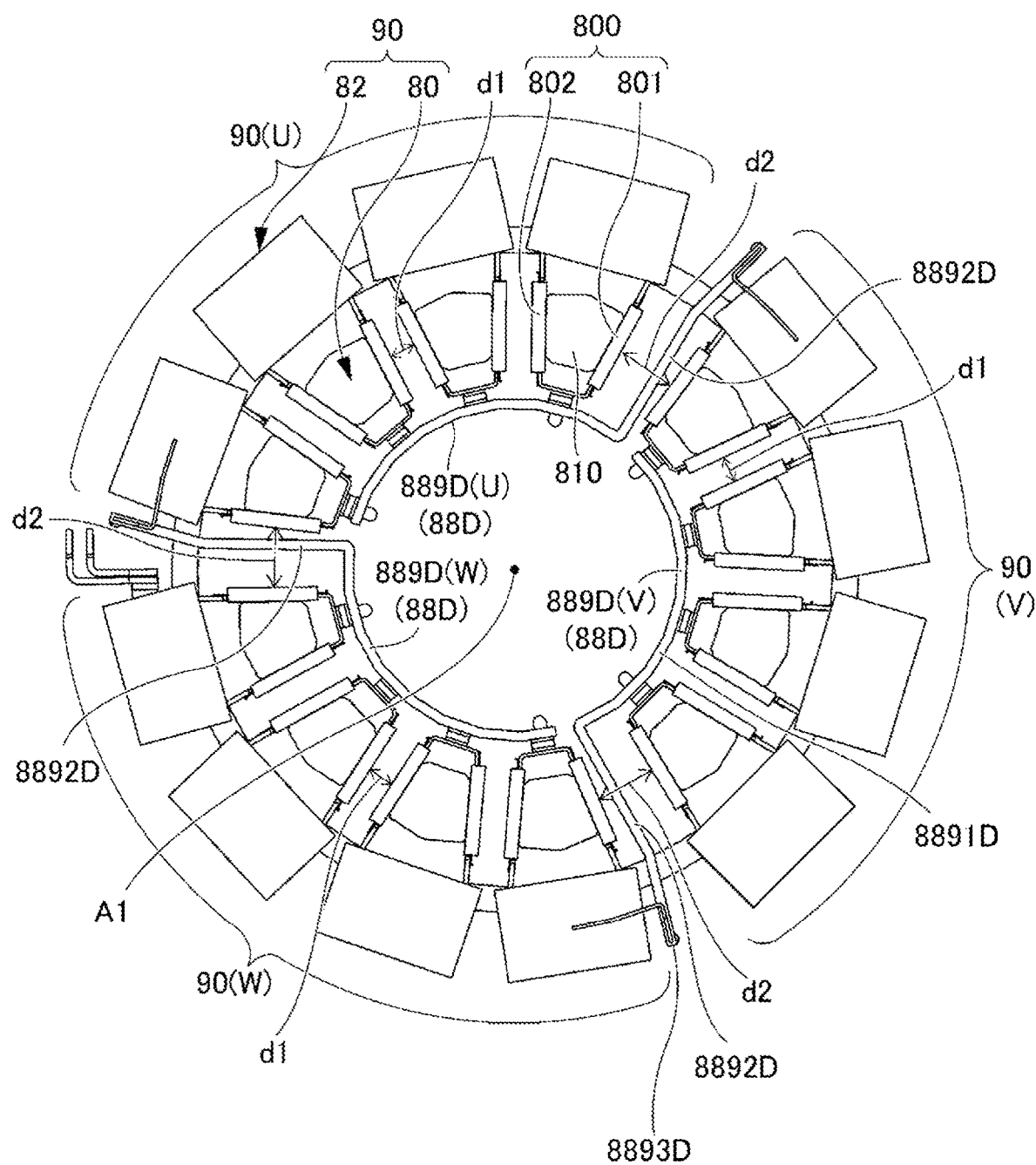
FIG. 29 is a diagram illustrating the motor drive device applied to the vehicle drive device according to the third embodiment.

FIG. 29 is a diagram illustrating the motor drive device 8D applied to the vehicle drive device 10D according to the present embodiment, and is a plan view of the motor drive device 8D as viewed in the axial direction from the X2 side. The motor drive device 8D described below can be similarly applied to the first embodiment described above by replacing the motor drive device 8 of the vehicle drive device 10 according to the first embodiment described above with the motor drive device 8D.

The motor drive device 8D according to the present embodiment is different from the motor drive device 8 according to the first embodiment described above in the manner in which a plurality of block assemblies 90 is arranged in the circumferential direction. Specifically, the motor drive device 8D according to the present embodiment may be the same as the motor drive device 8 according to the embodiment described above in that, for example, a plurality of block assemblies 90 is provided for each phase of the rotating electrical machine 1 and the plurality of block assemblies 90 of the same phase is arranged adjacent to each other in the circumferential direction of the rotating electrical machine. The motor drive device 8D according to the present embodiment is different from the motor drive device 8 according to the embodiment described above in that the circumferential distance between the block assemblies 90 of different phases that are located adjacent to each other in the circumferential direction is larger than the circumferential distance between the block assemblies 90 of the same phase that are located adjacent to each other in the circumferential direction. That is, in the motor drive device 8 according to the embodiment described above, a plurality of block assemblies 90 is arranged at equal intervals in the circumferential direction regardless of the phase. In the motor drive device 8D according to the present embodiment, however, the circumferential distance between the block assemblies 90 of different phases that are located adjacent to each other in the circumferential direction is larger than the circumferential distance between the block assemblies 90 of the same phase that are located adjacent to each other in the circumferential direction. This can ensure an appropriate insulating distance between different phases that are located adjacent to each other in the circumferential direction.

For example, in the example shown in FIG. 29, of the 12 block assemblies 90, four U-phase block assemblies 90 (shown by "90(U)" in FIG. 29 in order to distinguish from the other phases) are disposed adjacent to each other in the circumferential direction as a group, four V-phase block assemblies 90 (shown by "90(V)" in FIG. 29 in order to distinguish from the other phases) are disposed adjacent to each other in the circumferential direction as a group, and four W-phase block assemblies 90 (shown by "90(W)" in FIG. 29 in order to distinguish from the other phases) are arranged adjacent to each other in the circumferential direction as a group. In this case, for example, the four U-phase block assemblies 90(U) are disposed at a distance d1 from each other in the circumferential direction, and one block assembly 90(U) at a circumferential end of the U-phase group and one block assembly 90(V) at a circumferential end of the V-phase group are disposed at a distance d2 that is significantly larger than the distance d1 from each other in the circumferential direction. The same applies to the relationship between one block assembly 90(U) at a circumferential end of the U-phase group and one block assembly 90(W) at a circumferential end of the W-phase group, and the relationship between one block assembly 90(V) at a circumferential end of the V-phase group and one block assembly 90(W) at a circumferential end of the W-phase group.

In the present embodiment, relay busbars 889D are disposed by using the spaces located at such a relatively large distance d2 from each other (spaces between the block assemblies 90). The relay busbars 889D have the same function as the relay busbars 889 described above, and are busbars provided for each phase to electrically connect the rotating electrical machine 1 and the power modules 80 (middle points between the upper and lower arms).

In the example shown in FIG. 29, a U-phase relay busbar 889D (shown by "889D(U)" in FIG. 29 in order to distinguish from the relay busbars of the other phases) extends in the radial direction by using the circumferential space between the one block assembly 90(U) at the circumferential end of the U-phase group and the one block assembly 90(V)

at the circumferential end of the V-phase group (space of the distance d2). Similarly, a V-phase relay busbar 889D (shown by "889D(V)" in FIG. 29 in order to distinguish from the relay busbars of the other phases) extends in the radial direction by using the circumferential space between the one block assembly 90(V) at the circumferential end of the V-phase group and the one block assembly 90(W) at the circumferential end of the W-phase group (space of the distance d2). Similarly, a W-phase relay busbar 889D (shown by "889D(W)" in FIG. 29 in order to distinguish from the relay busbars of the other phases) extends in the radial direction by using the circumferential space between the one block assembly 90(W) at the circumferential end of the W-phase group and the one block assembly 90(W) at the circumferential end of the W-phase group (space of the distance d2).

More specifically, the U-phase relay busbar 889D(U) includes an arc-shaped portion 8891D located radially inward of the four U-phase block assemblies 90(U) and extending in the circumferential direction, a radial portion 8892D extending in the radial direction, and a connection end 8893D. The radial portion 8892D is continuous from one end of the arc-shaped portion 8891D and extends radially outward through the space of the distance d2 to the radial position of the capacitor modules 82 of the four U-phase block assemblies 90(U). The connection end 8893D is continuous from the radially outer end of the radial portion 8892D, is located radially outward of the control board 84D, and extends in the axial direction. As shown in FIG. 26, the connection end 8893D extends beyond the control board 84D toward the X2 side and is then bent radially inward and joined to the coil end portion 322A. Part of the connection end 8893D (part connected to the coil end portion 322A) may be implemented by another conductor extending from the rotating electrical machine 1 side.

According to such a configuration, there is no need to route wires through the through holes 845 of the control board 84 like the lead wires 888 (see FIG. 3A) used in the first embodiment described above. This eliminates the need for the through holes 845. As a result, the possibility that the power element mounting area on the control board 84 may be reduced due to a wiring portion 88D of the motor drive device 8D can be reduced.

According to the present embodiment, the circumferential space can thus be formed between the block assemblies 90 of different phases that are adjacent to each other in the circumferential direction. As a result, the relay busbar 889D can be efficiently disposed by using this space while ensuring an appropriate insulating distance between different phases that are located adjacent to each other in the circumferential direction.

Figure 30:
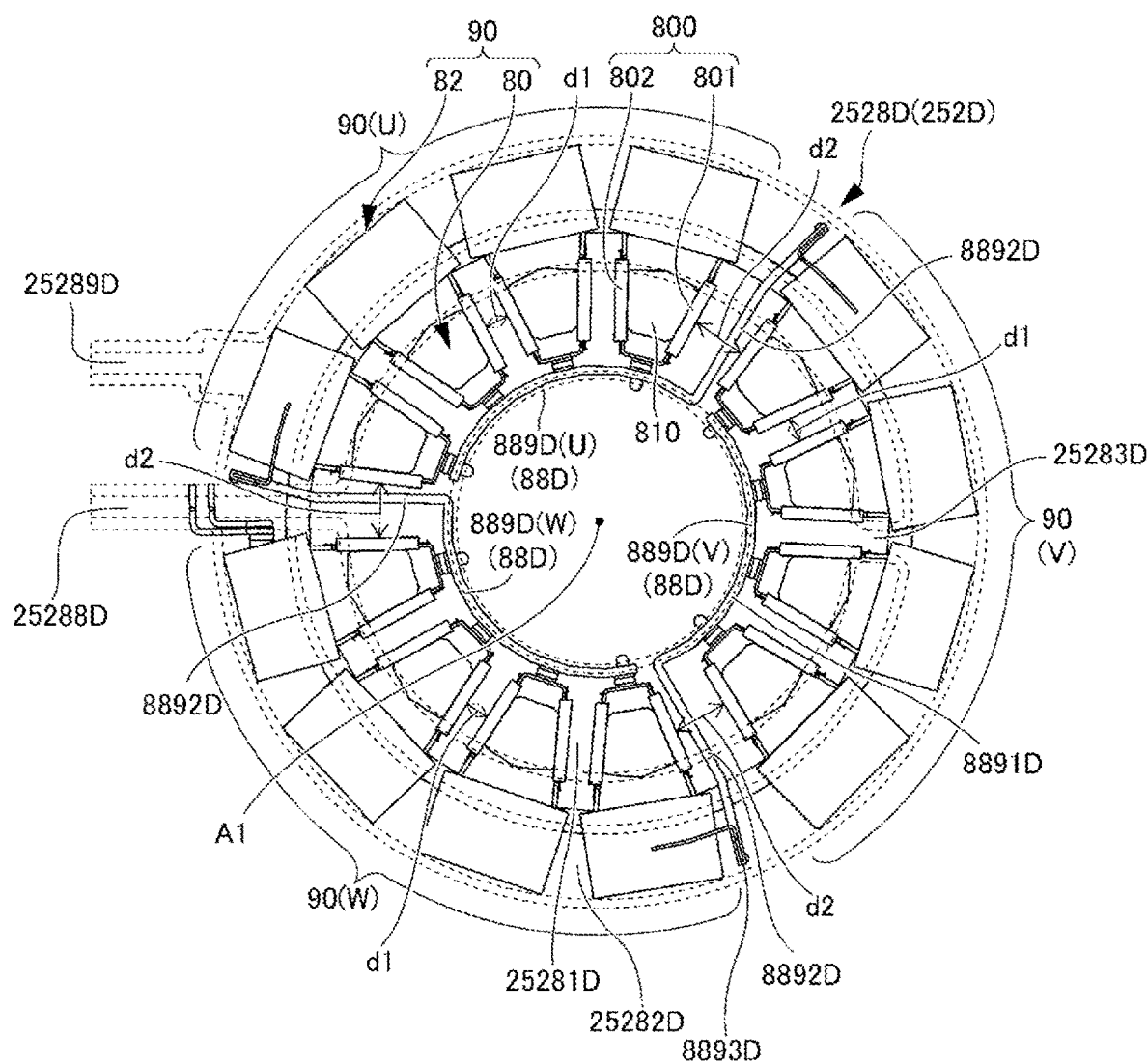
FIG. 30 is a diagram illustrating the positional relationship between the coolant channel structure and the motor drive device according to the third embodiment.

FIG. 30 is a diagram illustrating the positional relationship between the coolant channel structure and the motor drive device 8D according to the present embodiment, and is a plan view of the motor drive device 8D as viewed in the axial direction from the X1 side. In FIG. 30, the coolant channel structure of the present embodiment described above with reference to FIG. 28 is shown by dashed lines superimposed on the motor drive device 8D shown in FIG. 29.

In the present embodiment, as shown in FIG. 30, the inlet channel portion 25288D extending in the radial direction is formed between the block assemblies 90 of different phases that are adjacent to each other in the circumferential direction as viewed in the axial direction. In the example shown in FIG. 30, the inlet channel portion 25288D extends in the radial direction by using the circumferential space between the one block assembly 90(U) at the circumferential end of the U-phase group and the one block assembly 90(W) at the circumferential end of the W-phase group (space of the distance d2).

In the present embodiment, as described above, the capacitor module 82 overlaps the first coolant channel 25281D as viewed in the radial direction. Therefore, if the inlet channel portion 25288D extends in the radial direction at the axial position of the first coolant channel 25281D, the inlet channel portion 25288D may interfere with the capacitor module 82. However, the present embodiment uses the circumferential space between the one block assembly 90(U) at the circumferential end of the U-phase group and the one block assembly 90(W) at the circumferential end of the W-phase group (space of the distance d2). The inlet channel portion 25288D can therefore be formed with the shortest route without interfering with the capacitor module 82.

Next, modifications of the layout of the motor drive device 8 will be described with reference to FIGS. 31 to 33. In the following, constituent elements that may be similar to those in the first embodiment described above may be denoted by the same reference signs, and description thereof may be omitted.

Figure 31:
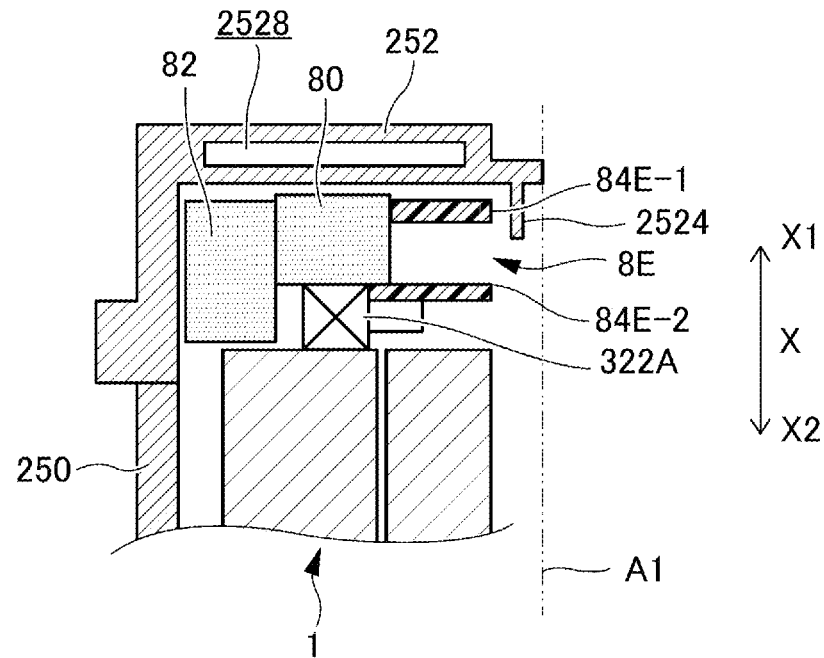
FIG. 31 is a sectional view schematically showing the layout in a main part of a motor drive device according to a first modification.

FIG. 31 is a sectional view schematically showing the layout in a main part of a motor drive device 8E according to a first modification. Only a portion on one side with respect to the first axis A1 and on the X1 side in the X direction of a vehicle drive device including the motor drive device 8E is schematically shown in FIG. 31 (and also in FIGS. 32 and 33 described later).

The motor drive device 8E according to the first modification is different from the motor drive device 8 according to the first embodiment described above in that the control board 84 is implemented by two control boards 84E-1, 84E-2. In this case, the control boards 84E-1, 84E-2 are preferably disposed radially inward of the coil end portion 322A as viewed in the axial direction. In this case, for example, the coil end portion 322A can also be cooled via the heat dissipation member 810 (see FIG. 9) of the power module 80 by disposing the heat dissipation member 810 and the coil end portion 322A close to each other in the axial direction.

Figure 32:
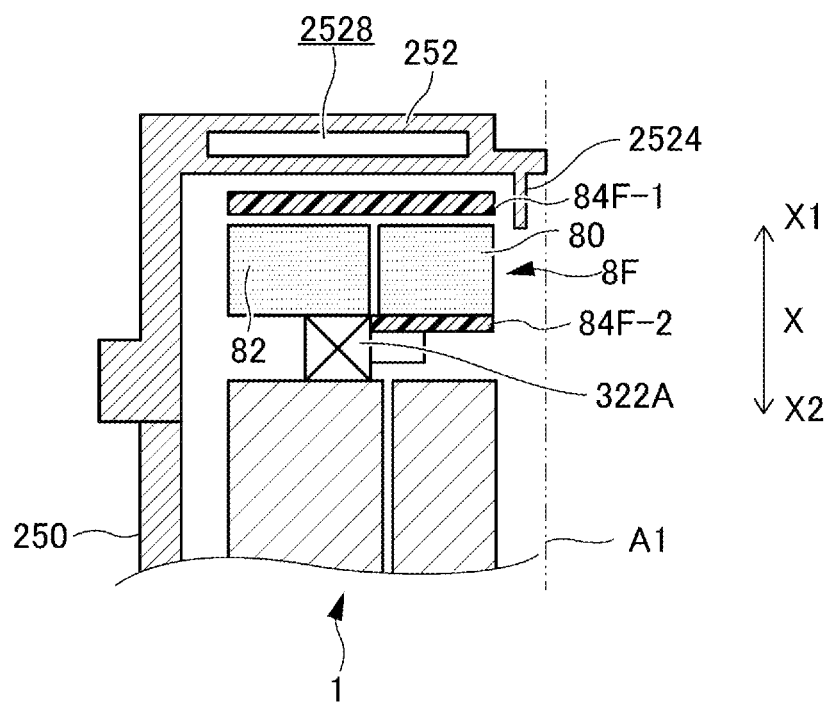
FIG. 32 is a sectional view schematically showing the layout in a main part of a motor drive device according to a second modification.

FIG. 32 is a sectional view schematically showing the layout in a main part of a motor drive device 8F according to a second modification.

The motor drive device 8F according to the second modification is different from the motor drive device 8 according to the first embodiment described above in that the capacitor module 82 overlaps the coil end portion 322A as viewed in the axial direction. In this case, the capacitor module 82 does not overlap the coil end portion 322A and extends on the X1 side with respect to the coil end portion 322A, as viewed in the radial direction. In this case, the radial size of the capacitor module 82 can be increased to a relatively large size, or the radial size of the cover member 252 can be reduced by disposing the capacitor module 82 at a more radially inner position. As with the first modification described above, the motor drive device 8F according to the second modification is different from the motor drive device 8 according to the first embodiment described above in that the control board 84 is implemented by two control boards 84F-1, 84-2F. The control boards 84F-1, 84-2F may be integrated into one board.

Figure 33:
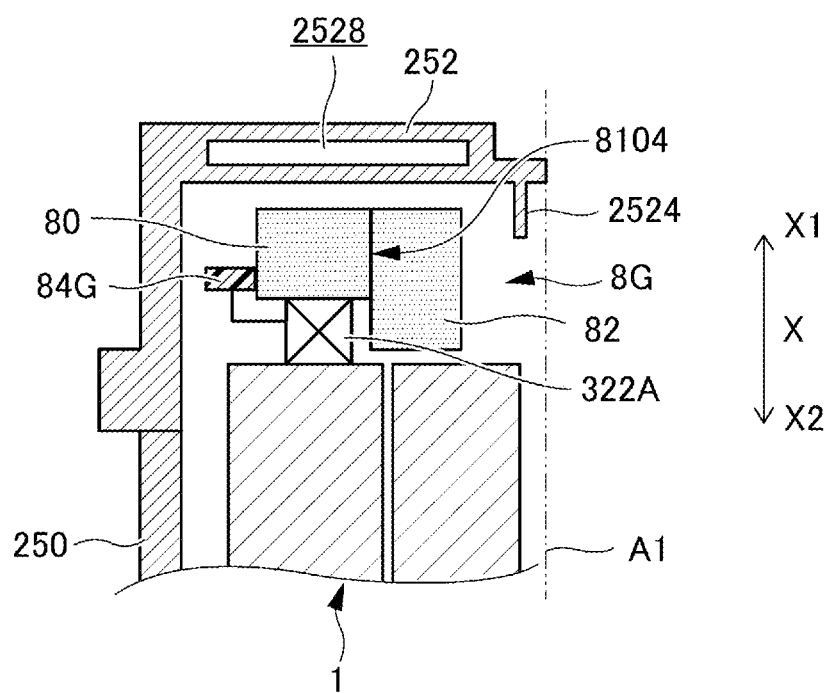
FIG. 33 is a sectional view schematically showing the layout in a main part of a motor drive device according to a third modification.

FIG. 33 is a sectional view schematically showing the layout in a main part of a motor drive device 8G according to a third modification.

The motor drive device 8G according to the third modification is different from the motor drive device 8 according to the first embodiment described above in the radial relationship between the power module 80 and the capacitor module 82. Specifically, in the third modification, the power module 80 is disposed radially outward of the capacitor module 82 as viewed in the axial direction. In this case, the power module 80 may overlap the coil end portion 322A as viewed in the axial direction. That is, the power module 80 may extend on the X1 side with respect to the coil end portion 322A. The power module 80 overlaps the capacitor module 82 as viewed in the radial direction. Therefore, the effects of the first embodiment described above (e.g., reduction in axial size of the vehicle drive device 10) can be similarly obtained in the present modification as well. In FIG. 33, a control board 84G is disposed radially outward of the power module 80. However, any other arrangement may be implemented.

According to the third modification, the size (in particular, the circumferential size) of the heat dissipation member 810 of the power module 80 can be easily increased compared to the layout in which the power module 80 is disposed radially inward of the capacitor module 82. The heat dissipation via the heat dissipation member 810 of the power module 80 can thus be efficiently improved.

In the third modification, the capacitor module 82 may face the heat dissipation member 810 of the power module 80 in the radial direction from the radially inner side. That is, the capacitor module 82 can be thermally connected to the heat dissipation member 810 by facing the radially inner connection surface 8104 of the heat dissipation member 810 (connection surface 8104 connecting the two side faces to which the pair of power semiconductor chips 801, 802 is fixed) in the radial direction. In this case, the capacitor module 82 may contact the radially inner surface of the heat dissipation member 810. With such a configuration as well, the capacitor module 82 can be efficiently cooled via the heat dissipation member 810.

In any of the modifications described above with reference to FIGS. 31 to 33, the bearing support portion 2524 is disposed radially inward of the power module 80 as viewed in the axial direction, and overlaps the capacitor module 82 as viewed in the radial direction. Therefore, the effects similar to those of the first embodiment described above (e.g., reduction in axial size of the vehicle drive device) can be obtained.

Figure 34:
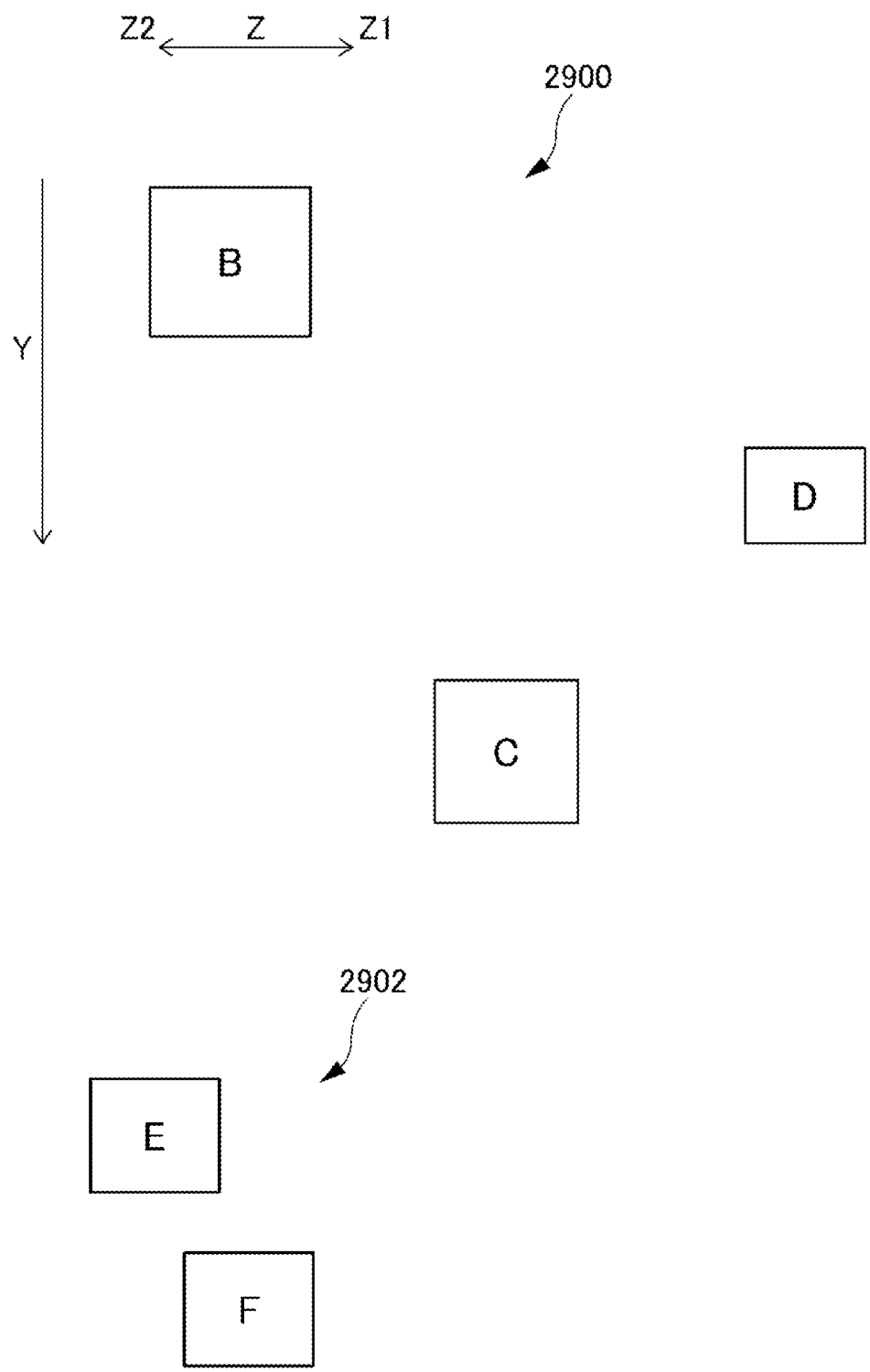
FIG. 34 is a diagram for describing expressions used related to the layout.

Lastly, a supplemental description of the definitions of the expressions will be provided with reference to FIG. 34. As shown in FIG. 34, the expression "an element C is disposed on the Z1 side in a Z direction with respect to an element B as viewed in a Y direction" is herein a concept including a relationship in which at least part of the element C is located on the Z1 side with respect to a straight line in contact with the Z1 side of the element B out of straight lines parallel to the Y direction, like the positional relationship shown by arrow 2900. In this case, the Y direction and the Z direction are orthogonal to each other, and the positional relationship between the elements is a relationship as viewed in a direction perpendicular to the YZ plane.

The expression "an element D is disposed between the element B and the element C in the Y direction" is a concept including a relationship in which at least part of the range in which the element D extends in the Y direction (coordinate range in the Y direction) is located between the range in which the element B extends in the Y direction and the range in which the element C extends in the Y direction, like the positional relationship shown by arrow 2900. In other words, this expression is a concept including a relationship in which at least one of straight lines passing through the element D and parallel to the Z direction can pass between the element B and the element C in the Y direction (without passing through the element B and the element C).

The expression "an element E overlaps an element F as viewed in the Y direction" is a concept including a relationship in which at least one of straight lines passing through the element E and parallel to the Y direction passes through the element F, like the positional relationship shown by arrow 2902. As used herein, the "straight lines passing through an element" is a concept excluding a straight line in contact with the element.

Although the embodiments are described in detail above, the present disclosure is not limited to the specific embodiments, and various modifications and changes can be made within the scope of the claims. All or some of the constituent elements of the embodiments described above may be combined. Of the effects of each embodiment, those related to dependent claims are additional effects distinct from generic concepts (independent claim).

For example, in the first embodiment described above (and in the second embodiment etc.), the cover member 252 includes the coolant channel 2528 as a cooler. However, the present disclosure is not limited to this. For example, the cover member 252 may include air cooling fins as another cooler instead of or in addition to the coolant channel 2528.

In the third embodiment, the capacitor module 82 is disposed radially outward of the coil end portion 322A. However, the present disclosure is not limited to this. That is, the capacitor module 82 may overlap the coil end portion 322A as viewed in the axial direction. In this case, the radial size of the cover member 252D can be reduced.

DESCRIPTION OF THE REFERENCE NUMERALS 10, 10C . . . vehicle drive device (inverter-integrated rotating electrical machine), 1, 1A, 1B . . . rotating electrical machine, 310 . . . rotor, 320 . . . stator, 322 . . . stator coil (coil of stator), 250 . . . motor case (housing member), 252 . . . cover member, 2524 . . . bearing support portion (support portion), 25211, 25211D . . . cylindrical portion (boss portion), 2528, 2528B, 2528D . . . coolant channel (cooler), 25281, 25281B, 25281D . . . first coolant channel, 25282, 25282B, 25282D . . . second coolant channel, 25288D . . . inlet channel portion (channel portion), 2523, 2523A, 2523D . . . molded resin portion, 25231 . . . first resin layer, 25232 . . . second resin layer, 801, 802 . . . power semiconductor chip (power switching element), 810, 810C . . . heat dissipation member (cooling block), 90 . . . block assembly (switching element module), 886, 886D . . . power supply busbar (second busbar), 889, 889D . . . relay busbar (first busbar), C . . . smoothing capacitor

The invention claimed is:

1. An inverter-integrated rotating electrical machine, comprising:
   a rotating electrical machine including a rotor and a stator;
   a housing member forming a housing chamber that houses the rotating electrical machine;
   a cover member that covers an opening on one end side of the housing member in an axial direction, and that includes a support portion rotatably supporting the rotor;

a power switching element located between the cover member and the rotating electrical machine in the axial direction; and a smoothing capacitor located between the cover member and the rotating electrical machine in the axial direction, wherein the cover member includes a cooler that cools the power switching element and the smoothing capacitor, the power switching element and the smoothing capacitor are connected to the cover member in a thermally conductive manner, the cooler includes a first coolant channel facing the power switching element, and a second coolant channel facing the smoothing capacitor, the cooler is located within a body of the cover member, and the cooler is located between the power switching element and an axial end face of the cover member along the axial direction and the cooler is located between the smoothing capacitor and the axial end face along the axial direction, the axial end face being an outermost face of the cover member.

2. The inverter-integrated rotating electrical machine according to claim 1, wherein a boss portion extending in the axial direction is provided with the support portion, and a bearing that rotatably supports the rotor is located radially inward of the boss portion, and the power switching element and the smoothing capacitor are located radially outward of the boss portion and sealed with a resin portion.

3. The inverter-integrated rotating electrical machine according to claim 2, further comprising a control board that is located between the power switching element and the rotating electrical machine in the axial direction and that controls the power switching element, wherein the control board together with the power switching element and the smoothing capacitor is sealed with the resin portion at a position radially outward of the boss portion.

4. The inverter-integrated rotating electrical machine according to claim 2, wherein the resin portion includes a layered structure in the axial direction that includes a first resin layer and a second resin layer, and the first resin layer is located on a side closer to the rotating electrical machine than the second resin layer in the axial direction, and is less thermally conductive than the second resin layer.

5. The inverter-integrated rotating electrical machine according to claim 1, wherein the first coolant channel is located upstream of the second coolant channel.

6. The inverter-integrated rotating electrical machine according to claim 5, wherein there is an annular groove between the first coolant channel and the second coolant channel, and at least part of a first busbar that electrically connects the power switching element and the smoothing capacitor to a direct current power supply is located in the annular groove.

7. The inverter-integrated rotating electrical machine according to claim 6, wherein the first busbar is located between the power switching element and the smoothing capacitor in the radial direction as viewed in the axial direction.

8. The inverter-integrated rotating electrical machine according to claim 5, wherein the second coolant channel is located so as to be offset with respect to the first coolant channel in the axial direction as viewed in a radial direction, and the smoothing capacitor is located radially outward of the first coolant channel as viewed in the axial direction, and overlaps the first coolant channel as viewed in the radial direction.

9. The inverter-integrated rotating electrical machine according to claim 8, wherein at least part of the first busbar that electrically connects the power switching element and the smoothing capacitor to the direct current power supply is located so as to overlap the first coolant channel in the axial direction as viewed in the radial direction.

10. The inverter-integrated rotating electrical machine according to claim 1, wherein the power switching element and the smoothing capacitor are in a form of a switching element module integrated with a cooling block connected to the cooler in a thermally conductive manner, a plurality of the switching element modules is provided for each phase of the rotating electrical machine, the plurality of switching element modules of the same phase is located adjacent to each other in a circumferential direction of the rotating electrical machine, and a circumferential distance between the switching element modules of different phases that are located adjacent to each other in the circumferential direction is larger than a circumferential distance between the switching element modules of the same phase that are located adjacent to each other in the circumferential direction.

11. The inverter-integrated rotating electrical machine according to claim 10, wherein the cooler includes a channel portion extending in a radial direction between the switching element modules of the different phases that are located adjacent to each other in the circumferential direction as viewed in the axial direction.

12. The inverter-integrated rotating electrical machine according to claim 10, further comprising a second busbar located between the switching element modules of the different phases that are located adjacent to each other in the circumferential direction as viewed in the axial direction, the second busbar being a busbar for electrically connecting, for each phase, the switching element modules to the rotating electrical machine.

* * * * *